United States Patent
Luu

(10) Patent No.: US 11,805,882 B1
(45) Date of Patent: *Nov. 7, 2023

(54) NAIL LAMP WITH RECHARGEABLE BATTERY PACK HAVING BATTERY GAUGE

(71) Applicant: LeChat, Hercules, CA (US)

(72) Inventor: Newton Luu, Hercules, CA (US)

(73) Assignee: LeChat, Hercules, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/305,656

(22) Filed: Jul. 12, 2021

Related U.S. Application Data

(63) Continuation of application No. 16/868,440, filed on May 6, 2020, now Pat. No. 11,058,202.

(60) Provisional application No. 62/844,094, filed on May 6, 2019.

(51) Int. Cl.
| | |
|---|---|
| *G21K 5/00* | (2006.01) |
| *A45D 29/00* | (2006.01) |
| *F21V 33/00* | (2006.01) |
| *F21V 29/76* | (2015.01) |
| *F21V 23/00* | (2015.01) |
| *H05B 45/10* | (2020.01) |
| *F21L 4/08* | (2006.01) |
| *F21L 4/02* | (2006.01) |
| *F21V 23/04* | (2006.01) |
| *F21Y 115/10* | (2016.01) |

(52) U.S. Cl.
CPC ............. *A45D 29/00* (2013.01); *F21L 4/027* (2013.01); *F21L 4/085* (2013.01); *F21V 23/005* (2013.01); *F21V 23/0414* (2013.01); *F21V 29/76* (2015.01); *F21V 33/0004* (2013.01); *H05B 45/10* (2020.01); *A45D 2200/205* (2013.01); *F21Y 2115/10* (2016.08)

(58) Field of Classification Search
None
See application file for complete search history.

(56) References Cited

U.S. PATENT DOCUMENTS

| | | | |
|---|---|---|---|
| 6,762,425 | B1 | 7/2004 | Strait |
| 8,242,475 | B1 | 8/2012 | Cheng |
| 8,286,643 | B2 | 10/2012 | Li et al. |
| 8,993,983 | B2 | 3/2015 | Li et al. |
| 9,713,371 | B1 | 7/2017 | Luu |

(Continued)

FOREIGN PATENT DOCUMENTS

KR 101213368 12/2012

*Primary Examiner* — Elmito Breval
(74) *Attorney, Agent, or Firm* — Aka Chan LLP

(57) ABSTRACT

A nail lamp has a removable, rechargeable battery pack and a translucent shell formed by double-injection molding. The lamp is portable can be operated cordlessly using the battery pack. The translucent shell glows when the lamp's treatment chamber is on. Surface-mounted light emitting diodes (LEDs) illuminate the treatment chamber with multiple wavelengths ultraviolet (UV) light. The battery pack has a USB port which allows a customer to conveniently charge a device (e.g., smartphone) while the customer's nails are being worked on. The battery pack has a battery gauge, which indicates a charge level remaining for the battery. When the battery pack is low on charge, the battery pack can be swapped with a charged battery pack. A battery pack can be charged while inserted in the lamp or removed from the lamp. The LEDs of the nail lamp are passively cooled.

20 Claims, 66 Drawing Sheets

(56) References Cited

U.S. PATENT DOCUMENTS

| | | |
|---|---|---|
| 10,117,494 B1 | 11/2018 | Luu |
| 10,264,866 B1 | 4/2019 | Luu |
| 2010/0293805 A1 | 11/2010 | Chang |
| 2011/0277338 A1 | 11/2011 | Li et al. |
| 2013/0161531 A1 | 6/2013 | Haile |
| 2014/0042341 A1 | 2/2014 | Park et al. |
| 2014/0124655 A1 | 5/2014 | Rivero et al. |
| 2015/0082654 A1 | 3/2015 | Jaegal et al. |

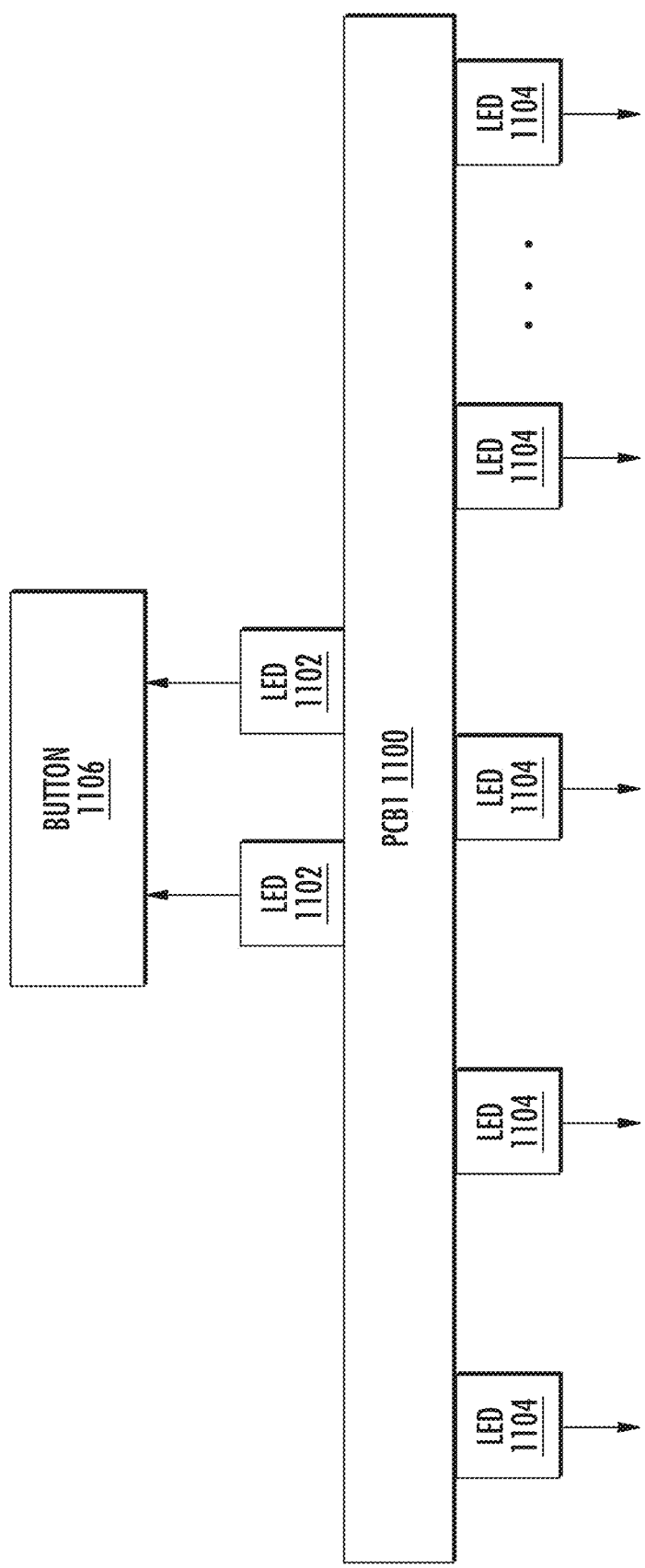

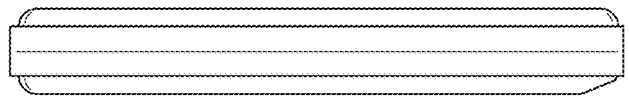
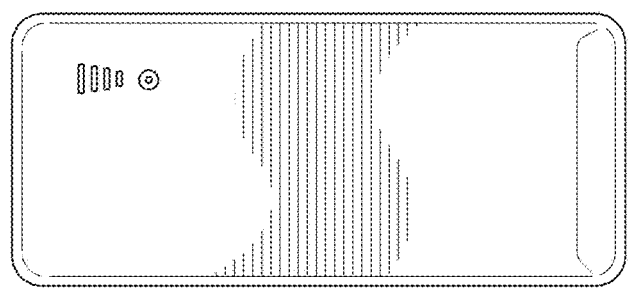
FIG. 50A    FIG. 50B
FIG. 50C
FIG. 50D
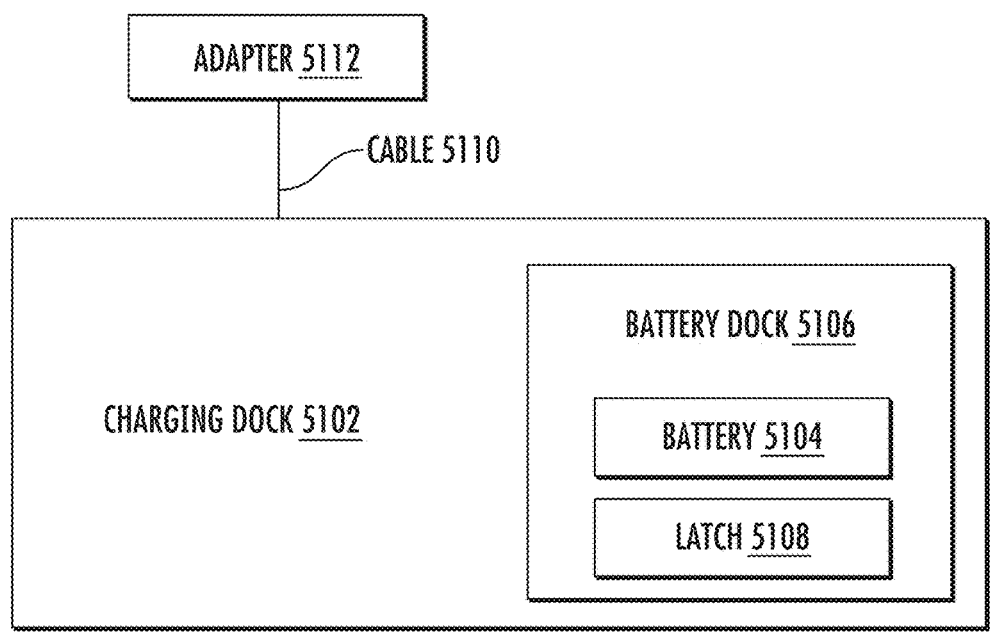
FIG. 51

NAIL LAMP WITH RECHARGEABLE BATTERY PACK HAVING BATTERY GAUGE

CROSS-REFERENCE TO RELATED APPLICATIONS

This patent application is a continuation of U.S. patent Ser. No. 16/868,440, filed May 6, 2020, issued as U.S. Pat. No. 11,058,202 on Jul. 13, 2021, which claims the benefit of U.S. patent application 62/844,094, filed May 6, 2019. These applications are incorporated by reference along with all other references cited in this application.

BACKGROUND OF THE INVENTION

The present invention relates generally to providing a portable ultraviolet (UV) light source for curing UV-curable gel nail polish. More particularly, the present invention relates to a portable UV nail lamp with a light emitting diode light source and rechargeable battery. The present invention also relates to a UV nail lamp with a light emitting diode (LED) light source and a platform for a user's hand.

UV nail lamps are available for the salon and home to cure UV-curable nail polish. These nail lamps typically have UV fluorescent tubes or bulbs that use alternating current (AC) power. So, these nail lamps have an AC cord that needs to be plugged into the wall, which restricts their placement, since they need to be close to a wall socket. This can be problematic. In a salon, for example, this can restrict the number of lamps in use, the location of nail lamp stations, and thus, the number of customers that can use the lamps at a given time.

The tubes or bulbs of these nail lamps consume rather significant amounts of power and generate heat, which makes these nail lamps typically large and bulky to accommodate the bulb size and to allow for heat dissipation. This makes these nail lamps somewhat difficult to move, and certainly very difficult to travel with and use in a location without a wall socket, such as while on an airplane. Further, the light from the bulbs of these lamps tends be uneven, so a person's nails are exposed to difference intensities of light output, which causes the nails to dry at different times or to cure unevenly.

Further, traditional nail lamps use light bulbs that tend to produce uneven light, so a person's nails are exposed to difference intensities of light output, which causes the nails to dry at different times or to cure unevenly. These bulbs also tend to be bulky which causes the nail lamps to be large and cumbersome. Conventional bulbs can also consume much electrical energy while operating.

These lamps often have a flat platform on an inside of the lamp for a user to place their hand during drying. With long drying times, the user's hand can become uncomfortable or cramp up with the fingers in a strained, stretched out position within the lamp. There is a risk that the nails can smudge before setting as the user's nails brush up against other fingers or inside the lamp.

As can be appreciated, an improved nail lamp is needed. What is also needed is a method and an apparatus which can accommodate a user's five fingers in a comfortable and ergonomic resting position within a nail lamp. What is also desired is an efficient way to evenly cure UV-curable nail polish on each of the user's nails.

BRIEF SUMMARY OF THE INVENTION

A nail lamp has a removable, rechargeable battery pack and a translucent shell formed by double-injection molding. The lamp is portable can be operated cordlessly using the battery pack. The translucent shell glows when the lamp's treatment chamber is on. Surface-mounted light emitting diodes (LEDs) illuminate the treatment chamber with multiple wavelengths ultraviolet (UV) light. The battery pack has a USB port which allows a customer to conveniently charge a device (e.g., smartphone) while the customer's nails are being worked on. The battery pack has a battery gauge, which indicates a charge level remaining for the battery. When the battery pack is low on charge, the battery pack can be swapped with a charged battery pack. A battery pack can be charged while inserted in the lamp or removed from the lamp. The LEDs of the nail lamp are passively cooled.

Further, the treatment chamber of the lamp accepts five fingers. A hand plate or fingerplate is at a bottom of the treatment chamber and helps position the customer's nails for improved exposure to the ultraviolet light. The hand plate or fingerplate has an elegant design and is removable. The light emitting diodes that emit ultraviolet wavelengths of 365 nanometers and 400 nanometers. A layout of surface-mounted light emitting diodes includes discrete light emitting diodes for each different wavelength. A single 365-nanometer light emitting diode with three to four 400-nanometer light emitting diodes surround or are positioned around the single 365-nanometer light emitting diode. A reliability of using discrete 365-nanometer and 400-nanometer LEDs is better than multiple LED chips packaged in a single package. The light emitting diodes can have a component reliability of 40,000 hours of operation before failure.

In an implementation, the battery pack has a capacity of over 13000 milliamp-hours and can last up to about 2 hours of continuous use in the lamp. The battery pack has a 12 volt output that can be used with other nail lamp having a 12 volt input. The nail lamp and power bank are ETL and CE certified.

The external translucent shell of the nail lamp is formed using double injection molding, which enhances its appearance and glossiness. The translucent shell can be made multiple layers of plastic, such as acrylonitrile butadiene styrene (ABS) and polycarbonate (PC). The acrylonitrile butadiene styrene is an lower layer, while the polycarbonate is an upper layer. The acrylonitrile butadiene styrene can be made of any color (e.g., white, red, green, blue, yellow, or orange), while the polycarbonate is clear to enhance the glossiness of the shell. Under the shell, inside the lamp, there are exterior-facing light emitting diodes (e.g., not ultraviolet) that will illuminate the shell to cause it to glow. The light emitting diodes can also be of any color (e.g., white, red, green, blue, yellow, or orange), can be combination of colors, or can rotate different colors in sequence. The lamp can have a three-position switch that controls a brightness (or dimming) of the glowing shell.

A nail lamp for curing UV-curable nail gel uses light emitting diodes (LEDs) that emit ultraviolet light and are relatively lower power. The nail lamp is powered from an exterior power source, such as a wall socket, or by a rechargeable battery pack. A battery compartment of the nail lamp holds the battery pack, which is removable without disassembling the nail lamp. The nail lamp is easily transportable to different locations and can be used even when a wall socket is unavailable. A curing time of the nail lamp is user-selectable. The nail lamp can also include detection sensors to detect a person's hand or foot in a treatment chamber and automatically turn on or off the LEDs.

A nail lamp for curing UV-curable nail gel is powered by direct current (DC) and can be battery operated. The nail lamp uses surface-mounted light emitting diodes (SMD LEDs) which are relatively lower power. The nail lamp is easily transportable and can be used even when a wall socket is unavailable, such as while traveling on an airplane or in a car. The nail lamp has a cavity or treatment chamber that can accept a user's five fingers. So, the nail lamp can evenly cure nail polish on up to five fingers at once.

A compact portable LED nail curing lamp has surface-mounted light emitting diode (SMD LED) lights. The lamp provides fast and consistent results producing high gloss finish and even curing of nail polish (e.g., UV-curable gel polish). The nail lamp has a micro-USB port, which can be used to power the lamp using a wall adapter, car charger, laptop USB port, or mobile power bank for ultimate portability. In an implementation, a system includes a compact LED nail curing lamp and a mobile power battery pack. The system also includes a cable to connect the nail lamp and the mobile power battery pack. The battery pack provides portable power to the nail lamp so that the nail lamp can be used portably, such as during travel or on an airplane when a wall outlet is unavailable.

A compact LED nail curing lamp has a sleek design with advanced technology, highly efficient surface-mounted light emitting diode (SMD LED) lights. The lamp provides excellent results producing high gloss finish and even curing of nail polish (e.g., UV-curable gel polish). A specific implementation of a compact LED nail curing lamp is the SMD LED Lamp S2 product by LeChat Nail Care Products of Hercules, Calif.

The compact LED nail curing lamp has a micro USB port, which is convenient to use. The user can power this SMD LED lamp (e.g., LeChat's LED Lamp S2 product) using a wall adapter (included), car charger (optional), laptop USB port, or mobile power bank for ultimate portability. In an implementation, a mobile power bank battery that can be used with the SMD LED Lamp S2 product is the LeChat Mobile Power™ battery pack by LeChat Nail Care Products. This product is approved by the Underwriters Laboratories. The packaging of the product can include the certification "UL Approved." The product is also compliant with U.S. and international standards of the Restriction of Hazardous Substances Directive (RoHS) for environmental friendly products.

In an implementation, a system includes a compact LED nail curing lamp (e.g., LeChat S2 product) and a mobile power battery pack (e.g., LeChat Mobile Power product). The system also includes a cable to connect the nail lamp and the mobile power battery pack. In an implementation, the nail lamp has a micro-B USB connector input and the mobile power battery pack has a type A USB receptacle, and the cable connects these together. The battery pack provides portable power to the nail lamp so that the nail lamp can be used portably, such as during travel or on an airplane when a wall outlet is unavailable.

The lamp has a large, illuminated single-button that turns the lamp on for a preset cure time of 30 seconds for efficient, rapid LED/UV gel curing. The compact design saves space and allows for portability that is convenient for travel and pedicure applications. The lamp is lightweight and designed for carrying from place to place. The nail lamp includes professional durable materials that are long lasting and reliable. In an implementation, the nail lamp is a 6-watt LED lamp that includes forty-two SMD LED lights that provide evenly distributed light that allows for an efficient cure in about 30 seconds.

In an implementation, a system includes: a upper housing having a button and a power input; and a lower housing, connected to the upper housing, the cavity or treatment chamber including openings through which surface-mounted light emitting diodes can emit light through. The cavity is sufficiently wide (e.g., about 4.25 inches or 10.6 centimeters) to accommodate five fingers of a human hand placed on a flat surface. In an enclosure formed between the upper and lower, there is circuitry. The circuitry includes at least one printed circuit board with the surface-mounted light emitting diodes; a button; a multiplexer, connected to the power input; a control circuit, connected to button and the multiplexer; a timer, connected to the control circuit and the multiplexer; a recharging circuit, connected and the multiplexer.

The system includes a rechargeable battery comprising a battery output coupled to the multiplexer. The recharging circuit is connected to the rechargeable battery, so it can be recharged from, for example a wall outlet, that is connected to the power input. The multiplexer switches between the power input and the rechargeable battery to supply power circuitry. The housing can include a USB power output, which can be used to power or charge other devices. The power input can be a micro USB power input, which is readily available.

A nail lamp includes a housing including a base and an outer cover. On a front side of the housing, there is an opening to a cavity within the housing. Inside the housing are inner surfaces of the housing including a platform, an inner side wall, and an inner roof of the housing. The opening is shaped and sized to allow a user's hand or foot to pass through the opening into the space within the housing.

A finger plate is positioned on an inside of a housing of a nail lamp. The finger plate includes five side by side depressions that are adapted to support a user's fingers when the user places a hand inside the housing on the plate. In an implementation, the finger plate is removable from the housing. Different finger plates (or foot plates) can be used for users with different size hands or feet.

An arrangement of light sources is positioned on sidewalls and inner roof of an inside of a housing. The light sources can be LEDs using surface mount technology (SMT), or surface mount devices (SMD) LEDs. In an implementation, a SMD LED can produce UV light in a range of about 340 nanometers to about 410 nanometers.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 11 shows a block diagram of a cross section of a first printed circuit board with SMD LED lights attached.

FIG. 50A-50D shows a first short side, a second short side, a first long side, and a top face of the external battery of FIG. 48.

FIG. 51 shows a block diagram of a charging dock and an external battery.

DETAILED DESCRIPTION OF THE INVENTION

Figure 1:
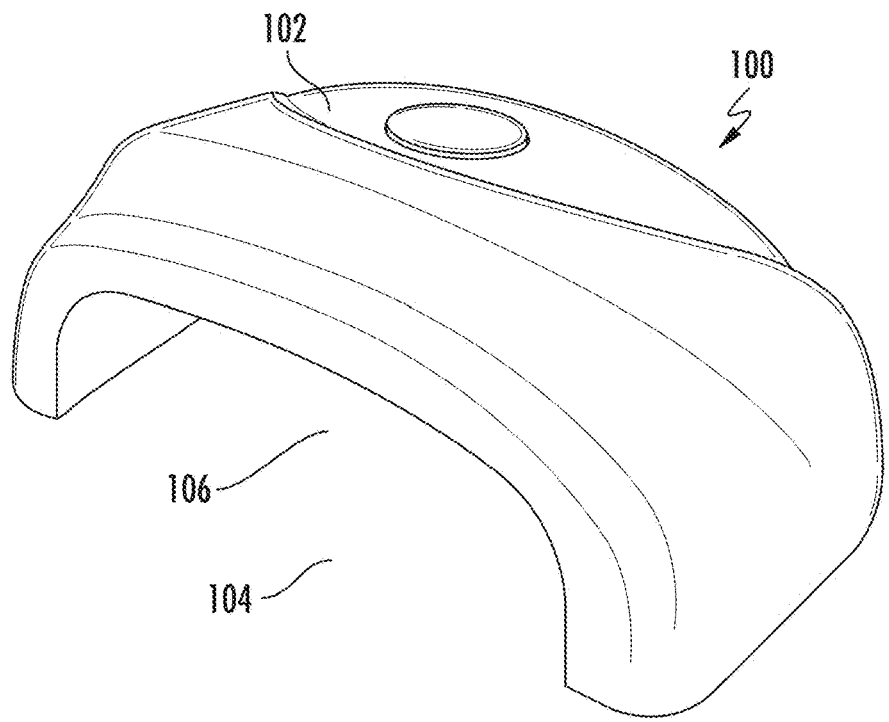
FIG. 1 shows a perspective view of a nail lamp.
Figure 2:
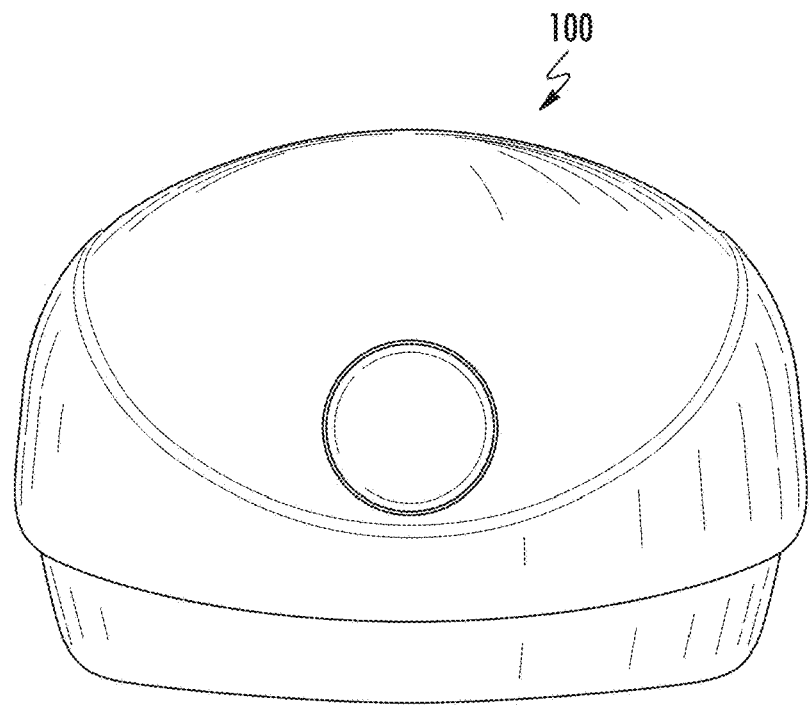
FIG. 2 shows a top view of a nail lamp.
Figure 3:
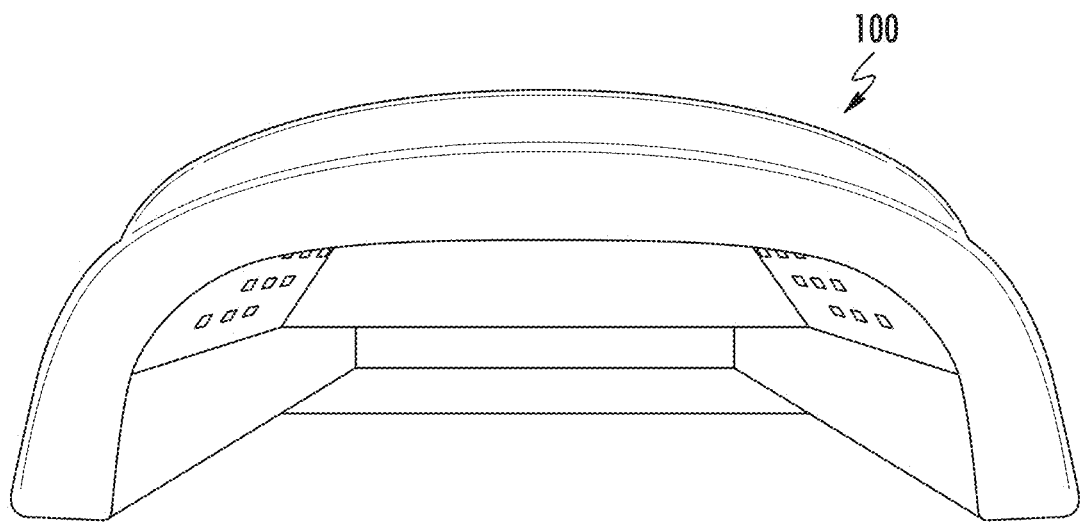
FIG. 3 shows a front side view of a nail lamp.
Figure 4:
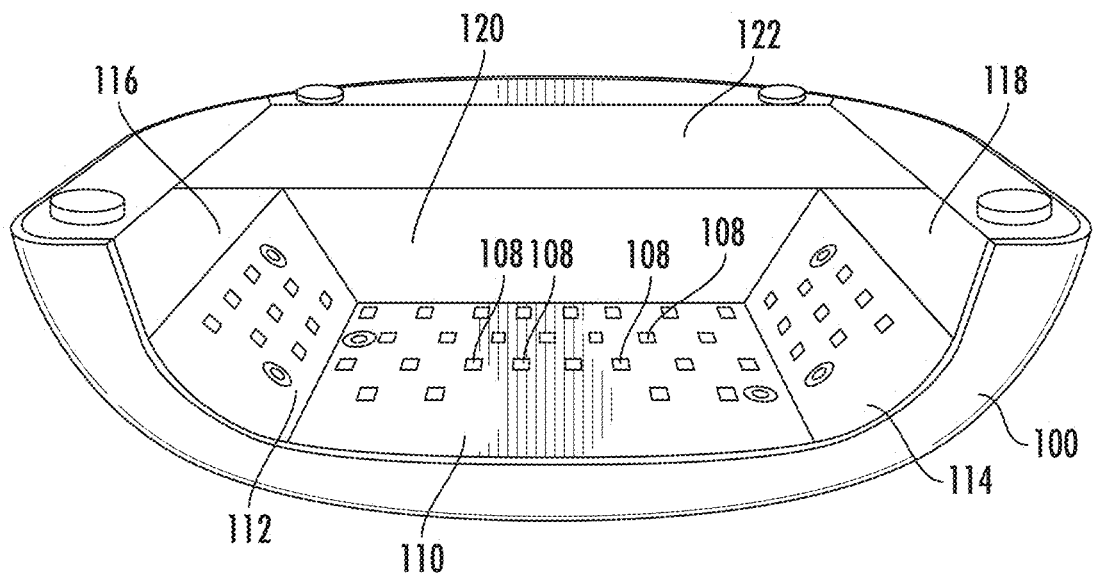
FIG. 4 shows an arrangement of LED lights on an inside of a nail lamp.
Figure 5:
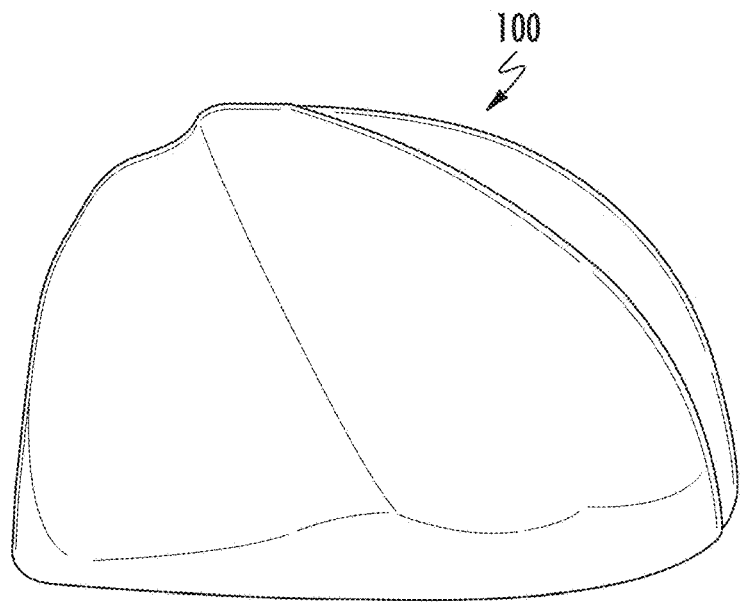
FIG. 5 shows a side view of a nail lamp.
Figure 6:
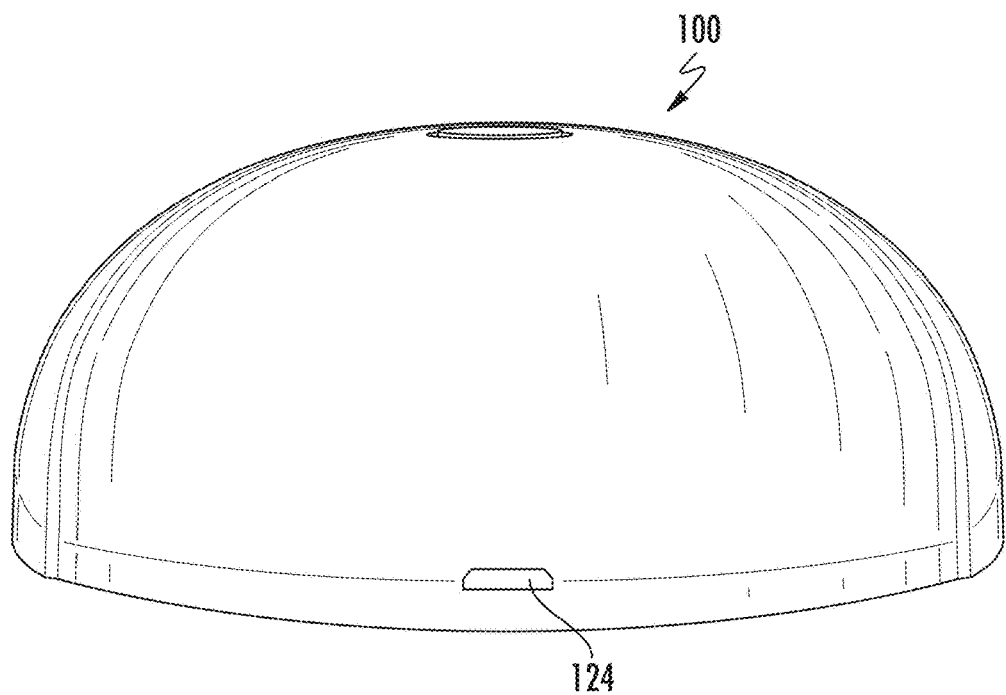
FIG. 6 shows a back side view of a nail lamp.
Figure 7:
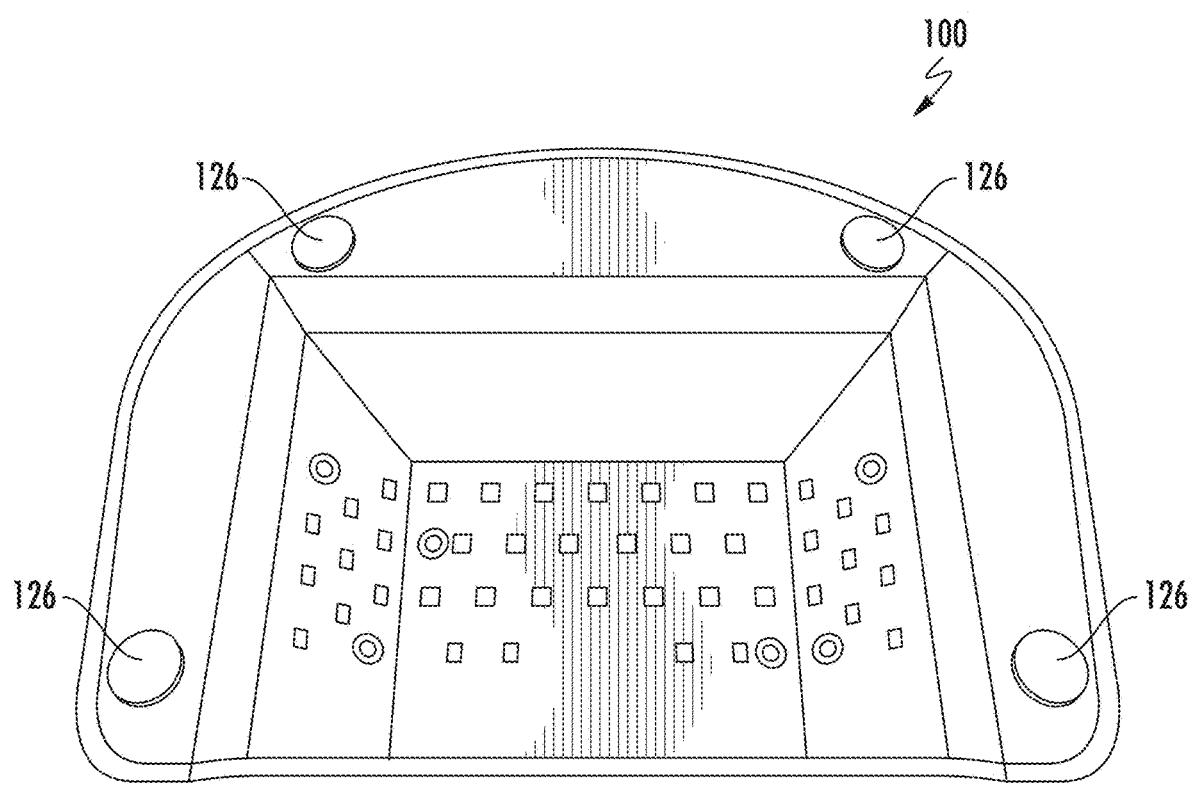
FIG. 7 shows an arrangement of surface mounted device (SMD) LED lights on walls and roof on an inside of a nail lamp.
Figure 8:
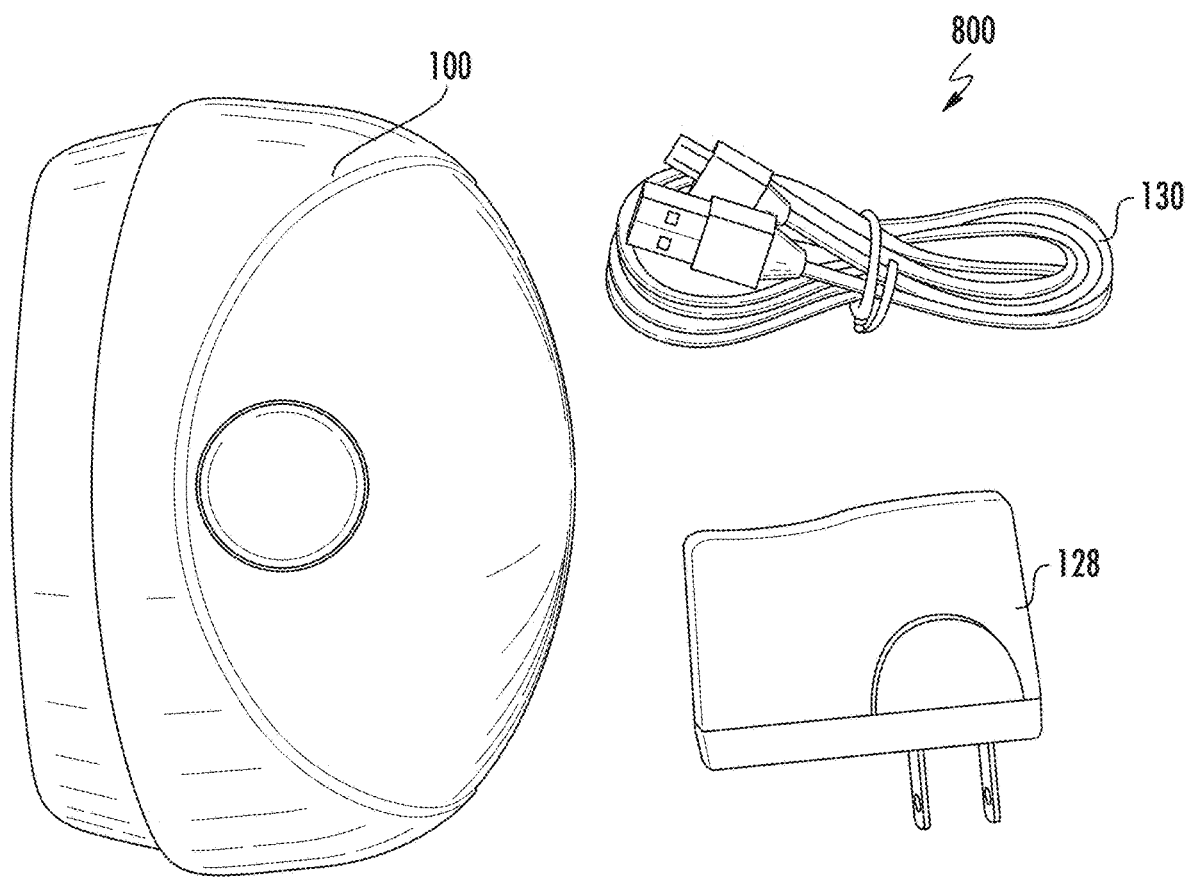
FIG. 8 shows a kit for a nail lamp including a lamp, a cable, and an adapter.

FIGS. 1-8 show views of a nail lamp 100. FIG. 1 shows a perspective view, FIG. 2 shows a top view, FIG. 3 shows a front side view, FIG. 4 shows an upside down view, FIG. 5 shows a right side view, FIG. 6 shows a back side view, FIG. 7 shows a bottom or underside view, and FIG. 8 shows the nail lamp as part of a kit 800.

U.S. patent application Ser. No. 14/848,256, filed Sep. 8, 2015, issued as U.S. Pat. No. 9,713,371 on Jul. 25, 2017, which claims the benefit of U.S. patent application 62/046,453, filed Sep. 5, 2014, and U.S. patent application 62/002,763, filed May 23, 2014, are incorporated by reference.

The nail lamp device has an exterior surface 102 and at one side, an opening 104 through which a user can place their hand into an interior space 106 of the nail lamp. There is a control button on the exterior that is used to turn on an interior lighting source 108 of the device, which exposes the interior space to light from the interior lighting source. As an example, a user can insert their fingers into the interior space, turn on the cure interior lighting source, and cure their UV-curable nail polish or UV-curable nail gel coated nails with the interior light.

In an implementation, there is also an exterior lighting source (e.g., an LED) of the device, which also turns on in response to the control button and is on when the interior lighting source is on. Light from the exterior lighting source is visible through a translucent material (e.g., translucent plastic) of the control button. When the interior lighting source is off, the light from the exterior lighting source will also be off. The exterior lighting source is used as an indicator that the device is on—that the interior lighting source is on.

In an implementation, the interior lighting source emits light of a different wavelength from the exterior lighting source. The interior lighting source can emit UV light (wavelengths ranging approximately from 100 nanometers to 400 nanometers) to cure UV-curable gel polish. And the exterior lighting source emits wavelengths of light within the visible light spectrum (wavelengths ranging approximately from 390 nanometers to 700 nanometers). In specific implementations, the exterior lighting source emits red, green, blue, or any combination of red, green, or blue colors. The red colors include wavelengths ranging approximately from 620-740 nanometers. The green colors include wavelengths ranging approximately from 495-570 nanometers. The blue colors include wavelengths ranging approximately from 450-495 nanometers.

More specifically, the nail lamp includes a housing. The housing includes an outer cover (also be referred to as an exterior surface) and inner walls. In an implementation the outer cover is made a plastic material that has a glossy sheen finish (e.g., metallic finish).

On a side of the housing, there is an opening to a space (or cavity or interior space or treatment chamber) within the housing. The space within the housing is defined by inner walls of the housing. The inner walls can be made of a reflective material. This material can direct emitted light from SMD LEDs into the cavity toward the user's nails. In an implementation, the interior of the lamp includes six inner walls. One of the walls forms a ceiling of the cavity. The other walls are angled with respect to this wall. In another implementation, shown in FIG. 4, the interior of the lamp includes seven inner walls, 110, 112, 114, 116, 118, 120, and 122.

In an implementation, the opening is shaped and sized to allow a user's hand to pass through the opening into the cavity. In another implementation, the opening is adapted to allow a foot to pass through the opening. In another implementation, the nail lamp is adapted to be used for both a hand and foot.

FIG. 6 shows a specific implementation of a nail lamp that includes a port 124 for a micro-USB connector cable. A power source can be coupled to the port to provide the nail lamp with operating power. In other implementations, the port can be a USB port, or plug, or other types of ports for electrical power transfer.

As shown in FIG. 7, on a bottom of the housing, there are grip members 126 that prevent the housing from sliding on a work surface. The grip member is one or more rubber pads which provide friction against the surface. The grip members can help stabilize the nail lamp during curing to prevent nudging the nails during use or on uneven or unlevel surfaces (e.g., table on a train or airplane).

FIG. 8 shows a specific implementation of a nail lamp that is part of kit 800. The kit includes a packaging (e.g., a box) that includes the nail lamp 100, a power adaptor 128, and a USB/micro-USB cable 130.

Below is a table of operational modes of the SMD LED lamp.

TABLE A

| Mode | Operational Mode |
| --- | --- |
| 1. No power to power input | UV light is not operational |
| 2. Power to power input | Power UV light components and operational |
| 3. Press button when UV light off | UV light turns on and turns off automatically after 30 seconds (or other preset time) |
| 4. Press button while UV light on | UV light immediately turns off |

Figure 9:
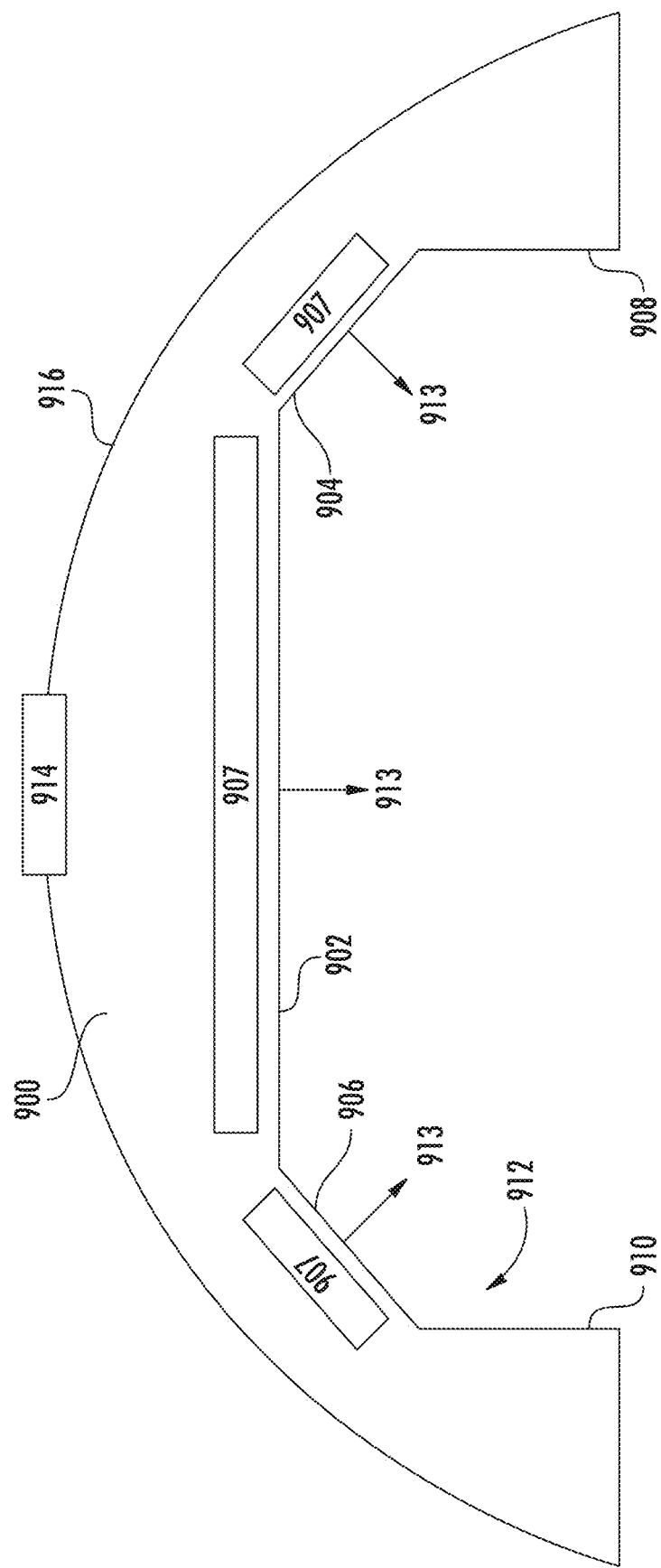
FIG. 9 shows a block diagram of a cross-section of a nail lamp.

FIG. 9 shows a block diagram of a cross-section of a nail lamp 900. There are five inner walls of the cavity that are visible. There is a first wall 902 that forms a ceiling of the cavity. There are two walls 904 and 906 next to the right and left of the first wall that are angled with respect to the first wall. The first, second, and third walls have SMD LEDs 907 that are attached to printed circuit boards arranged between these inner walls and the outer cover. The cavity also includes a fourth wall 908 adjacent the second wall and a fifth wall 910 adjacent the third wall. These walls have a reflective material 912 (e.g., iron, steel, aluminum, aluminum alloy, other metal or metal alloy, or other sheet metal) to direct 913 light into the cavity, and do not include SMD LEDs. A button 914 is coupled to an exterior 916 of the nail lamp.

Figure 10:
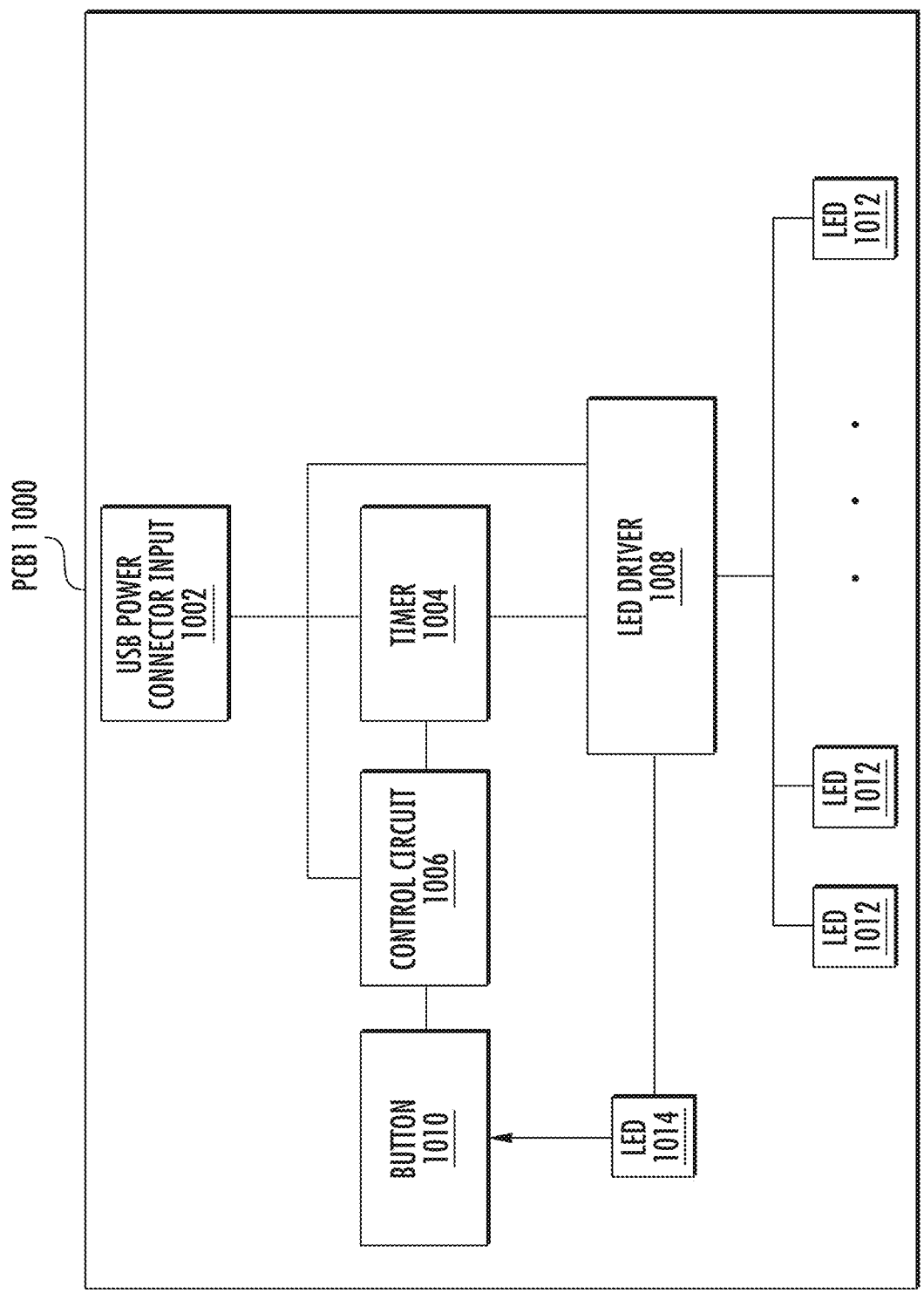
FIG. 10 shows a block diagram of a specific implementation of a first printed circuit board.

FIG. 10 shows a block diagram of a specific implementation of a first printed circuit board 1000 (PCB1). A power input 1002 (e.g., a universal serial bus (or USB) power connector input) provides power to a timer 1004, a control circuit 1006, and an LED driver 1008 of PCB1. A button 1010 is connected to the control circuit that is connected to the timer. The button can activate the control circuit that controls the timer which activates the LED driver to activate one or more SMD LEDs 1012 of PCB1. The LED driver can also control an LED 1014 that connects to the button. For example, the LED will turn on behind the button to cause the button to light up.

FIG. 11 shows a block diagram of a cross section of a double-sided printed circuit board PCB1 1100 with SMD LED lights 1102 and 1104 attached to opposite sides of PCB1. There are two SMD LEDs 1102 on one side of PCB1 that emit light in a first direction away from PCB1 toward a button 1106 of the nail lamp (e.g., a back-lit control button). On an opposite side of PCB1, there is a group of SMD LEDs 1104 that emit light in a second direction away from PCB1 into a cavity of the lamp housing.

Figure 12B:
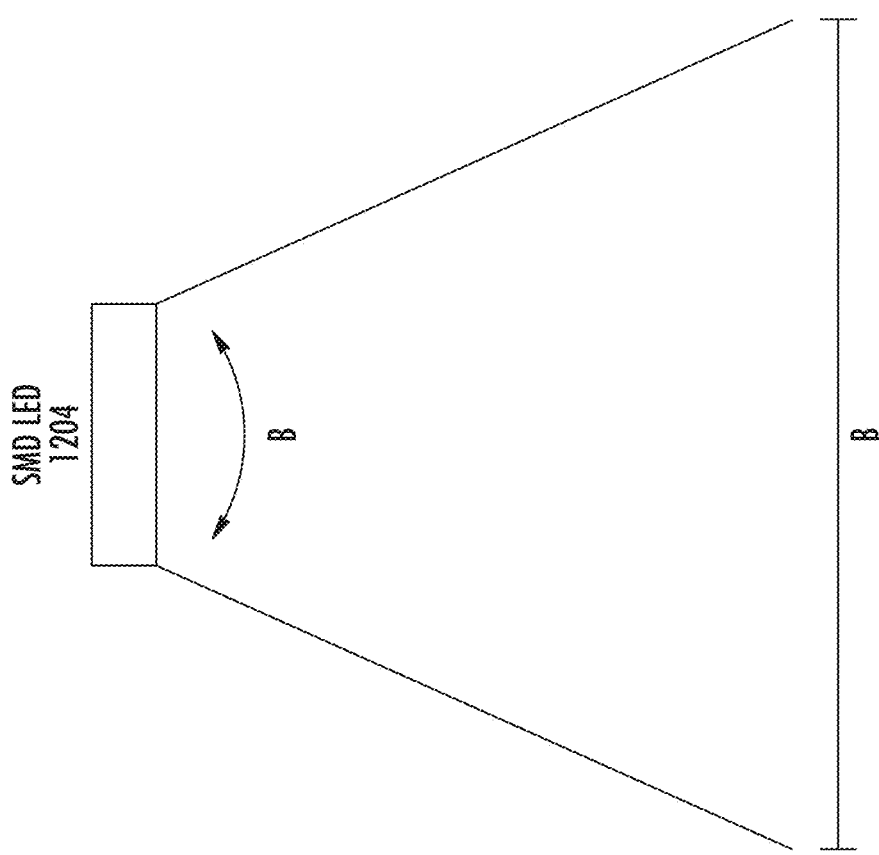
FIGS. 12A-12B show a comparison between a standard LED and a SMD LED.
Figure 12A:
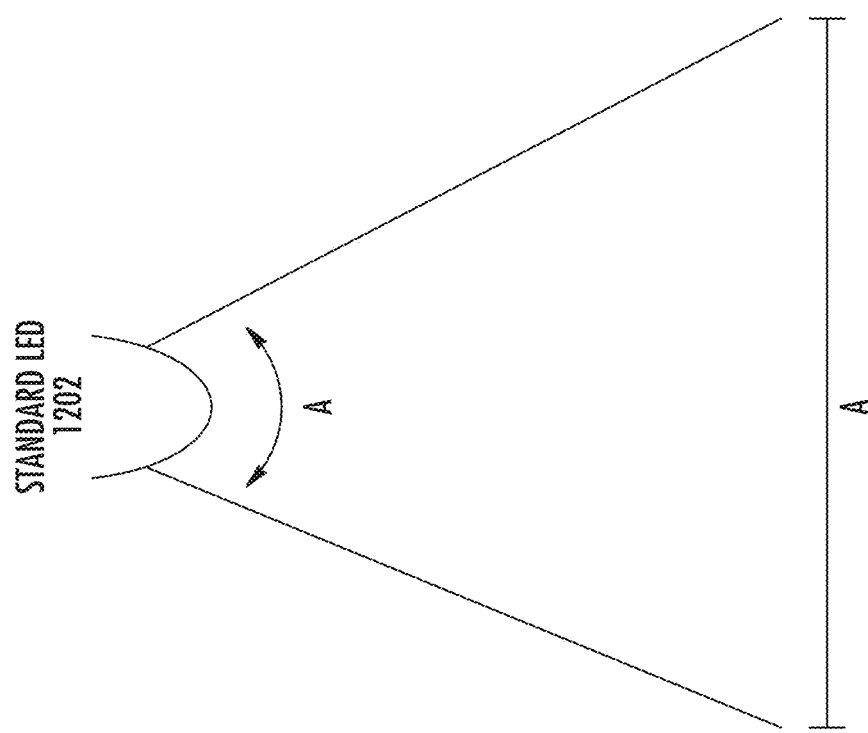

FIGS. 12A-12B shows a comparison between a standard LED 1202 and a SMD LED 1204. Light from a standard LED is emitted at a smaller beam angle (angle A) compared to the SMD LED which has a greater beam angle (angle B) and beam spread. At a given distance away from a surface, the SMD LED and standard LED will each emit light in the shape of a cone. The SMD LED has a greater beam spread and will emit a greater area of illumination than the standard LED. So, a base of the cone of light (e.g., circle) for the SMD LED will have a greater area (e.g., greater diameter, B is greater than A) than that of a standard LED. Thus, fewer SMD LEDs are needed to light an area, allowing for less power used and greater energy savings.

Figure 13:
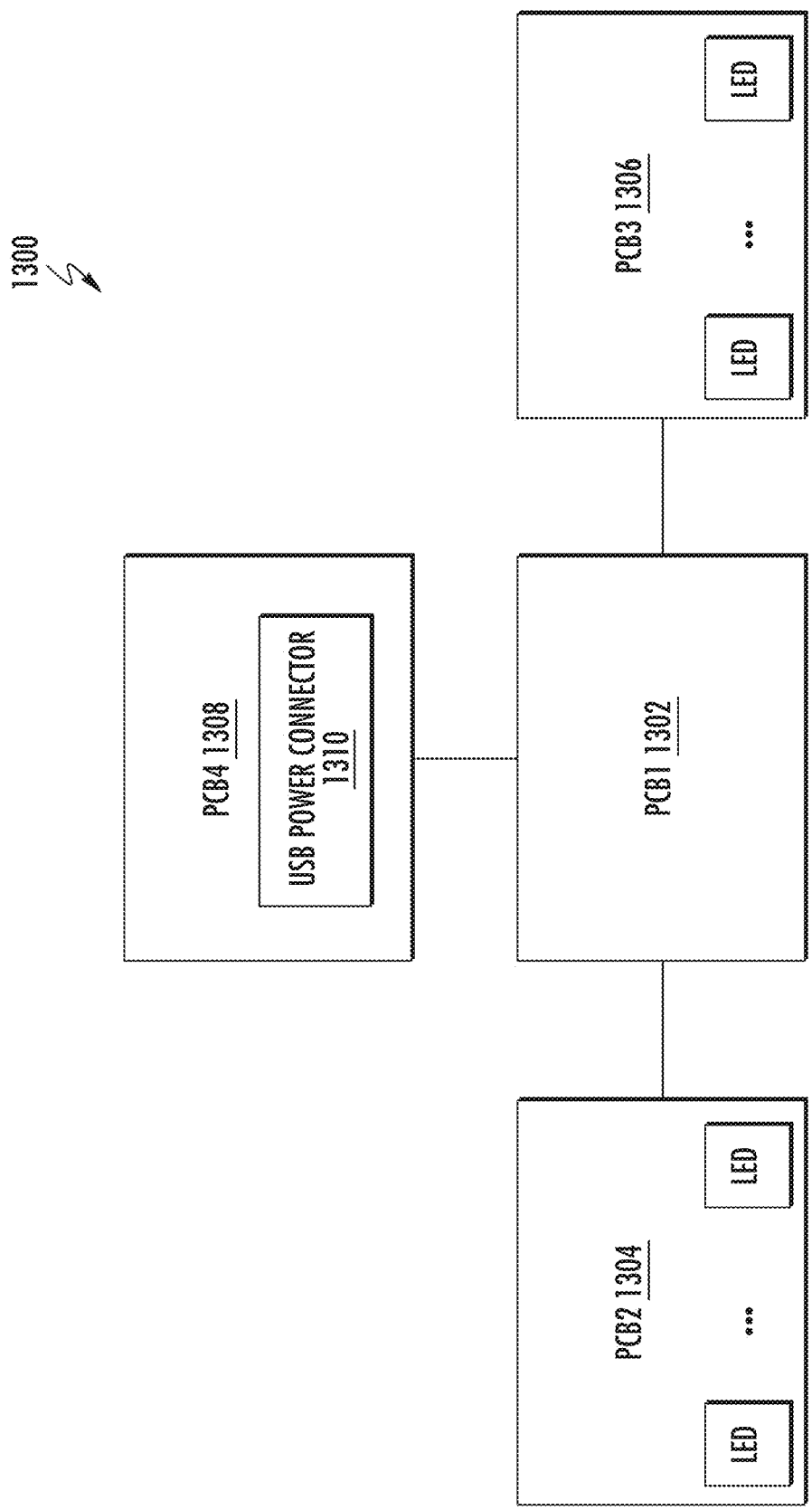
FIG. 13 shows a block diagram of a specific implementation of circuitry of a nail lamp with four printed circuit boards.

FIG. 13 shows a block diagram of a specific implementation of a nail lamp 1300 with four internal printed circuit boards. PCB1 1302 is connected to a second printed circuit board PCB2 1304 and a third printed circuit board PCB3 1306. PCB2 and PCB3 each includes at least one SMD LED light. PCB1 is also connected to a fourth printed circuit board PCB4 1308, which includes a USB connector input 1310. PCBs 1-3 provide the SMD LEDs that light the UV light cavity of the nail lamp housing. The cavity has a top horizontal section (light provided by PCB1) and two angled sections (light provided by PCBs 2 and 3) relative to the top horizontal section. And a micro USB connector (provided by PCB4) is positioned at a back of the nail lamp housing. In a specific implementation, PCBs 1-3 provide 42 LEDs, of which 24 are on PCB1, 9 are on PCB2, and 9 are on PCB3.

In a specific implementation, a compact LED nail curing lamp has a sleek design with advanced technology, highly efficient surface-mounted light emitting diode (SMD LED) lights. The lamp provides excellent results producing high gloss finish and even curing of nail polish (e.g., UV-curable gel polish). A specific implementation of a compact LED nail curing lamp is the SMD LED Lamp S2 product by LeChat Nail Care Products of Hercules, Calif.

The compact LED nail curing lamp has a micro USB port, which is convenient to use. The user can power this SMD LED lamp (e.g., LeChat's LED Lamp S2 product) using a wall adapter (included), car charger (optional), laptop USB port, or mobile power bank for ultimate portability. In an implementation, a mobile power bank battery that can be used with the SMD LED Lamp S2 product is the LeChat Mobile Power™ battery pack by LeChat Nail Care Products. This product is approved by the Underwriters Laboratories. The packaging of the product can include the certification "UL Approved." The product is also compliant with U.S. and international standards of the Restriction of Hazardous Substances Directive (RoHS) for environmental friendly products.

In a specific implementation, the lamp has a large, illuminated single-button that turns the lamp on for a preset cure time of 30 seconds for efficient, rapid LED/UV gel curing. The compact design saves space and allows for portability that is convenient for travel and pedicure applications. The lamp is lightweight and designed for carrying from place to place. The nail lamp includes professional durable materials that are long lasting and reliable.

In a specific implementation, the nail lamp is a 6-Watt LED lamp that includes forty-two SMD LED lights that provide evenly distributed light that allows for an efficient cure in about 30 seconds.

An SMD LED is mounted and soldered into a circuit board. Compared to a standard LED, an SMD LED is small in size since it has no leads or surrounding packaging that a standard LED has. A SMD LED does not have the standard LED epoxy enclosure, and thus, SMD LED lights emit a much wider viewing angle instead of the focused, narrow light of the standard LED.

SMD LEDs provide advantages over standard LEDs. The SMD LED has lower voltage and current requirements which allows it to give off very little heat. SMD LEDs emit a higher level of brightness while consuming less power than standard LEDs. With standard LEDs, the UV light produced to cure UV gels over time breaks down the epoxy surrounding the standard LED causing the epoxy to crack. Once cracked, the standard LED no longer flows evenly, which disrupts the transmission of light, resulting in an uneven cure. In contrast, SMD LEDs have no epoxy that surrounds it, and thus, will not crack. The resulting emission of light will be even throughout the lifetime of the light. Further, standard LEDs use a higher voltage and therefore, produce more heat. The heat produced by the higher voltage LED lights can shorten the life of the standard LED, which causes them to go out faster compared to SMD LEDs.

In a specific implementation, the SMD LED Lamp S2 product is a nail lamp having a 6-Watt LED lamp with an output voltage of 5 volts and 1.2 amps. The lamp includes 42 SMD LED lights. A width of the lamp is about 103.5 millimeters. A length of the lamp is about 146.5 millimeters. A height of the lamp is about 56 millimeters. In an implementation, the nail lamp product is part of a kit which includes a universal AC adapter. The adapter has an input power of about 100 volts to about 200 volts at 50 or 60 hertz. The adaptor has an output power of about 12 volts at 1.2 amps. The kit also includes a user guide or manual which includes operating instructions, safety warranty, product specifications, a certificate of warranty, and a warranty registration card.

To use the SMD LED Lamp S2 product, a user can follow the following instructions (which are included on the user manual):

1. Plug the power adaptor into the back of the SMD LED lamp and then plug the other end into a wall outlet, a car outlet, a computer, or a mobile power bank.

2. To turn the SMD LED lamp "on," press the power button that is located on top of the lamp to the "on" position, where the LED light of the button lights up. The lamp will automatically shut off after 30 seconds.

3. The SMD LED lamp can be used with both fingernails and toenails. For toenails, the user can place the lamp over toes and perform steps 1 and 2 above.

The user should follow the following safety precautions when using the SMD LED lamp product. These precautions are included on the user guide as part of the kit.

1. Never look directly into the LED/UV lights when machine is ON.

2. Do not overexpose the nails or skin under light.

3. Do not use the LED light in or around water.

4. Unplug the LED light when not being used.

5. Certain cosmetics or prescriptive lotions can cause sensitivity to LED light. Do not use lamp if using any.

6. Do not pull the cord to unplug. Instead, grab plug firmly and pull to unplug.

7. Do not use any corrosive sanitizer, solvents, thinners, or scrubbing to clean the machine.

8. Do not stack anything on top of the LED Lamp.

9. Do not disassemble the LED Lamp. This will void the Warranty.

10. Do not try to repair the machine. Please contact the distributor for service.

11. The plastic bag in packaging is a choking hazard. Do not place over head. Keep away from children and pets.

12. The electric power system is labeled on the box. Please pay attention to the voltage and frequency.

Figure 14:
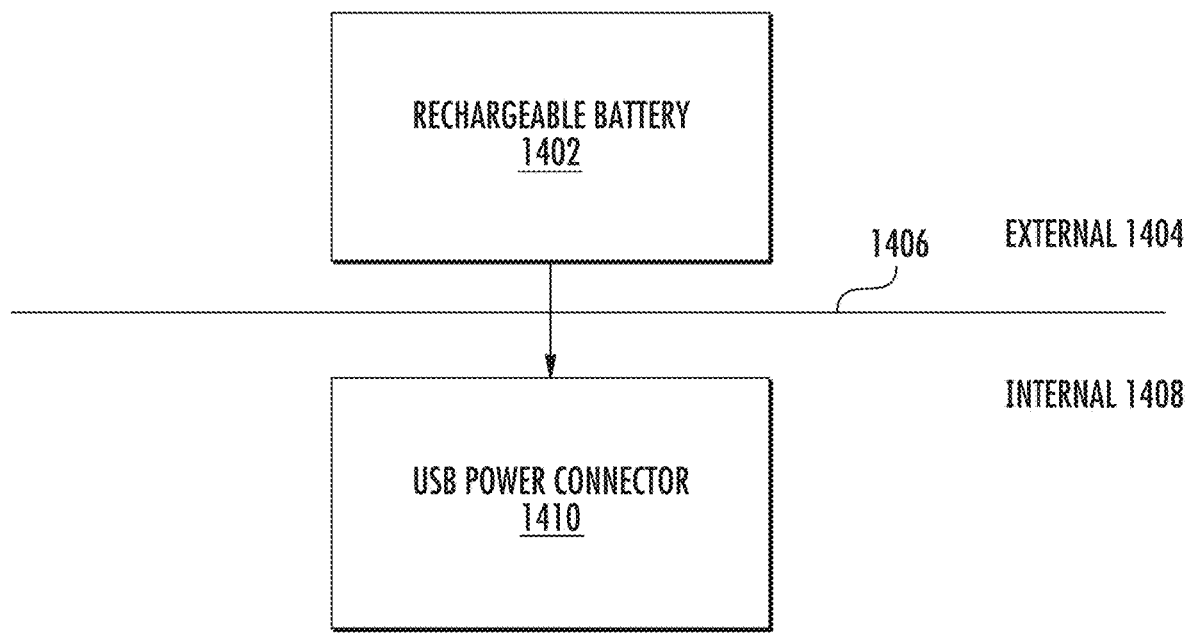
FIG. 14 shows a block diagram of a specific implementation of a nail lamp with an external rechargeable battery.

FIG. 14 shows a block diagram of a specific implementation of a nail lamp that is adapted to be used with a rechargeable battery pack 1402 that is external 1404 to the housing 1406 of the nail lamp. The rechargeable battery is a unit that is separate from the nail lamp. Circuitry to recharge this rechargeable battery pack is contained within (or internal 1408 to) a housing of the rechargeable battery pack. There battery pack (or the nail lamp) may have a battery gauge or charge level indicator that indicates a charge level remaining in the battery. For example, the battery gauge can indicate there 75 percent charge remaining in the battery pack. For example, in an implementation, the display of the nail lamp can display the battery charge level of the battery pack (such as by the user pressing a battery charge level button).

For example, the rechargeable battery is a portable power pack with a USB plug output (e.g., type A USB receptacle). The nail lamp has a USB power connector 1410 (e.g., micro-B USB receptacle) that can connect to the rechargeable battery using a cable. The micro-B USB receptacle of the nail lamp is connected to the type A USB receptacle of the rechargeable battery via a micro USB cable. Then, the battery pack supplies power to the nail lamp (which consumes 6 watts maximum).

In an implementation, the nail lamp consumes 6 watts or less of power. Through the USB, the power adapter or battery can provide about 5 volts and 1.2 amps. In other implementations, the nail lamp consumes 5 watts or less of power (e.g., 5 volts and 1 amp), 4.5 watts or less (e.g., 5 volts and 900 milliamps), or 2.5 watts or less of power (500 milliamps). In another implementation, the nail lamp consumer more than 6 watts, such as 10 watts (e.g., 5.1 volts and 2.1 amps) or 12 watts (5.1 volts and 2.4 amps). With more power, the cavity of the nail lamp can be made larger (allow for more comfort or larger hands), or there can be more LEDs (for more even light coverage), or higher intensity LEDs (possibly for better nail curing), or any combination of these.

Thus the nail lamp and rechargeable battery are a nail lamp system that allow for cordless (e.g., not connected to a wall outlet) and portable use. Users and customers need not rely on being within proximal distance to a wall outlet. In a salon, this can restrict the number of lamps in use, the location of nail lamp stations, and thus, the number of customers that can use the lamps at a given time. With a portable rechargeable nail lamp, salon customers can dry their nails anywhere in the salon, which allows for more customers that can be serviced at a given time, and reduced wait times for customers. Further, a portable rechargeable nail lamp is convenient to use during travel (e.g., on a train or airplane), and in places where there is limited or no access to wall outlets. Users can also save time by drying their nails while doing other tasks that would otherwise had to have been done at other times. For example, while working on a laptop or making phone calls at work, a person can concurrently cure their nails while the nail lamp is running on batteries or connected to their laptop.

Although this application specifically describes the nail lamp as having a micro-B USB receptacle and the battery pack as having a type A USB receptacle, one having ordinary skill in the art understands that other connector types can be used to provide power. For example, some other connectors may be used such as mini-USB connector (e.g., USB mini-B), mini-A, micro-AB, or Apple's lightning connector.

In a specific implementation, a portable external battery pack is the LeChat Mobile Power™. The Mobile Power pack product includes a battery housing having a USB output port, a micro USB input port, an LED power indicator, a power or flashlight button, and an LED light. The Mobile Pack product also includes a cable for connecting the battery housing with a nail lamp (e.g., the SMD LED Lamp S2 product). The cable includes a USB cable, a micro USB connector on one end of the cable, and a USB connector on an opposite end of the cable.

To charge the Mobile Power product, a user can connect the micro USB connector of the cable to the micro USB input port of the external battery housing, and the other USB connector end of the cable to a USB port of a power source including a wall adapter (to a wall outlet), a laptop USB port, a desktop USB port, or a DC 5-volt USB charger. The LED power indicator of the battery pack will flicker to indicate that the external battery has started charging. When all LED power indicator lights are lit, this indicates that the battery is fully charged. In an implementation, there are four battery indicator lights arranged in a row on an external surface of the battery pack.

When the Mobile Power battery pack is fully charged and ready to be used to power an electronic device, the user should first check whether the charging voltage of the digital or electronic device is matched with an output voltage (DC 5 volts) of the external battery. The user can connect the USB connector of the cable to the USB port of the battery pack, and the other micro USB connector end of the cable to a micro USB port of an electronic device such as the SMD LED nail lamp. The can be used as a general mobile power pack, and can be used to power other electronic devices such as a smart phone, tablet device, or any electronic device with a DC 5-volt USB input.

A number of the battery LED power indicator lights will light according to the remaining charge capacity of the battery pack. In a specific implementation, there are four indicator lights (L1-L4) in a row with L1 on a left end, L2 to the right of L1, L3 to the right of L2, and L4 to the right of L3, and on the right end. When L1 is flashing, this indicates that there is about 0 to about 25 percent charge capacity level in the battery. When L1 and L2 are flashing, this indicates that there is about 25 to about 50 percent charge capacity level in the battery. When L1, L2, and L3 are flashing, this indicates that there is about 50 to about 75 percent charge capacity level in the battery. And when L1, L2, L3, and L4 are flashing, this indicates that there is about 75 to about 100 percent charge capacity level in the battery. When the capacity remaining in the battery is less than about 5 percent, the first light (L1) will blink to remind the user to recharge the external battery.

In a specific implementation, the external battery includes a flashlight button for a flashlight function. To activate the flashlight option, the user can double click the flashlight (or power) button on the battery. Brightness of the light will cycle between 10 percent, 50 percent, and 100 percent brightness. The flashlight should not be turned on under hot temperature environments for long periods of time.

In a specific implementation, when the power button is pressed, the LED indicator lights will turn on. These lights will automatically turn off in about 10 seconds for power saving. When needing to charge or power digital or electronic products, the user can simply plug the cable into the external battery device, and it will start charging when it detects the load.

The user should follow the following safety precautions when using the Mobile Power product. These instructions are included in a kit containing the Mobile Power product.

1. Charge fully before using the mobile power device.
2. Do not place or use mobile device at high temperature or in humid environment. Do not expose to excessive sunlight. (Operating temperature range: charging: 0 degrees Celsius to 45 degrees Celsius; discharging: −10 degrees Celsius to about 60 degrees Celsius; and storage environment: about −20 degrees Celsius to about 60 degrees Celsius).
3. The user should not throw the mobile power device in fire or water so as to avoid fire, explosion, or both.
4. Keep the mobile power device out of reach of children.
5. Do not disassemble the device arbitrarily, since in some of the products, there are no removable or maintainable parts that are installed in the product.
6. Do not vigorously shake, hit or impact the mobile power device.
7. If the mobile power device has exposed liquid or other abnormalities, discontinue use, and contact customer service.
8. If the mobile power device has liquid leakage and splashes into the user's eyes, do not rub the eyes, wash with clean water immediately, and go to the hospital for medical treatment.
9. It is normal for the temperature of the mobile power device to rise during use; do not operate in a confined environment.
10. The transmission lines and connectors of the mobile power device must be provided by the original manufacturer. The use of transmission lines or connectors of non-original manufacturer may result in severe or fatal injuries and property losses.
11. Do not cover or block the mobile power device with paper or other objects, to avoid blocking the heat dissipation and cold cutting.
12. Do not use the mobile power device if nobody is watching it in the car or anywhere.
13. Before using mobile power device, check its voltage demand.
14. If the mobile power device is not used for a long period of time, please charge or discharge it once every three months to ensure service life.
15. Remove power supply and power cord when the mobile power device is not in use.
16. Fully charge the mobile power device after the mobile power device is fully discharged.

Figure 15:
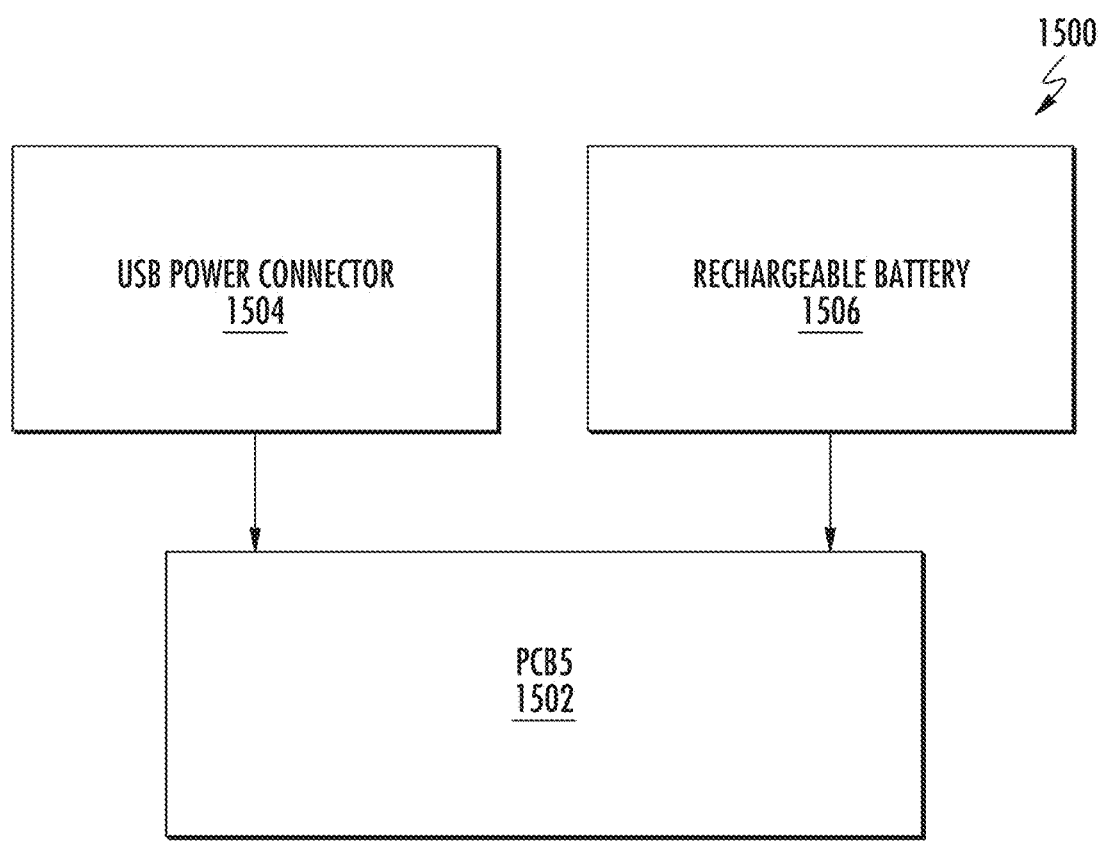
FIG. 15 shows a block diagram of a specific implementation of a nail lamp with an internal rechargeable battery.

FIG. 15 shows a block diagram of a specific implementation of a nail lamp 1500 having a PCB5 1502 that can receive power from a USB power connector 1504 (e.g., micro-B USB receptacle) or rechargeable battery pack 1506. Unlike the FIG. 14 system, the rechargeable battery pack is specifically adapted to connect directly to the nail lamp circuitry (powering the nail lamp) without using the USB power connector. Specifically, power is not provided from the battery pack through the USB power connector, but rather directly from the battery.

Further, the rechargeable battery pack can integrate with the housing of the nail lamp. In an example, the rechargeable battery pack snaps into place into a bottom of the nail lamp via a latching mechanism. And the rechargeable battery pack can be unlatched to be removed and replaced with a new pack, which may be desirable when the pack is spent or no longer holding charge (e.g., at the end of life of the pack).

Figure 16:
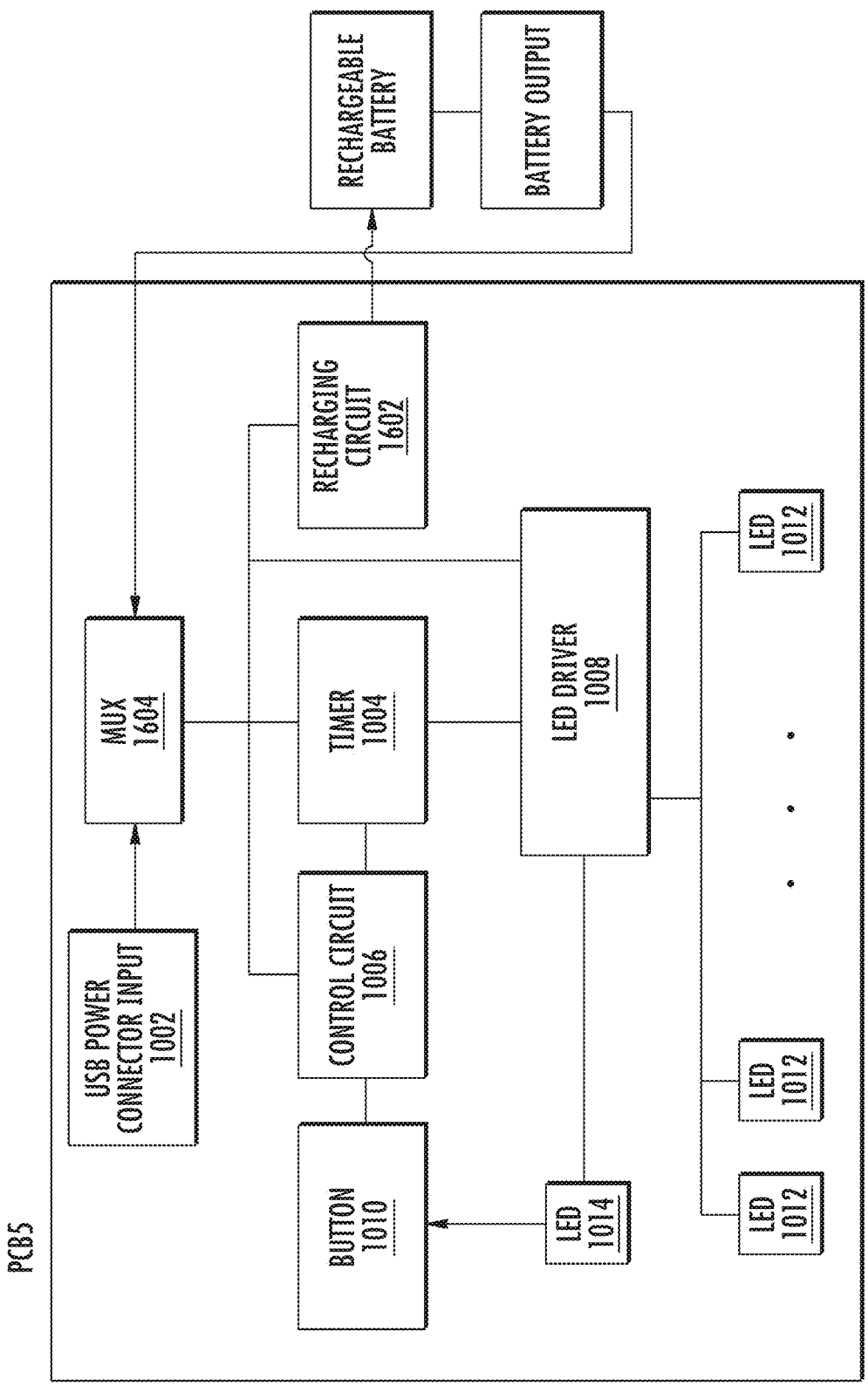
FIG. 16 shows a circuit block diagram of a specific implementation of a printed circuit board with a rechargeable battery circuit.

In an implementation, compared to the FIG. 14 system, circuitry to recharge this rechargeable battery pack is contained within a housing of the nail lamp (e.g., PCB5 of the nail lamp). Referring to FIG. 16, PCB5 is similar to PCB1 as described previously, but includes a recharging circuit 1602 and other circuitry to multiplex 1604 (mux), switch, or other switching mechanism to switch between taking power from the USB power connector or the rechargeable battery pack.

Power from the USB power connector (such as connected to a wall adapter or other power source) can be used to power the nail lamp and also recharge (via the recharging circuit) the rechargeable battery too.

Figure 17:
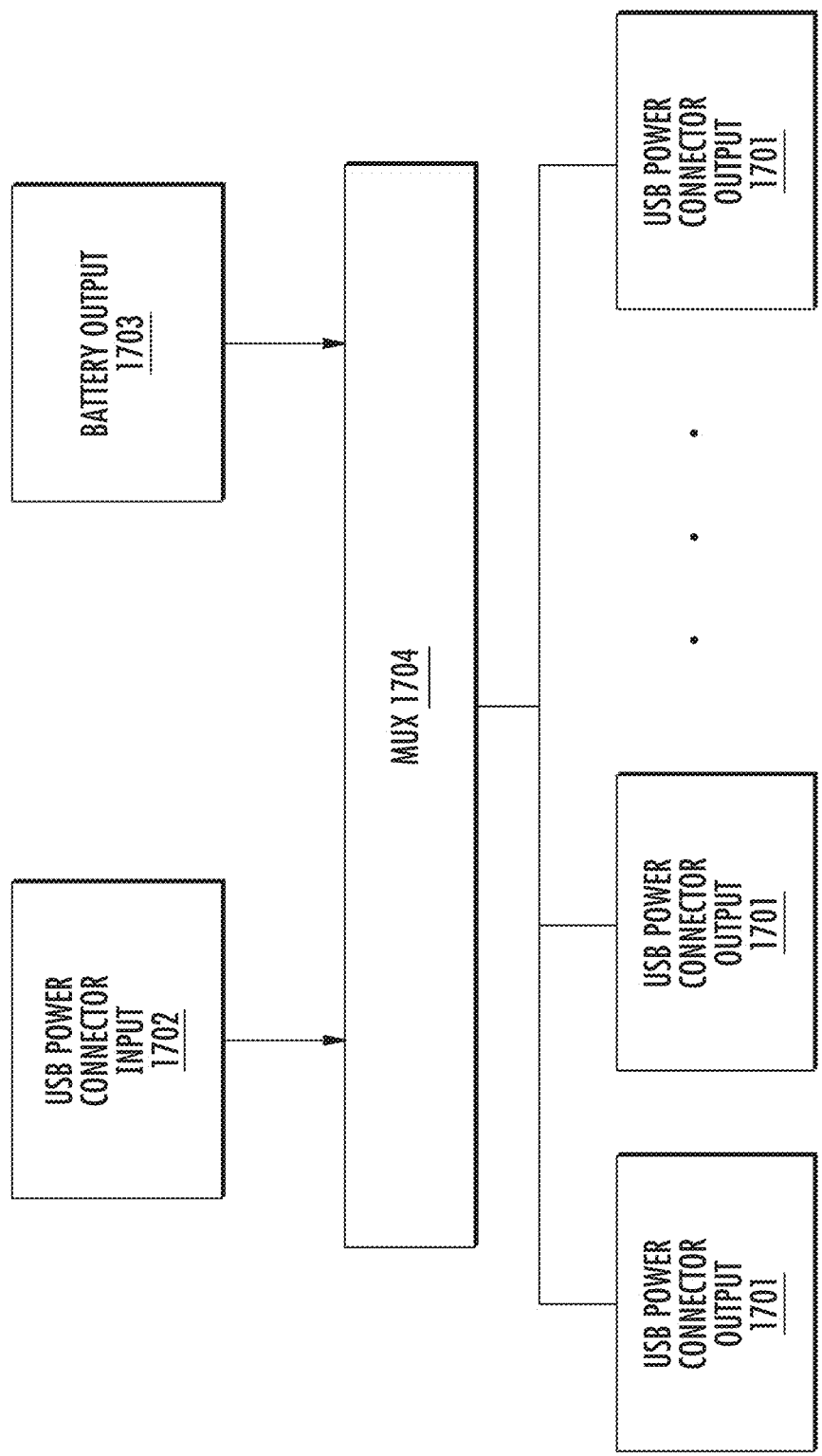
FIG. 17 shows a circuit block diagram of a specific implementation of a multiplexer that provides power to at least one USB power connector outputs.

FIG. 17 shows an implementation where the nail lamp of FIG. 16 includes one or more USB power output connectors 1701. These connectors can be used to charge a user's or customer's device, such as a phone or tablet. The user or customer will connect their device (e.g., phone) via a cable to one power output connectors. The device will be charged from the power from the USB power connector input 1702 or the battery 1703 through a mux 1704 or switch. Typically when the USB power input is connected to power, this power is used to charge the user's device (and also the rechargeable battery pack of the nail lamp). When the USB power input is not connected to power, the user's device is charged by the nail lamp battery.

Figure 18:
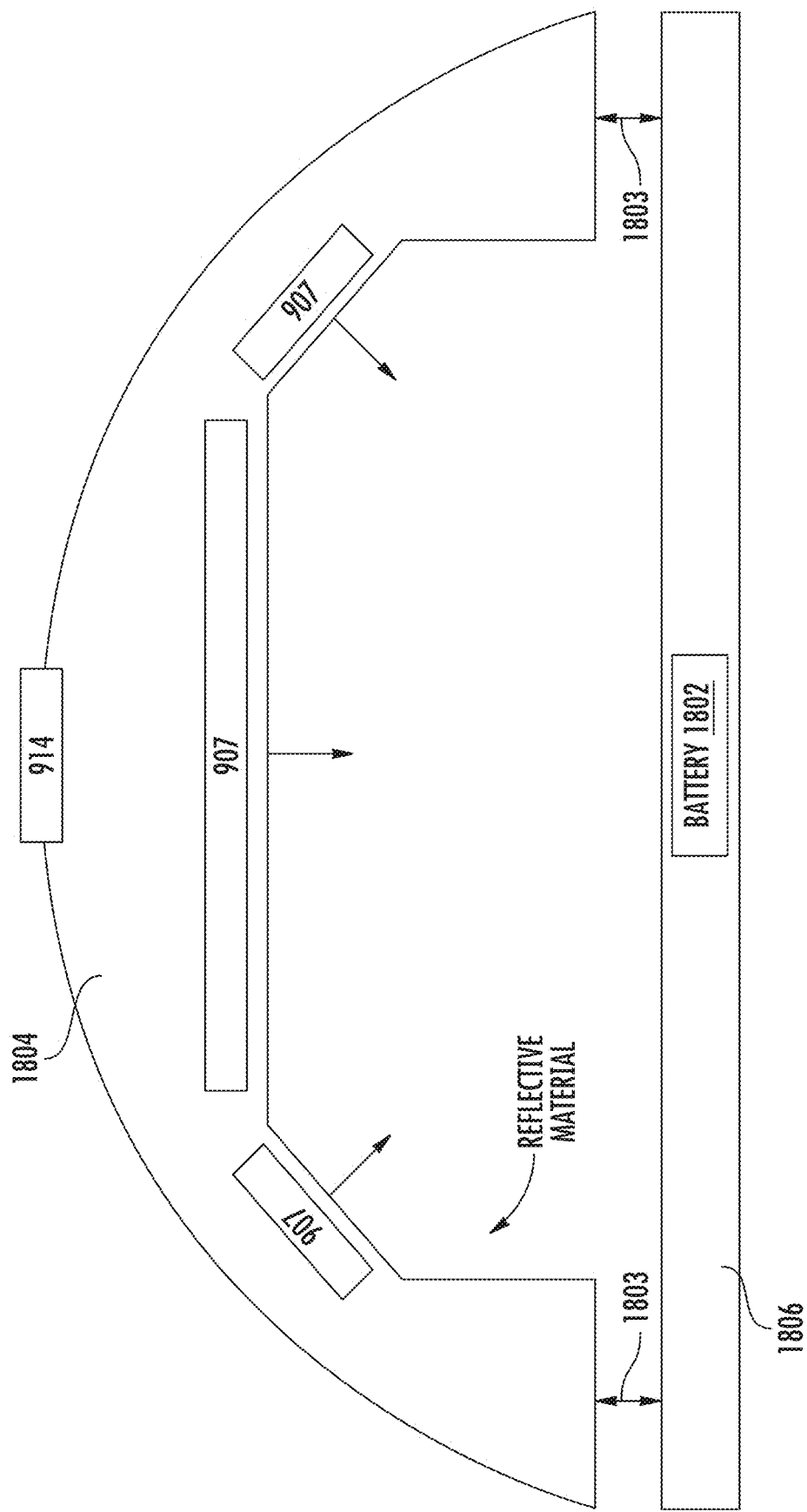
FIG. 18 shows a block diagram of a specific implementation of a nail lamp that is adapted to fit with an external battery pack.
Figure 19:
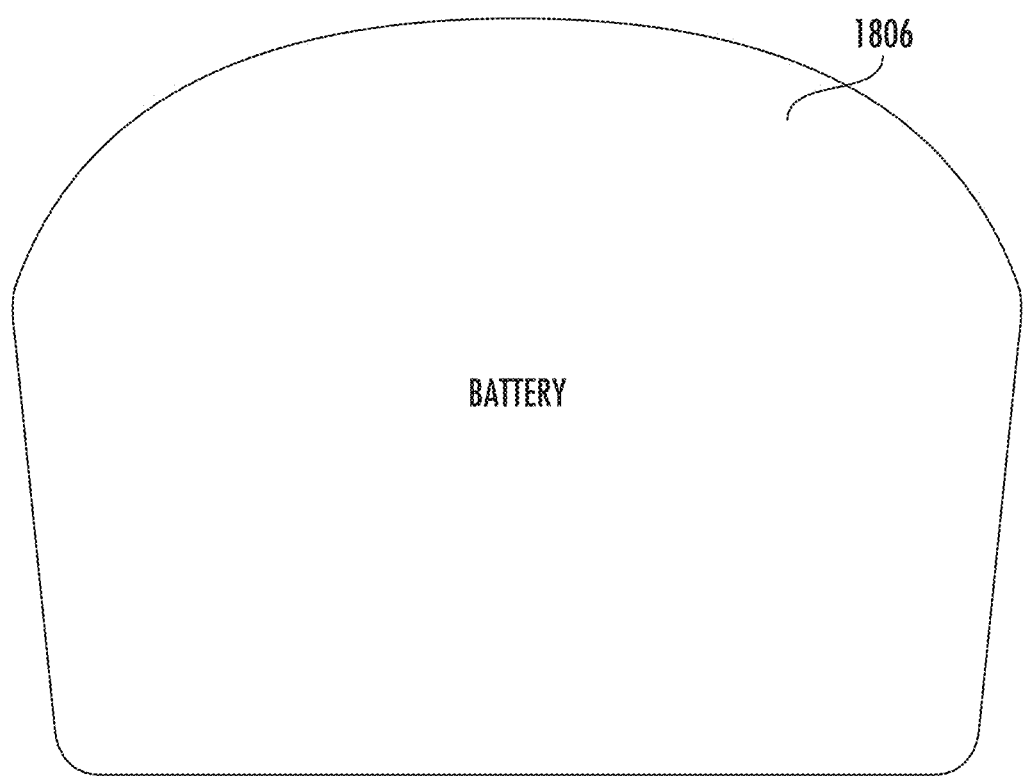
FIG. 19 shows a specific implementation of an external rechargeable battery pack that is designed for a nail lamp

FIG. 18 shows an example of a rechargeable battery pack 1802 that can be connected 1803 to the housing of nail lamp 1804. In this implementation, the battery is contained within a base plate 1806 of the nail lamp. When the nail lamp is used, the user or customer places their fingers (that will be exposed to the UV light) onto the battery pack base plate. The battery pack base plate snaps or latches into place in the housing of the nail lamp. FIG. 19 shows an outline of a plan view of the battery pack base plate.

More specifically, referring to FIG. 18, the rechargeable battery pack connects to the nail lamp at one or more connection points via connectors. For example, the nail lamp has a connector for connecting to the external rechargeable battery pack which the nail lamp is designed for. In a specific implementation, the nail lamp has a female connector while the external rechargeable battery pack has a corresponding male connector that fits into the nail lamp's connector. In another specific implementation, the nail lamp includes a male connector that fits into the external rechargeable battery pack's female connector. In other implementations, however, the nail lamp's connector can have any number or combination of pins and shapes in order to interface with the external rechargeable battery pack that the nail lamp is designed for.

In a specific implementation, the nail lamp can include a fastening member that fastens to the external rechargeable battery pack to ensure a tight fit. As an example, the nail lamp can include a latch to secure the lamp to the battery.

In another specific implementation, when the external rechargeable battery pack is connected to the nail lamp, the nail lamp looks for an authentication or handshaking signal (e.g., sending of an authentication code). If the lamp does not receive the proper authentication, the lamp may display a signal (e.g., flashing lights) that the battery is not an authorized peripheral for the lamp or the lamp can simply not allow the lamp circuitry to interface with the battery (e.g., not allow charging). An authentication circuit can be included in the circuitry of the lamp to provide proper authentication to the nail lamp.

FIG. 19 shows a specific implementation an outline of a plan view of the battery pack base plate 1806 that is designed for a nail lamp. In an implementation, the nail lamp is the SMD LED Lamp S2 product by LeChat Nail Care Products. The shape of the external rechargeable battery pack corresponds to the shape of a base of the nail lamp, which connects to the external rechargeable battery pack. The shape of the external rechargeable battery pack allows a user to align the battery with the shape of the nail lamp base for connecting the two portions together. When connected, where the lamp and battery portions meet, the exterior surfaces become flush with each other. There will be a seam that is between the nail lamp and the battery pack. At the seam, the surfaces of the lamp and battery are relatively flush with each other. The seam line remains visible and can be felt tactilely.

The battery pack base plate can have a finger plate integrated with the plate. In an implementation, the finger plate is removable from the base plate to allow for replacement or cleaning between uses. More discussion on a finger plate is in U.S. patent application 62/002,763, which is incorporated by reference.

Figure 20:
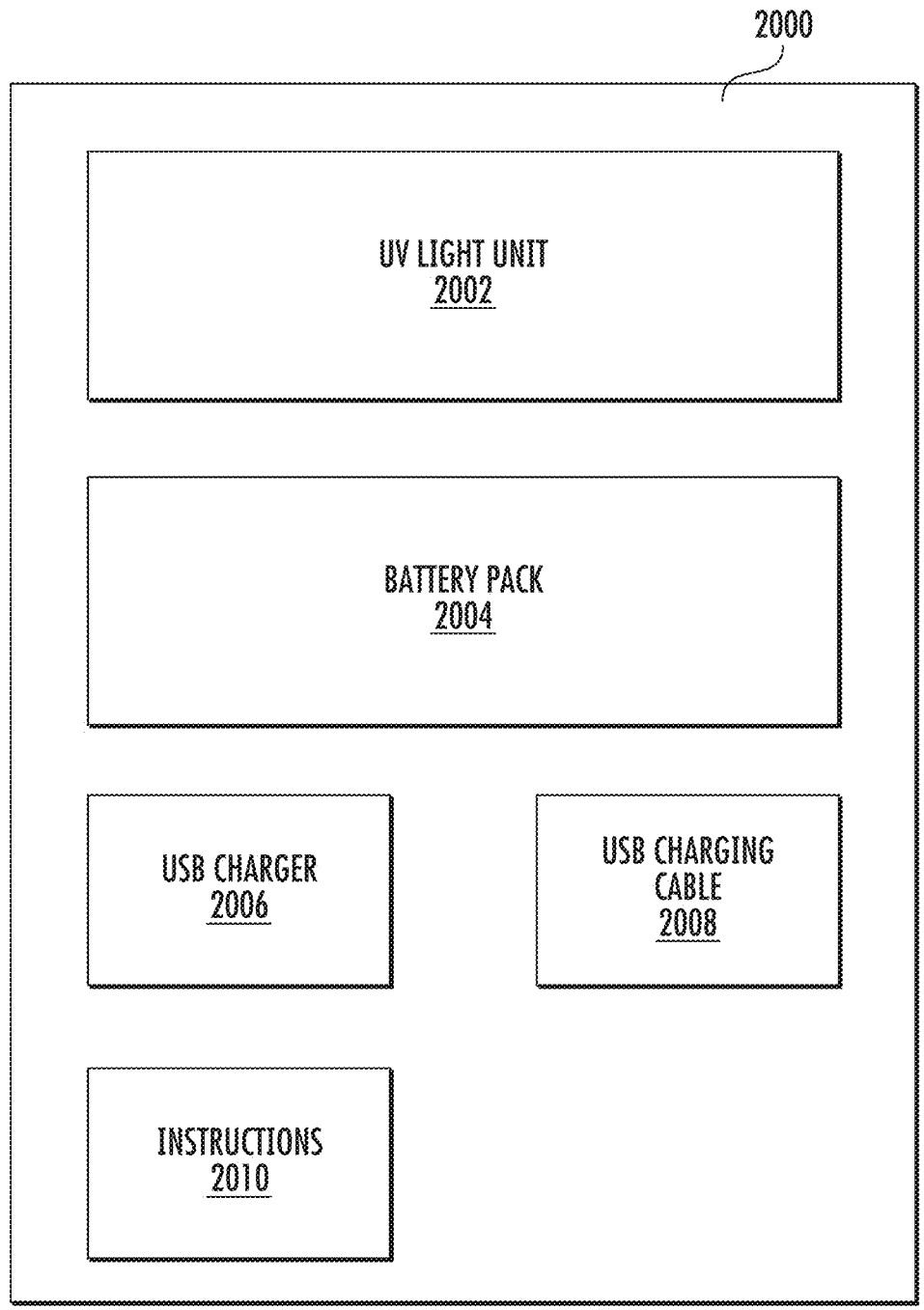
FIG. 20 shows a block diagram of a specific implementation of a kit for a nail lamp.

FIG. 20 shows a block diagram of a specific implementation of a kit 2000 for a nail lamp. The kit includes a UV light unit 2002, a battery pack 2004, a USB charger 2006, a USB charging cable 2008, and a user guide 2010 or instructions on use. These components can be arranged in a packaging of the kit which can include a box. In an implementation, the box can have compartments or trays for holding the components in place within the box.

For example, one kit implementation is the system described in connection with FIG. 14 above. This kit has the battery pack connecting to the lamp with the USB connector input, and also the recharging circuitry is contained within the battery pack housing.

Another kit implementation is the system described in connection with FIGS. 15-19 above. This kit has the battery pack directly connecting to the lamp, rather than through the USB connector input. The recharging circuitry is contained within the nail lamp housing.

Figure 21:
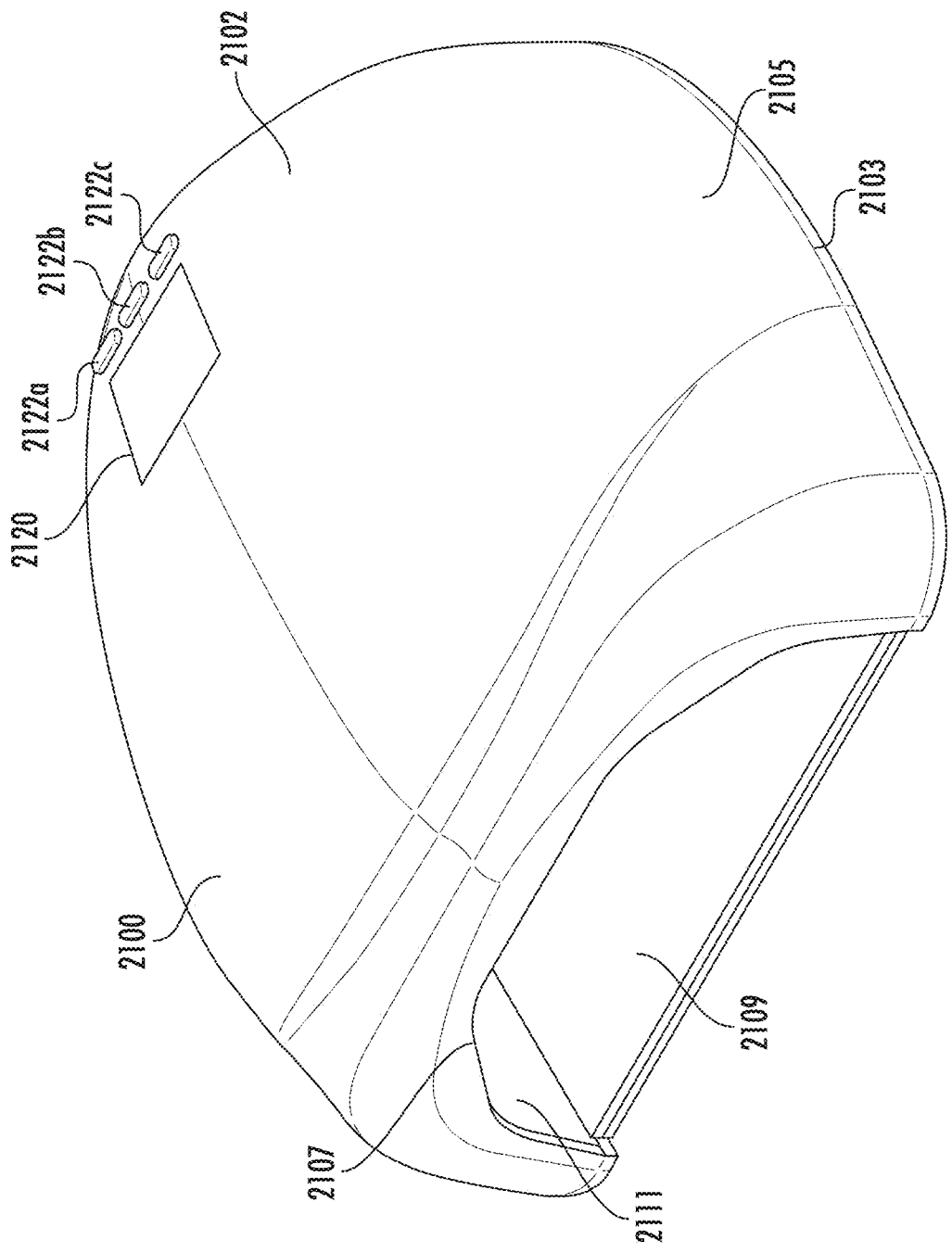
FIG. 21 shows a perspective view of a nail lamp.
Figure 23:
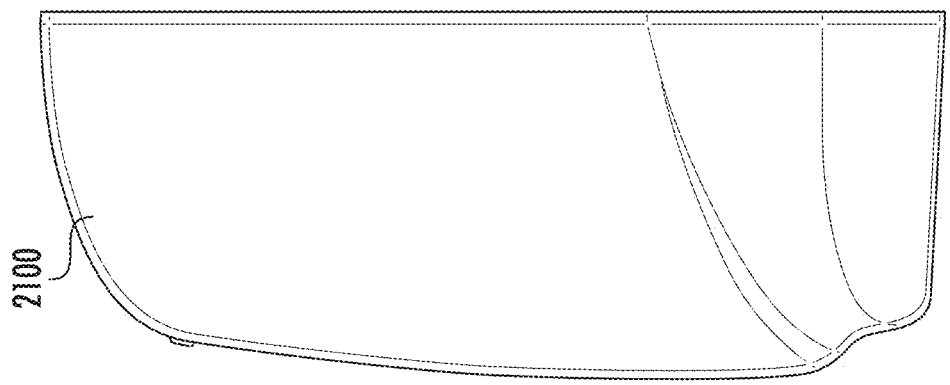
FIG. 23 shows a side view of a nail lamp.
Figure 22:
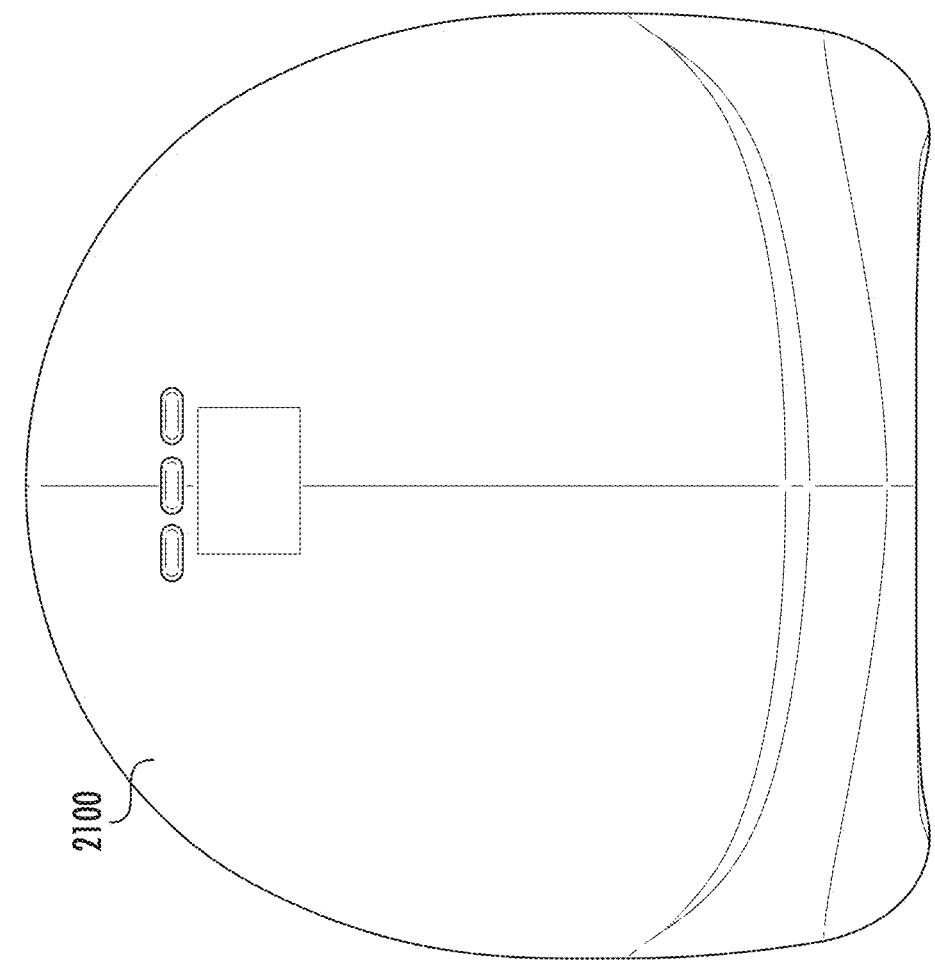
FIG. 22 shows a top view of a nail lamp.

FIG. 21-23 show views of another implementation of a nail lamp 2100. FIG. 21 shows a perspective view, FIG. 22 shows a top view, and FIG. 23 shows a right side view.

The nail lamp device has an exterior surface and at one side, an opening through which a user can place their hand into an interior space of the nail lamp. There are controls on the exterior that are used to turn on an interior lighting source of the device, which exposes the interior space to light from the interior lighting source. As an example, a user can insert their fingers into the interior space, turn on the cure interior lighting source, and cure their UV nail polish or UV nail gel coated nails with the interior light.

In an implementation, the device includes sensors that detect when a hand is present inside the unit. This turns on both the interior curing lights as well as the exterior glowing lights for an allotted time (e.g., turning off after 15, 30, or 60 seconds). The light can also be manually turned on or off with, for example, button controls as an additional convenience.

In an implementation, there is also an exterior lighting source of the device, which also turns on in response to the controls and is on when the interior lighting source is on. Light from the exterior lighting source is visible through a translucent shell (e.g., translucent plastic) of the exterior of the device. The translucent shell can be clear material or a light-diffusing material. When the interior lighting source is off, the light from the exterior lighting source will also be off. The exterior lighting source is used as an indicator that the device is on—that the interior lighting source is on. The entire exterior surface of the device can be lighted when on.

This exterior lighting feature will make it easier for the user to know that the light is on and the curing cycle is continuing. The user will be able to see the exterior light is on from many positions and many angles, especially compared to attempting to peek into the opening (which will be partially blocked by a hand) and trying to see whether the interior lighting source is on. And the interior lighting source may not be visible light.

In an implementation, on the exterior, there is a digital display. The display shows a length time in digits that the light will be turned on for. Further, the display can be a count down (or count up) timer that shows the time remaining for the light to be on. The digital display is optional and can be omitted in some implementations.

More specifically, the nail lamp includes a housing 2102. The housing includes a base 2103 and an outer cover 2105. On a front side of the housing, there is an opening 2107 to a space (or cavity) within the housing. The space within the housing is defined by inner surfaces of the housing including a platform 2109, an inner side wall 2111, and an inner roof (not visible). The inner surfaces of the inside of the housing can be made of metal, plastic, or a combination of these. In an implementation, the opening is shaped and sized to allow a user's hand to pass through the opening into the space within the housing. The user's hand can be positioned within a cavity formed by the space, surrounded by the inner surfaces of the housing. In another implementation, the opening is adapted to allow a foot to pass through the opening. In another implementation, the nail lamp is adapted to be used for both a hand and foot.

The outer cover of the housing includes a screen or display 2120 and controls, which in an implementation, are button features 2122a, 2122b, and 2122c. The screen may be an LED-backlit liquid crystal display (LCD) to display to a user a status or parameter of the nail lamp such as a time elapsed or a time remaining for a particular cure setting of the lamp. The display can also indicate other parameters of the lamp such as a power setting (e.g., "ON," "OFF," "LOW," "HIGH," or other messages). The screen can display images such as words, digits, 7-segment displays, meters, and others.

The button features can indicate various cure settings of the nail lamp. Each button can be associated with a certain time of curing. For example, a first button can indicate a first timer setting for a first interval of time (e.g., 15 seconds). When a user selects the first timer setting by pushing the first button, an LED light source of the lamp will turn on for a time of 15 seconds of curing. A second button can indicate a second timer setting for a second interval of time (e.g., 30 seconds), and a third button can indicate a third timer setting for a third interval of time (e.g., 60 seconds). In other implementations, there can be fewer buttons (e.g., 1 or 2 buttons) or more than 3 buttons (e.g., 4, 5, or 6, or greater).

Figure 24:
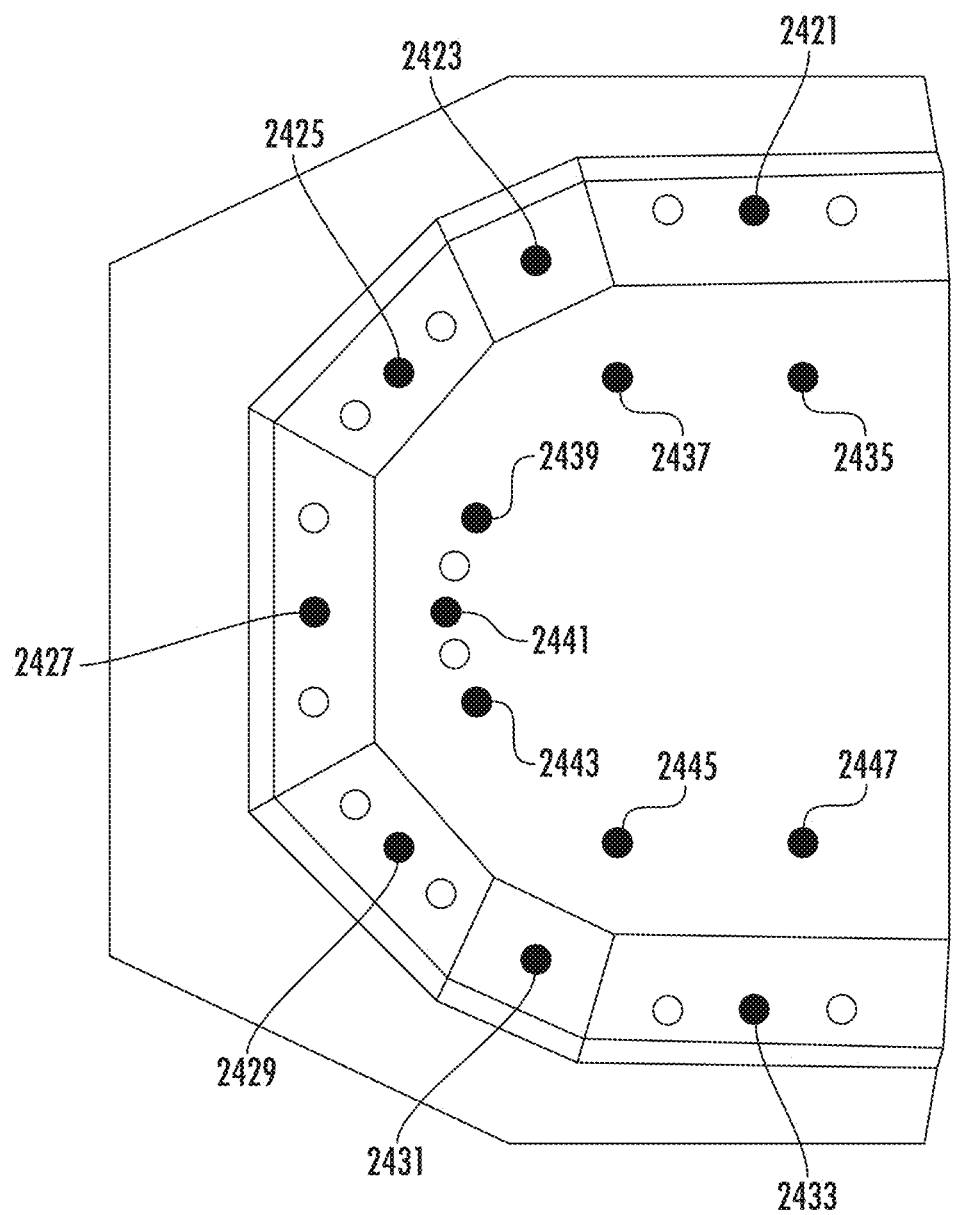
FIG. 24 shows an arrangement of LED lights on an inside of a nail lamp.

FIG. 24 shows a view of an inside of a housing of a nail lamp, as viewed from a lower surface of the interior space looking toward the upper surface (e.g., inner roof). Side surfaces or side surfaces are angled with respect to the lower surface.

The upper surface and side surfaces include a number of light source structures as shown. In an implementation, the light source structures are surface mounted light emitting diodes (LEDs). The LEDs can be referred to a surface mounted devices or SMDs. The LEDs are surface mounted to one or more printed circuit boards that housed within the device's enclosure, between surfaces of the interior space and exterior shell of the device. In other implementation, light sources can include other types of LEDs (other than SMDs), laser diodes, light bulbs, or other lighting.

Some light source structures can be different from other light source structures. For example, first light structures 2421, 2423, 2425, 2427, 2429, 2431, 2433, 2435, 2437, 2439, 2441, 2443, 2445, and 2447 are different from the other light structures, which can be referred to as second light structures. In an implementation, the first light structures have higher energy output than the first light structures. For example, the first light structures can be 2-watt LEDs, while the second light structures are 1-watt LEDs.

The light sources can include lights of the same or different output power and wavelength. In the specific arrangement of lights in FIG. 24, LED lights are positioned on the side walls and roof of the inside of the housing. There are seven side walls connected to the roof. The shaded LED lights (2421, 2423, 2425, 2427, 2429, 2431, 2433, 2435, 2437, 2439, 2441, 2443, 2445, and 2447) indicate 2-Watt output LEDs, while the remaining unshaded LED lights are 1-Watt output LEDs. Generally, on side walls of the housing, each 2-Watt LED is positioned between two 1-Watt LEDs. This distribution of LEDs can provide each nail of a user's hand (or foot) with an even exposure of light since a 2-Watt LED is positioned near each nail, as shown in FIG. 18. In other implementations, the LEDs can be arranged in another arrangement, such as an alternating pattern.

On the inner roof of the housing, there is a combination of 2-Watt and 1-Watt LED lights. The 2-Watt LEDs can be arranged to correspond to a user's nails, so that a 2-Watt LED is near each nail. For example, when the user's left hand is inserted into a cavity of the housing, as shown in FIG. 18, each nail of the hand is irradiated by at least two nearby 2-Watt LEDs. Referring to FIG. 24, with the user's hand placed in the cavity, each nail is irradiated by at least one nearby sidewall LED and one nearby inner roof LED. Table B below shows how each nail is irradiated for both right and left hands of the user.

TABLE B

| | Right Hand | | | Left Hand | |
| --- | --- | --- | --- | --- | --- |
| Finger | Sidewall LED | Roof LED | Finger | Sidewall LED | Roof LED |
| Thumb nail | 2421 | 2435 | Thumb nail | 2433 | 2447 |
| Index nail | 2425 | 2439 | Index nail | 2429 | 2443 |
| Middle nail | 2427 | 2441 | Middle nail | 2427 | 2441 |
| Ring nail | 2429 | 2443 | Ring nail | 2425 | 2439 |
| Little nail | 2431 | 2445 | Little nail | 2423 | 2437 |

Each nail is also irradiated by at least two 1-Watt LEDs. For example, when the left hand is placed in the cavity, the thumbnail is irradiated by 2-Watt LEDs 2421 and 2437, and by the two 1-Watt LEDs surrounding LED 2421. The index fingernail is irradiated by 2-Watt LEDs 2425 and 2439, and by two 1-Watt LEDs between LEDs 2425 and 2427, and between LEDs 2439 and 2441.

Figure 25:
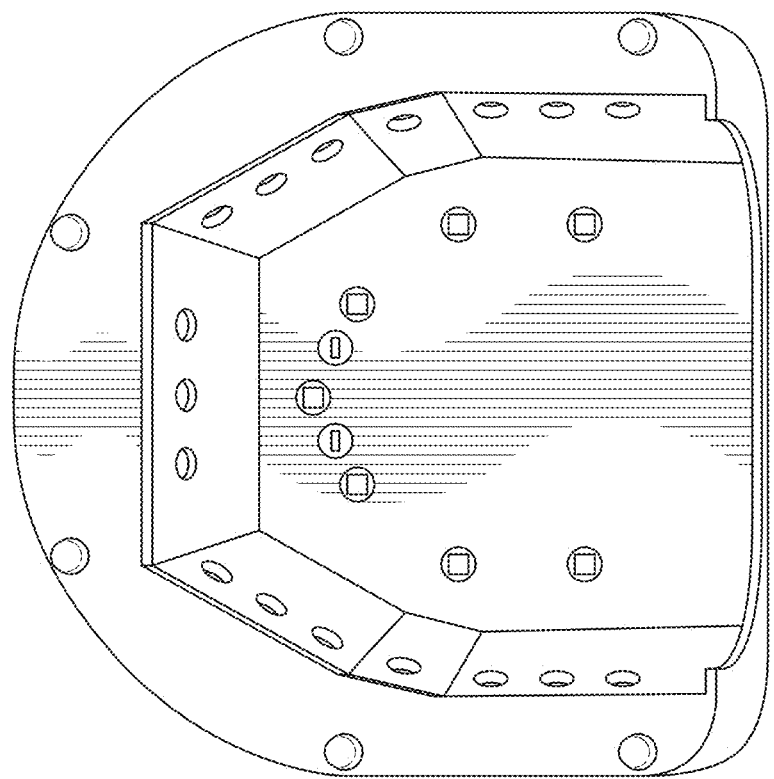
FIG. 25 shows an arrangement of LED lights on walls and roof on an inside of a nail lamp.

FIG. 25 shows an inside view of a housing of a nail lamp in relief. Light sources are positioned along sidewalls and inner roof of the housing. The side walls and roof include openings or apertures to expose a light source, which can be positioned in or behind the opening. Light from the light source radiates through the opening and into the space provided by the housing.

By using surface mounted LEDs, the LEDs are recessed in openings of the enclosure. This is in comparison to other not-surface-mounted types of LEDs that have a bulb-portion that extend through the openings. Also in some implementations, the LEDs can be flush with the enclosure surface.

Figure 26:
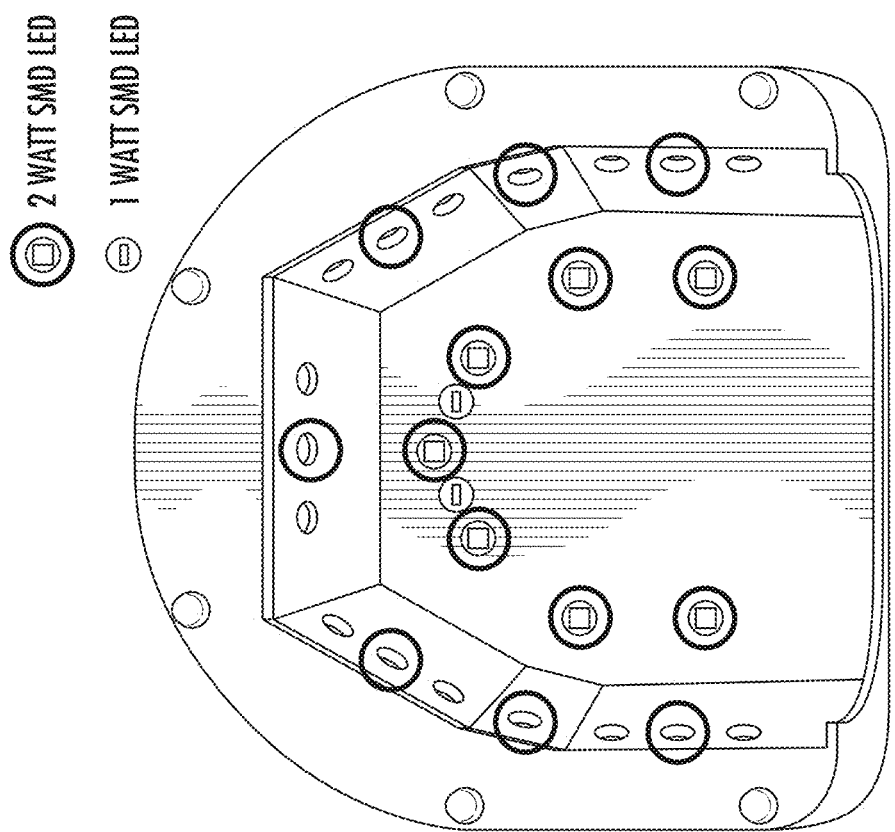
FIG. 26 shows an arrangement of surface mounted device (SMD) LED lights on walls and roof on an inside of a nail lamp.

FIG. 26 shows specific arrangement of LED lights on sidewalls and inner roof of a housing. The LEDs that are circled are 2-Watt LEDs using surface mount technology (SMT). These LEDs are referred to as surface mount devices (SMD) LEDs. The LEDs that are not circled, that are positioned between the 2-Watt LEDs, are 1-Watt SMD LEDs.

In an implementation, a SMD LED can produce UV light in a range of about 340 nanometers to about 410 nanometers. In a specific implementation, the SMD LEDs can produce UV light at about 395 nanometers peak irradiance. In another specific implementation, the SMD LEDs can produce UV light at about 350 nanometers. In another specific implementation, the SMD LEDs can produce UV light at about 365 nanometers.

Figure 27:
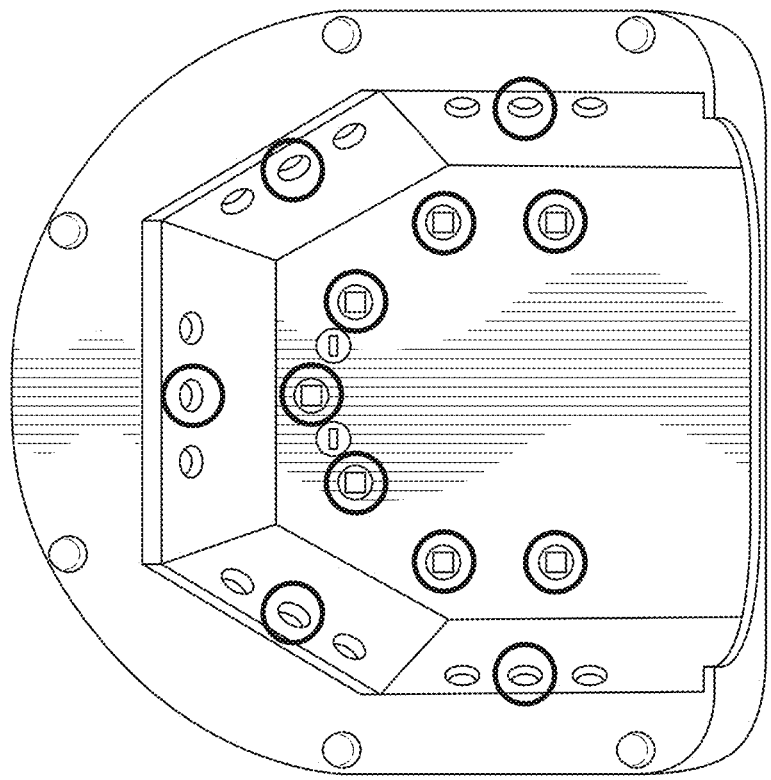
FIG. 27 shows an arrangement of LED lights on an inside of a nail lamp with five side walls.

FIG. 27 shows a specific arrangement of LED lights on sidewalls and inner roof of a housing with five inner sidewalls of the housing. The configuration of LED lights in FIG. 27 is slightly different from that shown in FIGS. 24, 25, and 26. There are two fewer LEDs than the other configurations. The circled LEDs indicate 2-Watt SMD LEDs, and the uncircled LEDs indicate 1-Watt SMD LEDs. For each sidewall, one 2-Watt LED is positioned between two 1-Watt LEDs.

Figure 28:
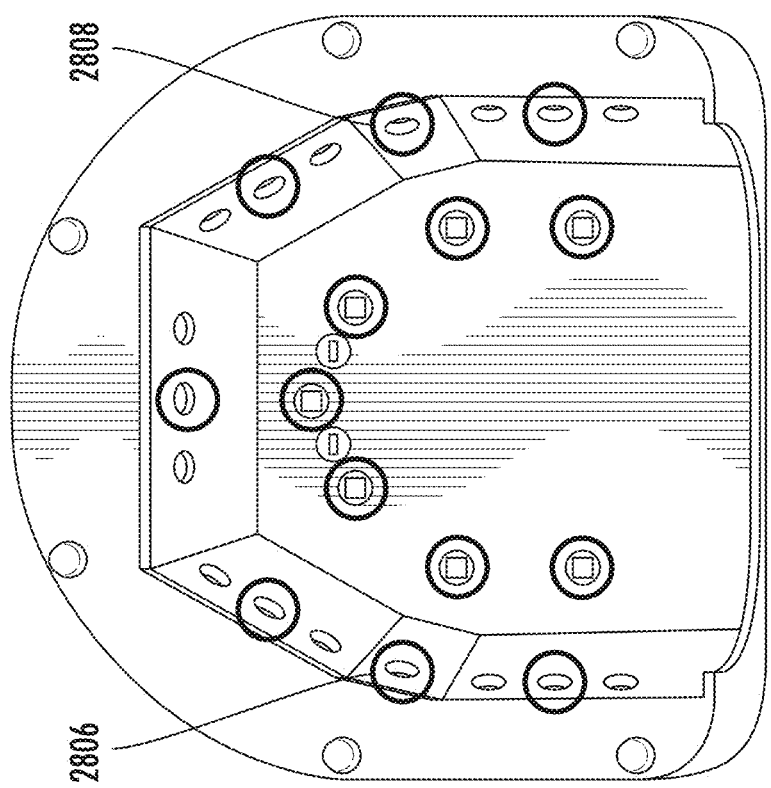
FIG. 28 shows an arrangement of LED lights on an inside of a nail lamp with seven side walls.

FIG. 28 shows a specific arrangement of SMD LED lights on sidewalls and inner roof of a housing with seven inner sidewalls of the housing. Compared to the arrangement in FIG. 7, this housing includes 2 additional sidewalls, each with a 2-Watt LED 2806 and 2808. So, the arrangement in FIG. 7 has five 2-Watt LEDs on sidewalls, while this arrangement includes seven 2-Watt LEDs positioned on sidewalls. The arrangement with two additional LEDs can increase the cost of the device, but provides the irradiation for curing, which can reduce curing time and improve a uniformity of the curing.

Figure 29:
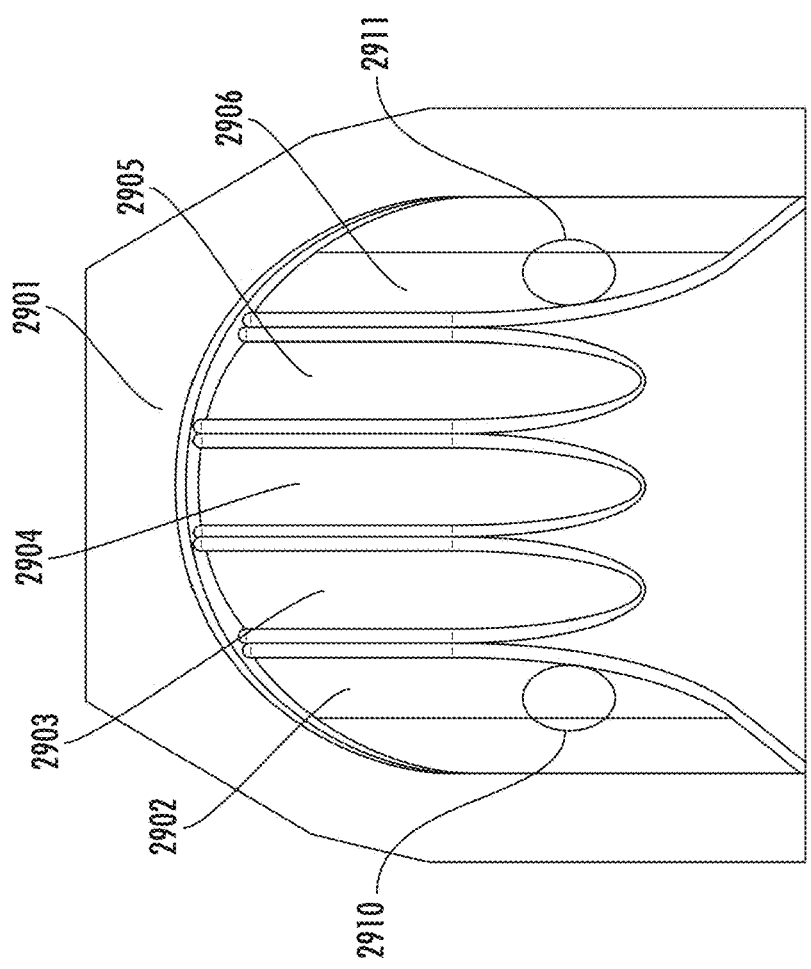
FIG. 29 shows a top view of a finger plate on an inside of a nail lamp.

FIG. 29 shows a top view of a finger plate 2901. The finger plate is placed onto the lower surface of the interior space of a nail lamp. The finger plate is a guide for the fingers, so the fingers will be properly positioned inside the nail lamp. The user places the fingers on the finger plate, and the nails are held in position for exposure to the curing light. The finger plate can be removable (e.g., sliding out from a bottom of the lamp), such as for cleaning or so other finger plates can be used for different sized fingers. The finger plate is designed for the right or left hand, but in other implementations, there may be a specific finger plate design for each hand.

The finger plate includes five side by side depressions or grooves that are adapted to support a user's fingers when the user places a hand inside the housing on the plate. A first depression 2902 can be a sloped surface (or indentation, groove, or recess) for supporting the user's thumb or little finger. A second depression 2903 can be a groove (or indentation or recess) for supporting the user's index or ring finger. A third depression 2904 can be a groove (or indentation or recess) for supporting the user's middle finger. A fourth depression 2905 can be a groove (or indentation or recess) for supporting the user's index or ring finger. A fifth depression 2906 can be a sloped surface (or groove, indentation, or recess) for supporting the user's thumb or little finger.

The finger plate can include thumb guides 2910 and 2911 that include circular grooves in the finger plate. The circular groove can provide a tactile guide for the user to place the thumb when the user inserts the hand into the housing. The thumb guide allows the user to keep the hand in the same position through the curing so that the nails cure evenly and without smudging.

In an implementation, the finger plate is removable from the housing. Different finger plates can be used for users with different size hands. The finger plate can also be removed to facilitate cleaning of the plate and of the inside of the housing. In salons, the plate can be removed between uses to sterilize the plate for a new user. The finger plate can also be replaced with a foot plate for curing polish on a person's foot for a pedicure.

Figure 30:
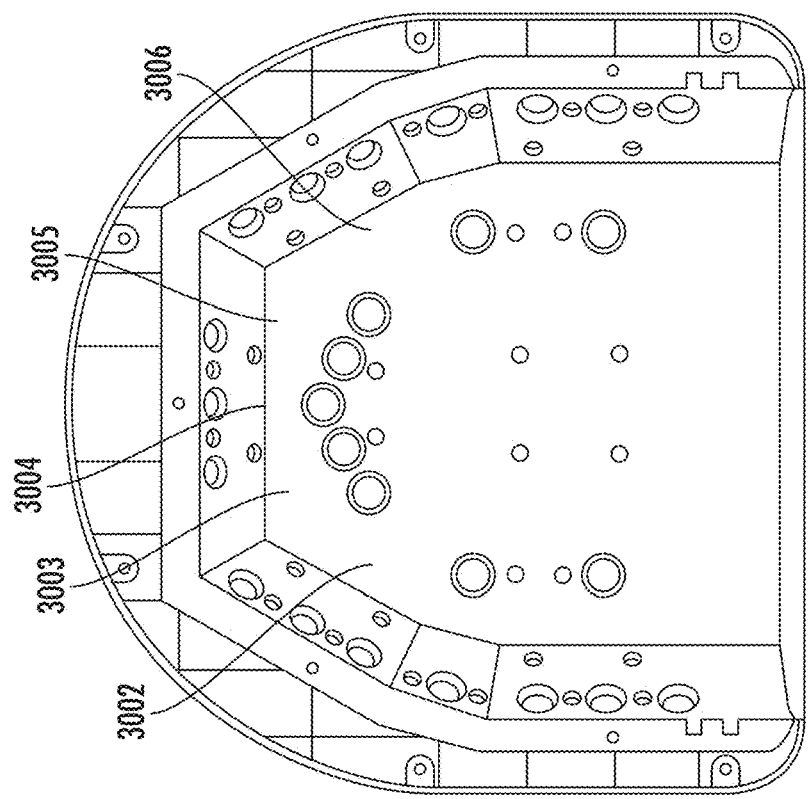
FIG. 30 shows a bottom view of an arrangement of LED lights on an inside roof of a nail lamp relative to a finger plate.

FIG. 30 shows an outline of the finger plate overlaid on a bottom up view of an inside of a housing of a nail lamp. This figure shows the positioning of the light structures in relation to the finger plate grooves.

Light sources are arranged along an inner roof of the housing. The roof includes openings or apertures to expose a light source (e.g., LED, or SMD LED, or others), which can be positioned in or behind the opening. Light from the light source radiates through the opening and into the space provided by the housing. FIG. 30 shows a specific arrangement of light sources relative to a finger plate of the housing. The finger plate includes finger grooves, with spacers (e.g., raised regions or ridges) between adjacent finger grooves. There is at least one light source positioned over each finger groove.

Over a first finger groove 3002, there are two openings with a light source at each opening. There is a light source positioned over a second finger groove 3003, third finger groove 3004, and fourth finger groove 3005. A light source is positioned between and over the second and third finger grooves, and the third and fourth finger grooves. There are two light sources positioned over a fifth finger groove 3006.

Figure 31:
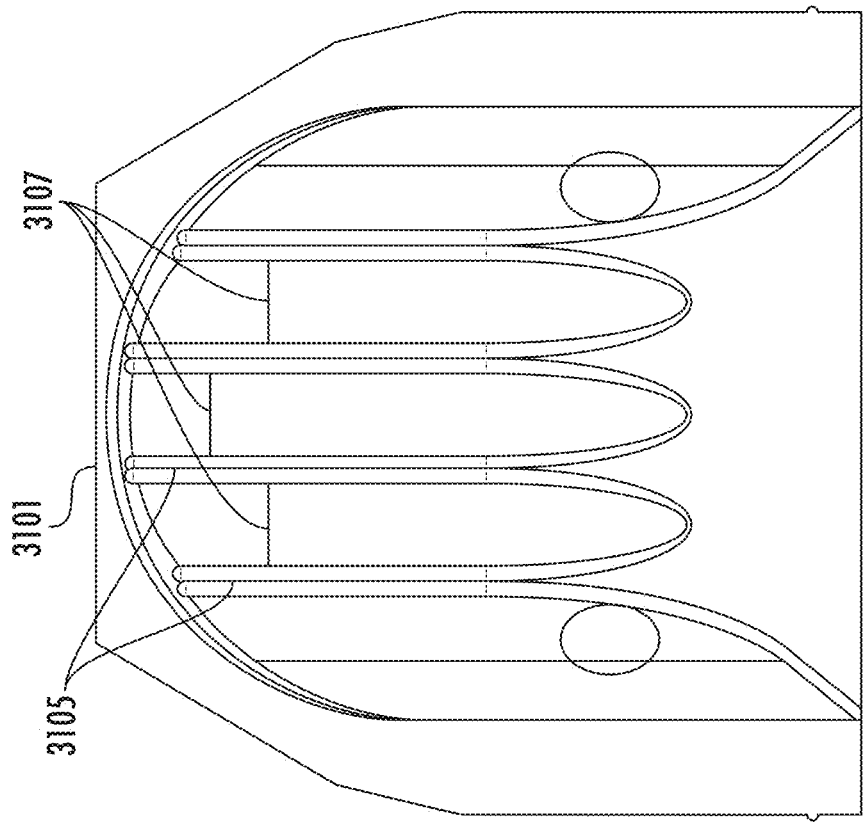
FIG. 31 shows a top view of a specific embodiment of a finger plate.

FIG. 31 shows a specific implementation of a finger plate 3101 with extended grooves for fingers of a user's hand. There can be spacers 3105 between adjacent grooves. The finger plate includes stops 3107 in some grooves to prevent the user's fingers from sliding in the grooves (e.g., away from or toward the light sources). The stops can provide a tactile gauge for the user to indicate where to place the fingers during curing. In a specific implementation, a height of the stops is about 3 millimeters from a surface of the groove. In other implementations, the height is less than 3 millimeters (e.g., 0.5, 1, 1.5, 2, or 2.5 millimeters or greater). In other implementations, the height is greater than 3 millimeters (e.g., about 3.1, 3.2, 3.3, 3.4, 3.5, 3.6, 3.7, 3.8, 3.9, or 4 millimeters or more).

Figure 32:
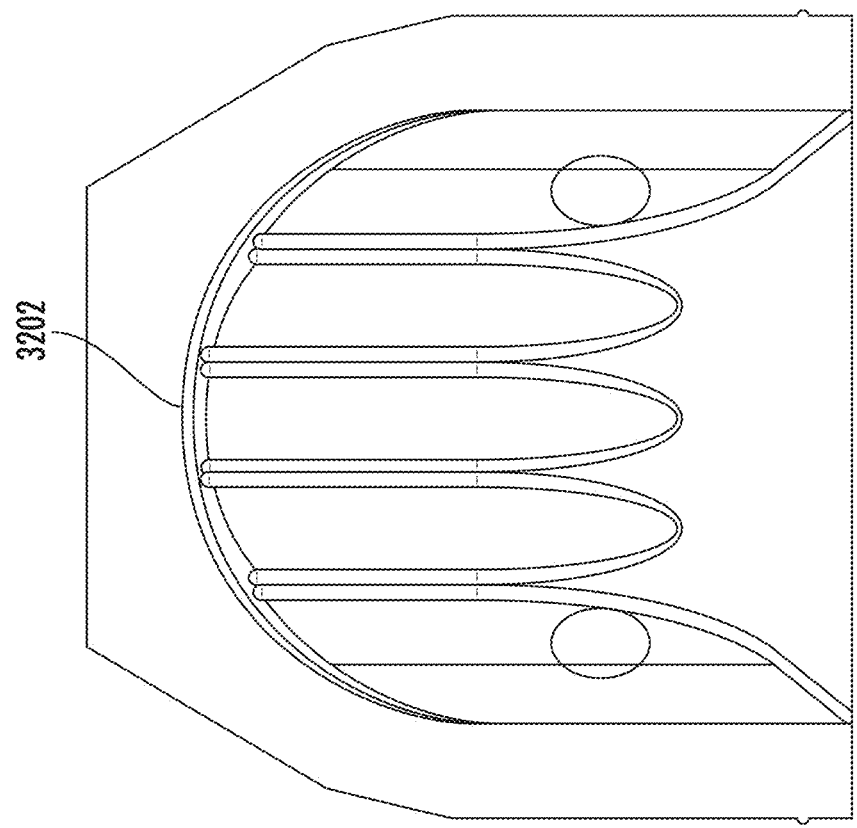
FIG. 32 shows a top view of another specific embodiment of a finger plate with shorter finger grooves relative to FIG. 11.

In an implementation, a finger plate can have shorter or longer grooves than that of FIG. 31. FIG. 32 shows an implementation of a finger plate with grooves that are shorter compared to the finger plate in FIG. 31. An edge 3202 of the finger plate provides a stop for a user's fingers. The edge can have raised regions or stops to provide the user with a tactile guide for placement of the fingers or fingertips. In a specific implementation, a height of the stops is about 1.5 millimeters from a surface of the groove. In other implementations, the height is less than 1.5 millimeters (e.g., 0.5, 1, 1.1, 1.2, 1.3, or 1.4 millimeters). In other implementations, the height is greater than 1.5 millimeters (e.g., about 1.6, 1.7, 1.8, 1.9, or 2 millimeters or more). In other implementations, the edge does not have a raised rim, and the user can place the fingertips at the edge itself.

Figure 33:
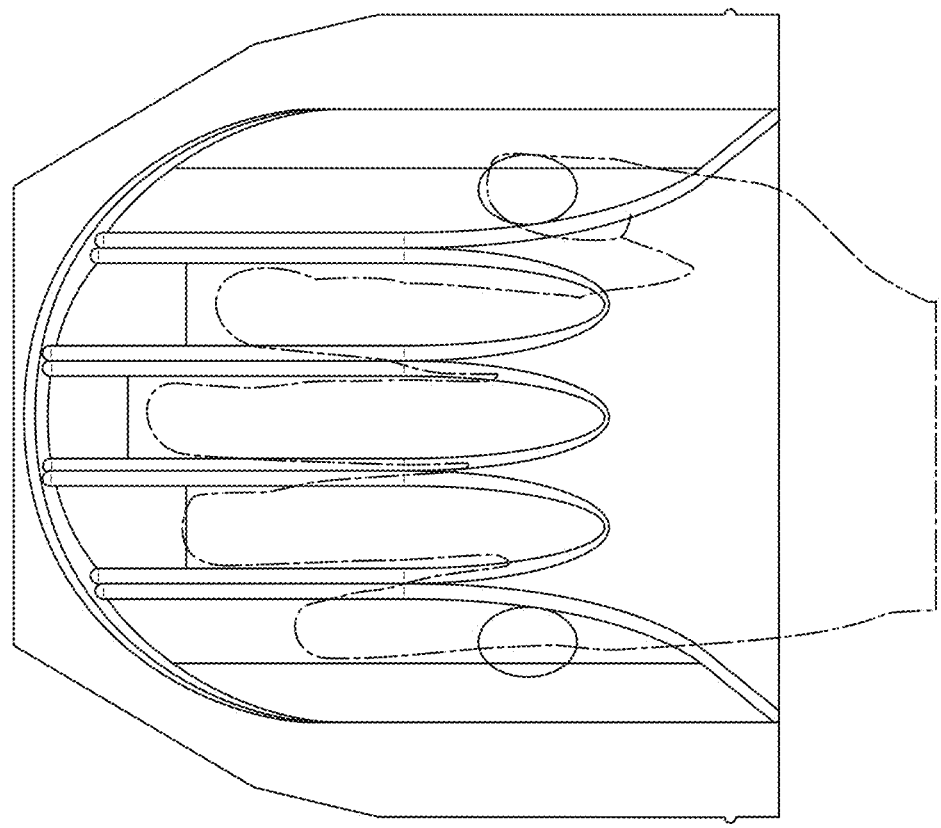
FIG. 33 shows a user's hand positioned on the finger plate of FIG. 11.

FIG. 33 shows the positioning of a user's hand (e.g., left hand) in the finger plate of FIG. 31, against the finger stops.

Figure 34:
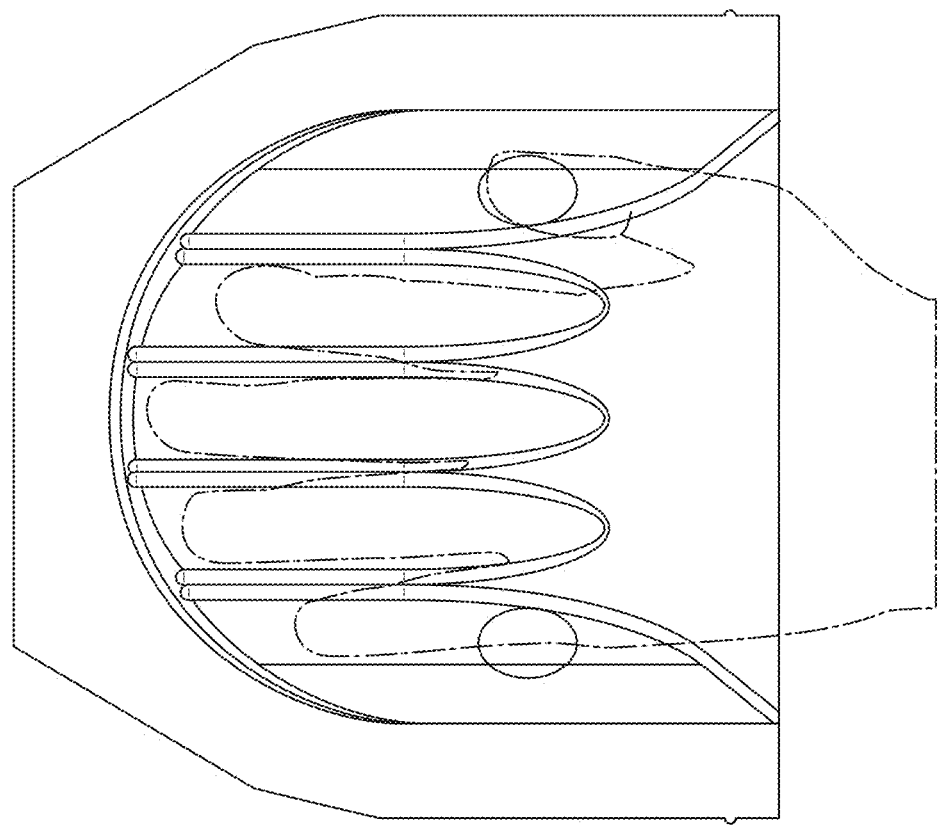
FIG. 34 shows a user's hand positioned on the finger plate of FIG. 12.

FIG. 34 shows the positioning of a user's hand (e.g., left hand) in the finger plate of FIG. 32, against the finger stops.

Figure 35:
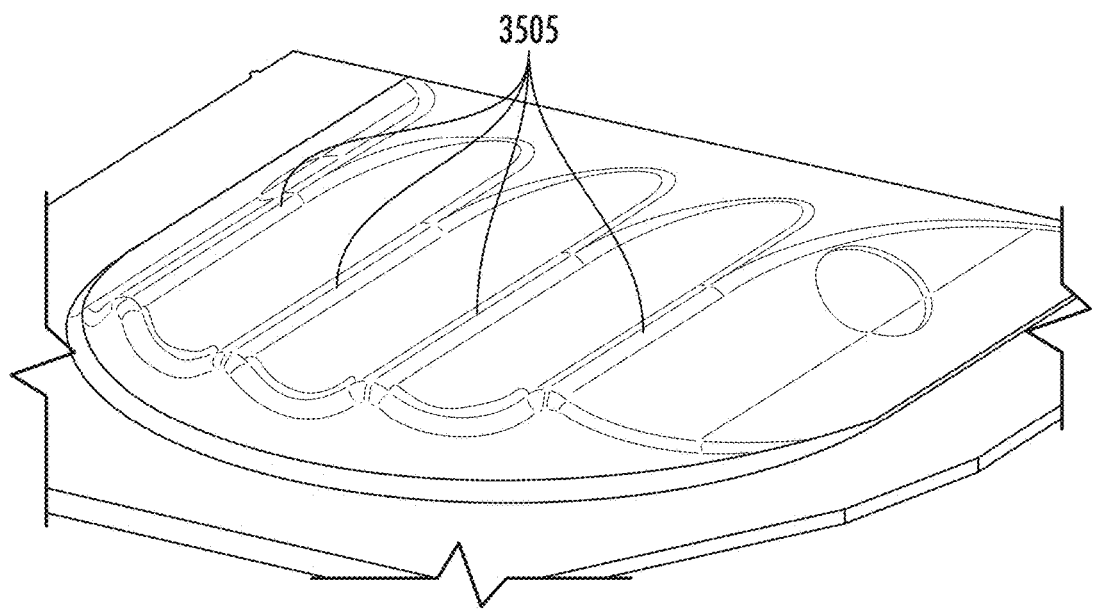
FIG. 35 shows a rear perspective view of a finger plate.

FIG. 35 shows a rear perspective view of a finger plate. A top view of the finger plate is in FIG. 29. As discussed, the plate can include five depressed regions (e.g., finger grooves) with adjacent regions separated by a raised region 3505 (or ridge). Three of the finger grooves, in the middle, are elevated compared to the other two finger grooves, on either side of the middle three. The depressed regions can be contoured or curved to provide comfort to a user's fingers when resting in the depressed regions. The depressed regions and raised regions can also prevent the fingers from moving while curing which can cause uneven curing or smudging.

Figure 36:
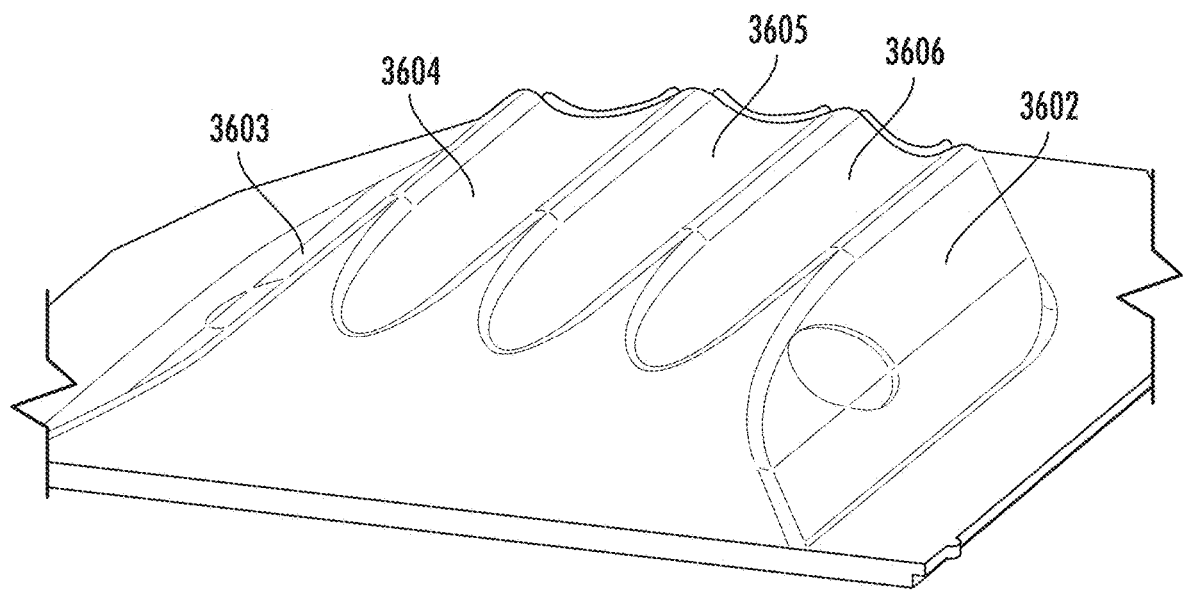
FIG. 36 shows a front perspective view of a finger plate.

FIG. 36 shows a front perspective view of a finger plate. A first groove 3602 and a fifth groove 3603 are less raised from a base of the housing than second, third, and fourth grooves 3604, 3605, and 3606. The first and fifth grooves are slightly angled away from the second, third, and fourth grooves. A surface of the fingerplate between a front edge of the grooves and a base of the finger plate can be sloped.

By elevating the second, third, and fourth finger grooves, the fingers will be positioned closer to the upper surface and the light structures. This will increase the radiation to the fingers which improve curing of the polish or gel. Curing time will be reduced and the uniformity of the curing will improve.

Further, this structure reflects a natural positioning of a person's fingers at rest. So, when a user places fingers into the grooves of the finger plate, the fingers can rest in a natural position that ergonomic and comfortable than if the grooves were positioned at the same height from the base of the housing.

Figure 37:
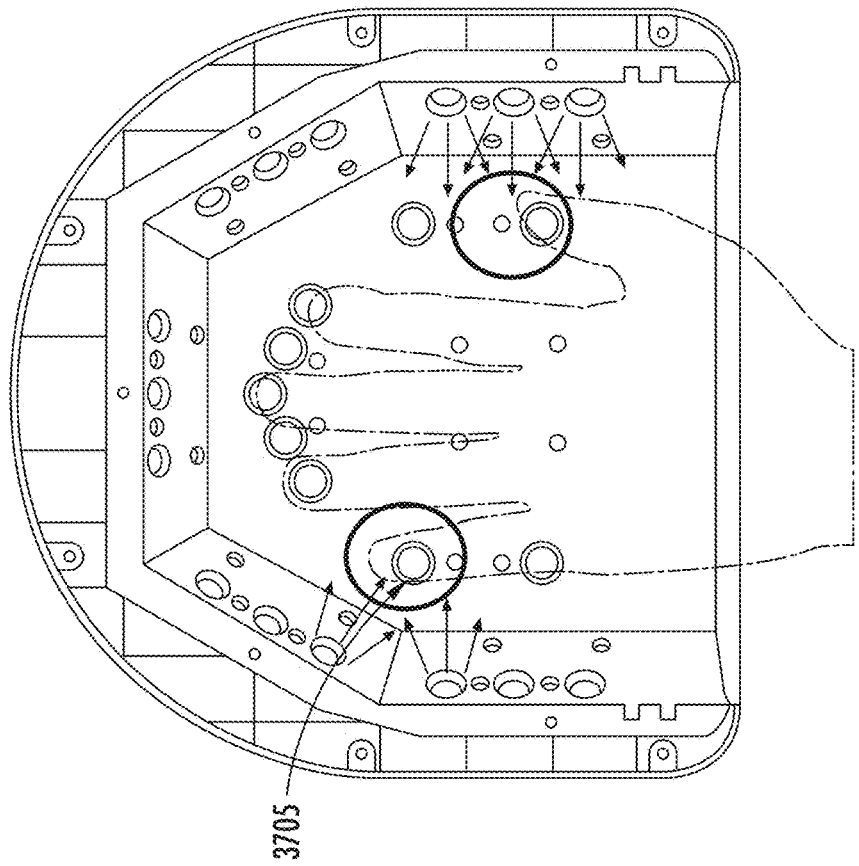
FIG. 37 shows a user's hand positioned in a nail lamp with five inside side walls.

FIG. 37 shows an irradiation pattern for light structures for the arrangement of FIG. 27. This specific arrangement of lights (e.g., LEDs) has sidewalls and inner roof of a housing with five inner sidewalls of the housing. A user's hand is positioned in the housing and each nail is irradiated by nearby light sources. A thumbnail is irradiated by three nearby light sources while a little finger nail 3705 is irradiated by two nearby light sources. In a specific implementation, for each sidewall of the housing, there is one 2-Watt LED that is surrounded by two 1-Watt LEDs. The thumbnail is irradiated by all three LEDs, while the little finger nail is irradiated by two 1-Watt LEDs.

Figure 38:
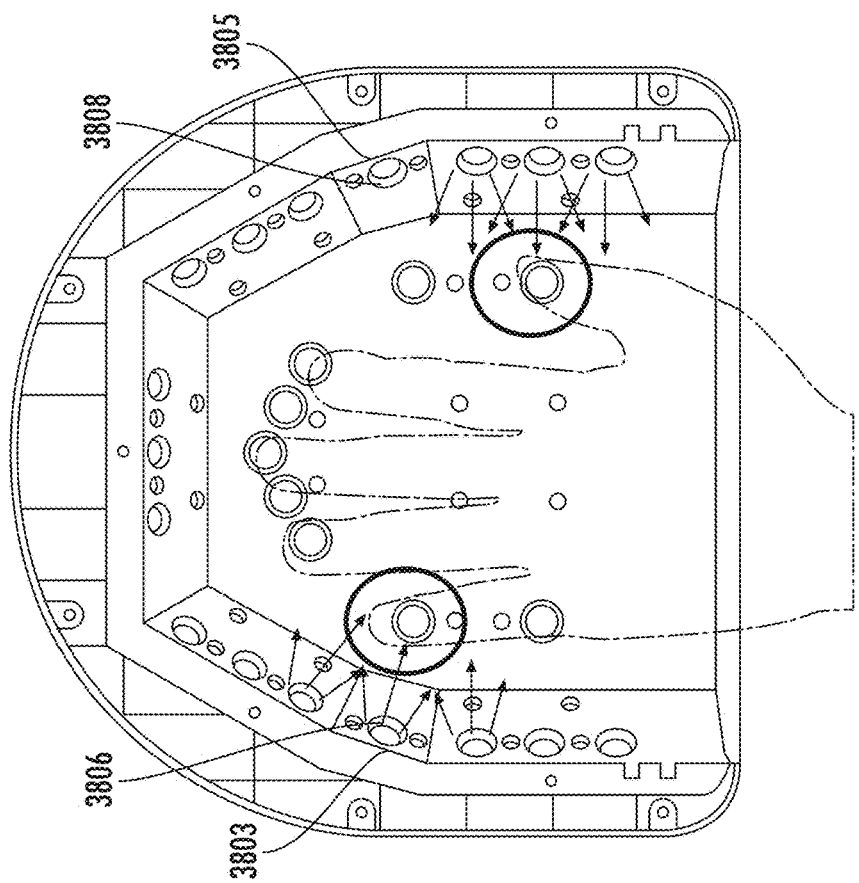
FIG. 38 shows a user's hand positioned in a nail lamp with seven inside side walls.

FIG. 38 shows an irradiation pattern for light structures for the arrangement of FIGS. 24, 25, 26, and 28. This specific arrangement of lights (e.g., LEDs) has sidewalls and inner roof of a housing with seven inner sidewalls of the housing.

Compared to the arrangement in FIG. 37, there are two additional sidewalls 3803 and 3805, each sidewall with a light source 3806 and 3808. In this arrangement, the user's nails (right hand or left hand) can be evenly irradiated. The thumbnail and little finger nail of each hand can be each irradiated by at least three light sources. In a specific implementation, for each sidewall of the housing with three light sources, there is one 2-Watt LED that is surrounded by two 1-Watt LEDs. On each sidewall 3803 and 3805, there is one 2-Watt LED. The thumbnail and little finger nail is each irradiated by one 2-Watt LED and two 1-Watt LEDs.

Figure 39:
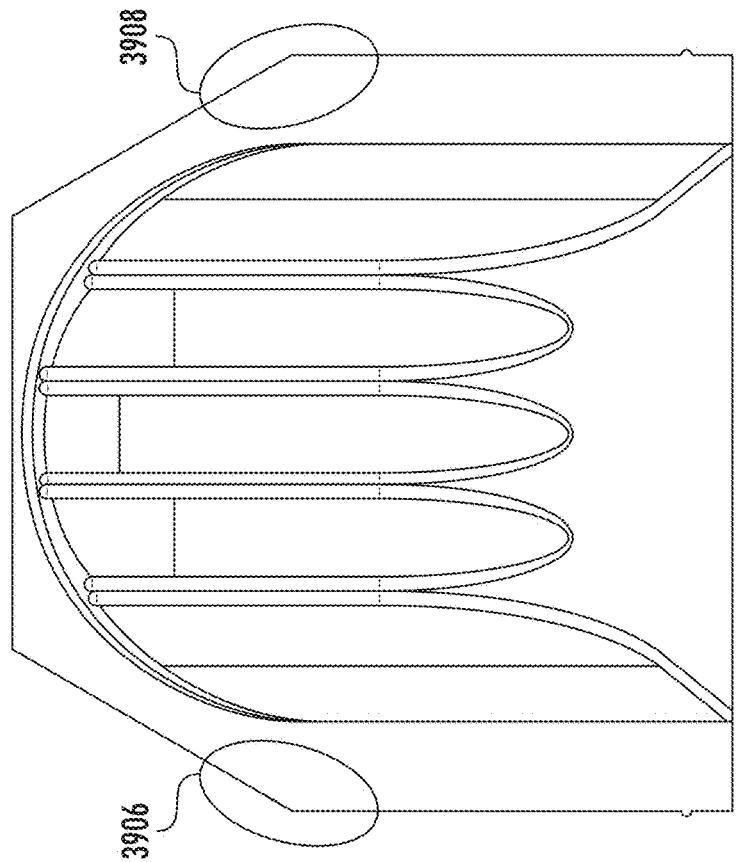
FIG. 39 shows a top view of a finger plate inside a nail lamp with five inside side walls.

FIG. 39 shows a finger plate for an inside space having five inner sidewalls, such as used in connection with the light structure arrangement of FIG. 27.

Figure 40:
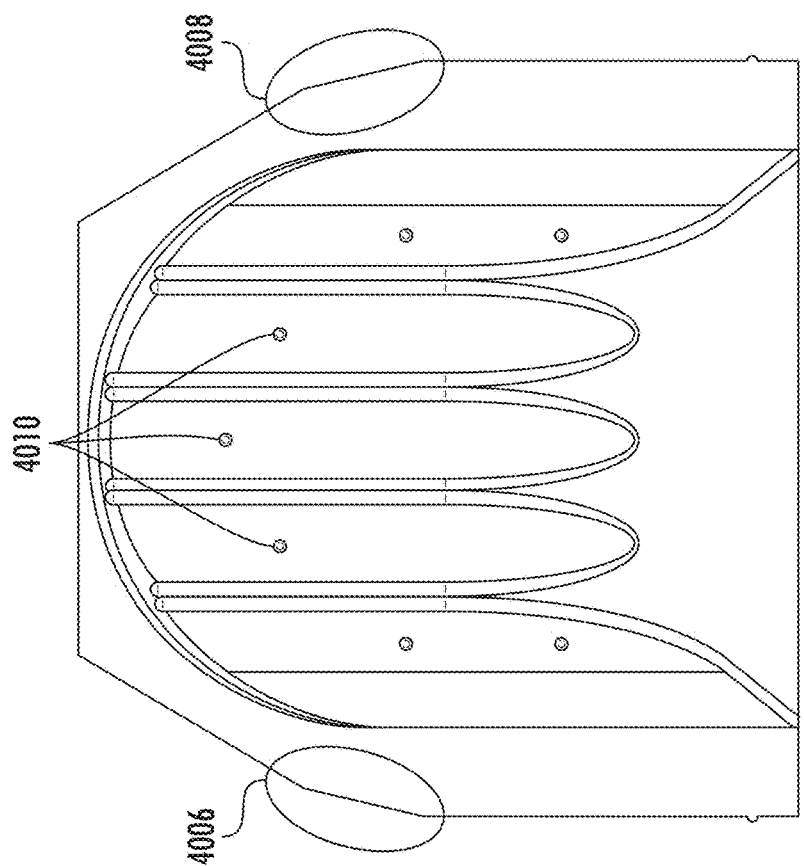
FIG. 40 shows a top view of a finger plate inside a nail lamp with seven inside side walls.

FIG. 40 shows a finger plate for an inside space having seven inner sidewalls, such as used in connection with the light structure arrangement of FIG. 28. The finger plates described in this application can be adapted or modified to be used with the configuration of FIG. 27 or 28, or both. For example, the finger plate in FIG. 40 can be used with the FIG. 27 configuration. And the finger plate in FIG. 39 can be used with the FIG. 28 configuration.

Compared to the configuration in FIG. 39, two additional side walls 4006 and 4008 can be added at corners 3906 and 3908. The finger plate also includes indicator members 4010 (finger points) positioned in the grooves of the finger plate. In an implementation, the indicator members are raised dots or bumps analogous to Braille dots that provide the user a tactile guide that the fingertips are positioned properly. Note that for the first and fifth grooves, these include two indicator dots. This is because there grooves, depending on which hand, are for the thumb or pinkie, which are a different length.

In other implementation, the indicator members can be other raised regions (e.g., bump, projection, or ridge, or others) or recessed regions that can provide the user tactile feedback. When the user inserts the hand into grooves of the finger plate, the user cannot see how far to extend the fingers into housing. With the indicator members, the user can feel where to position the hand during curing.

Figure 41:
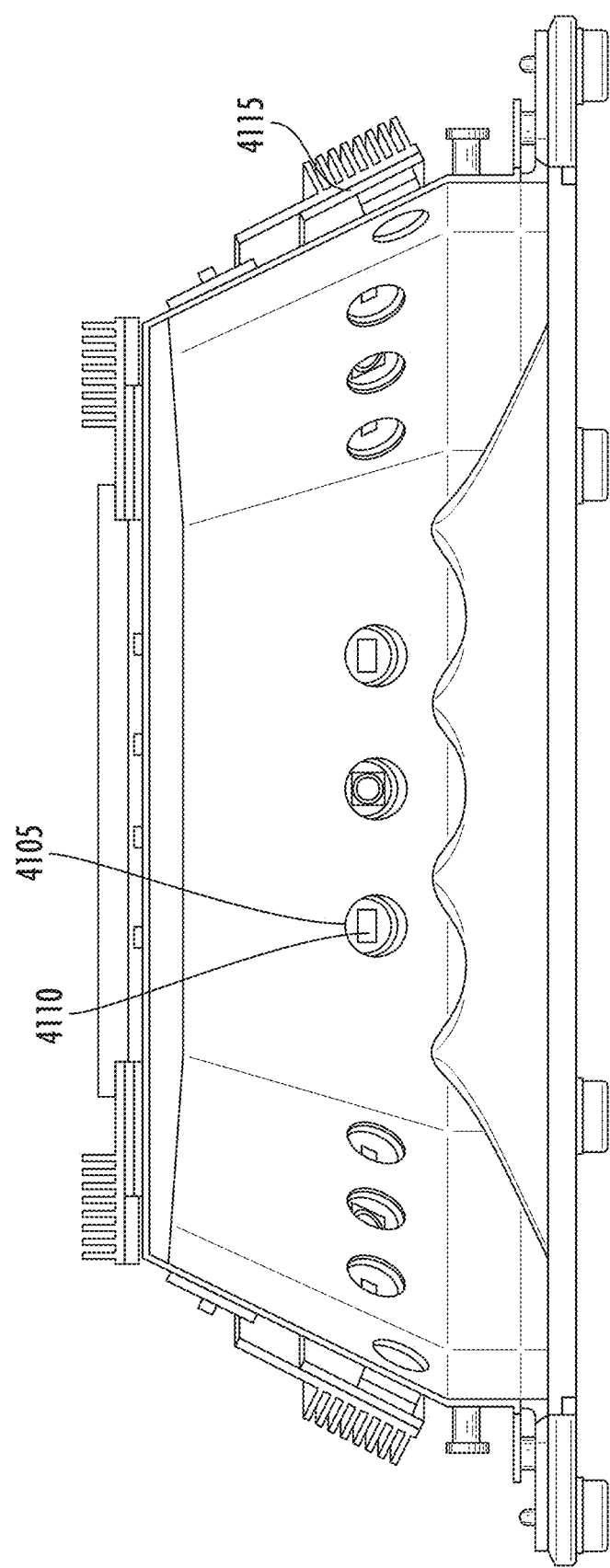
FIG. 41 shows a front view of an inside of a housing of a nail lamp with an outer cover of the housing removed.

FIG. 41 shows a front view of an inside of a housing of a nail lamp with an outer cover of the housing removed. The side walls and roof include openings 4105. Light source structures 4110 can be located in or behind the openings and are exposed through the openings. Light sources can be connected to circuit boards 4115. In a specific implementation, light sources are SMD LEDs that are mounted onto circuit boards.

Circuit boards 4115 may be printed circuit boards upon which the surface mounted LEDs are soldered. There can also be heat sinks or heat fins to which the LEDs are attached to dissipate heat. There can be LEDs mounted on both sides of a printed circuit board. One side will include the LEDs facing the inside of the interior space, while the other side will include the LEDs for lighting the exterior of the device. There can be multiple printed circuit boards, with boards for the sidewalls and upper surface of the interior space.

Figure 42:
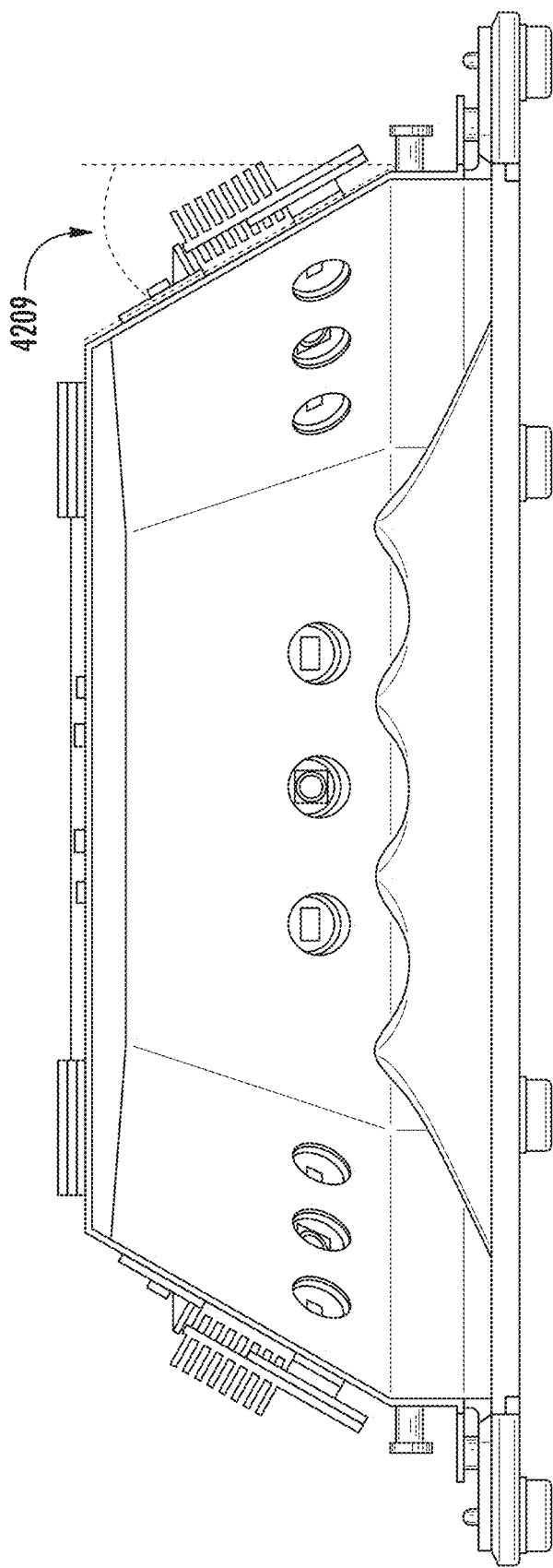
FIG. 42 shows a front view of an inside of a housing of a nail lamp with five inside side walls.

FIG. 42 shows a front view of an inside of a housing of a nail lamp with five inside side walls. Side walls are angled with respect to a vertical y-axis to allow the light sources to be angled toward a finger plate of the housing. In a specific implementation, an angle 4209 at which a side wall is angled with respect to the vertical axis is about 30 degrees. In other implementations, the angle is less than 30 degrees (e.g., about 20, 21, 22, 23, 24, 25, 26, 27, 28, or 29 degrees). In other implementations, the angle is greater than 30 degrees (e.g., about 31, 32, 33, 34, 35, 36, 37, 88, or 39 degrees, or more).

Figure 43:
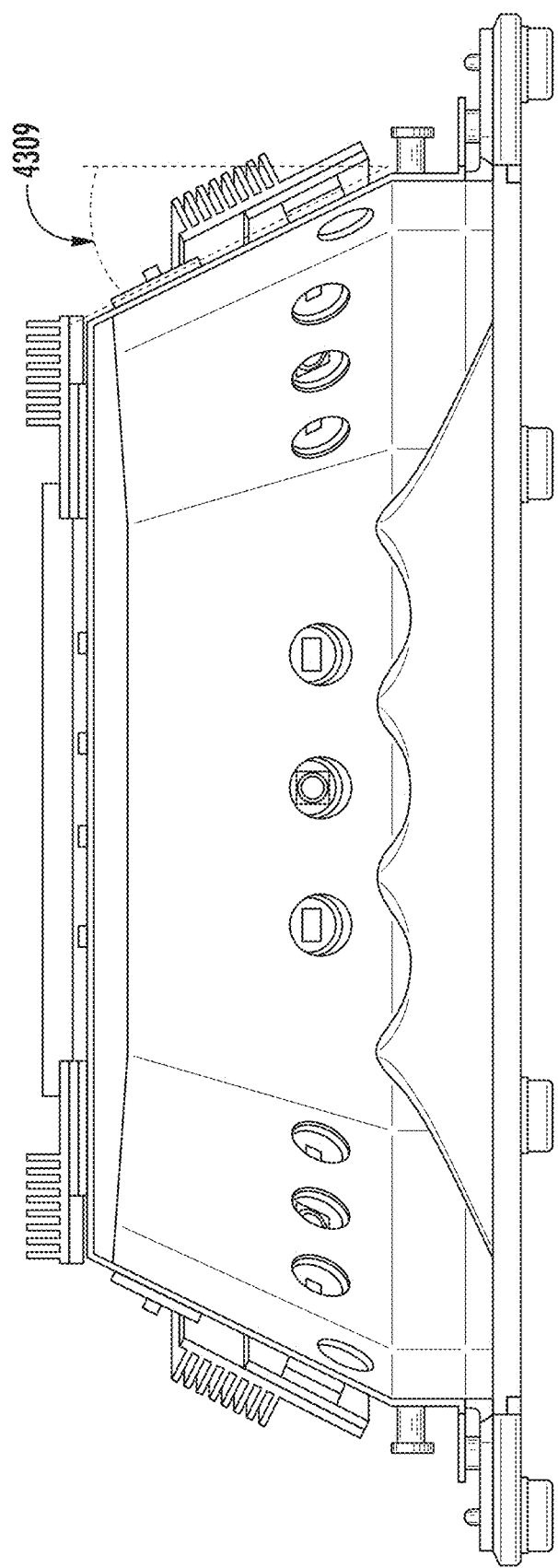
FIG. 43 shows a front view of an inside of a housing of a nail lamp with seven inside side walls.

FIG. 43 shows a front view of an inside of a housing of a nail lamp with seven inside side walls. Compared to the configuration in FIG. 42, the side walls can be less angled with respect to the vertical y-axis. In a specific implementation, an angle 4309 at which a side wall is angled with respect to the vertical axis is about 26 degrees. In other implementations, the angle is less than 26 degrees (e.g., about 18, 19, 20, 21, 22, 23, 24, or 25 degrees). In other implementations, the angle is greater than 26 degrees (e.g., about 27, 28, 29, 30, 31, 32, 33, 34, 35, 36, 37, 88, or 39 degrees, or more).

Figure 44:
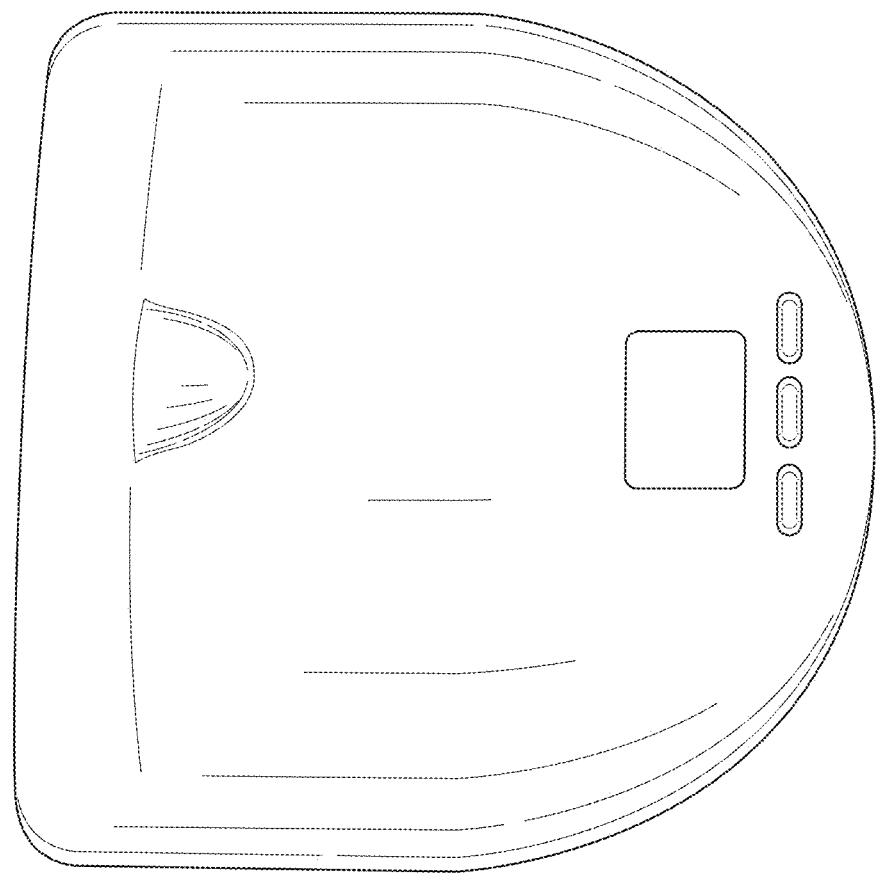
FIG. 44 shows a top view of an exterior of a nail lamp.

FIG. 44 shows a top view of an exterior of a nail lamp. There are preset settings for a user to select for curing. In an implementation, the user can select a preset curing time (e.g., 15 seconds, 30 seconds, or 60 seconds). The UV nail lamp in FIG. 44 is set to a setting of 60 seconds curing time. When the user presses the button for the selected setting, the button can light up and remain lit during the curing. A display can indicate to the user how much time has elapsed or is remaining on the curing time. The display shows 20 seconds (or 2 seconds) has elapsed or is remaining of the selected 60 seconds. Once the time expires, the UV lights, along with the lights of the housing, will turn off.

In an implementation, when the user selects the desired cure time by pressing the button, the display will display the selected time. In an implementation, an exterior lighting source of the device does not turn on until a person's hand is inserted inside of the nail lamp. When the hand is inside, a sensor of the device detects when a hand is present inside the unit. This turns on both the interior curing lights as well as the exterior glowing lights for duration of the selected curing.

When curing begins, exterior light source of the device will turn on, causing the exterior surface of the lamp to glow a soft and steady light for the duration of the curing time. The exterior lights can be positioned within the device, between interior curing lights and an outer translucent cover of the device. The translucent cover can be a translucent plastic material. The translucent plastic material can be a diffusing material or a diffuser, or the translucent plastic material can be combined with another diffusing material or diffuser, such as a composite material including both a translucent plastic layer and a light diffusing layer.

In an implementation, the translucent plastic material of the lamp shell includes a light diffusing property. When light irradiated from the exterior light source hits an inside surface of and is transmitted through the translucent plastic material, the plastic material diffuses or spreads out (i.e., scatters) the light to give a softer light relative to the more concentrated light initially radiated from the exterior lighting source (e.g., diode on the circuit board). The scattered light can be across the entire exterior shell and cause the device to have a soft and steady glow of light. For example, in FIG. 44, about six exterior lights sources are used to illuminate and cause the lamp's exterior surface to glow. The light diffuser material spreads and homogenizes the nonuniform or uneven illumination of six light sources into a more uniform illumination.

In an implementation, light diffusing property is present across an entire exterior surface area of the shell. When light from an exterior lighting source (located inside the nail lamp housing) enters an inside surface of the lamp shell, the light diffusing material scatters the light across the entire exterior surface area of the shell. This causes a more even glow across the entire lamp shell.

In an implementation, the lamp shell has a light diffusing property when the lamp shell is made of a translucent material and a light diffuser film is coupled to an interior surface, or exterior surface, or both interior and exterior surfaces of the translucent lamp shell material. Examples of light diffusing films includes mylar or acetate, or similar films. Other examples of light diffusing film include films that have varying degrees of opacity.

In another implementation, the lamp shell has a light diffusing property when the lamp shell includes a roughened surface, which scatters light. In a specific implementation, the lamp shell includes randomly sized and randomly placed particles on a surface of the lamp shell. In another specific implementation, particles can be of sizes large enough to be visible to the eye.

In another specific implementation, the lamp shell includes a matting agent. The matting agent can blur spots of relatively more intense light produced by individual light sources. Examples of a matting agent can include silica powder, calcium carbonate powder, alumina powder, or the like. In a further implementation, the matting agents can have a particle size of approximately 1 to 5 microns.

In an implementation, the light diffusing material is positioned over all of the exterior lighting sources so that all of the light from the exterior lighting sources will enter the light diffusing material and exit as an even glow that is spread across the entire surface of the shell. In a specific implementation, the light diffusing material is applied over an entire inner surface of the shell. In another implementation, the light diffusing material is applied over an outer surface of the shell. In another implementation, the light diffusing material is positioned over a portion of the exterior lighting sources. A portion of the light will enter and exit the light diffusing material and a portion of the light will not enter the light diffusing layer. This can result in various glow patterns across the shell the nail lamp. Each glow pattern can have a functional purpose, such as using a certain glow pattern to show when customers are close to finishing curing their gel nail polishes.

In an implementation, a greater portion of the lamp shell's exterior surface area includes light diffusing property (or light diffusing material) than a portion that does not have light diffusing property.

In another implementation, the lamp shell's exterior surface includes a portion with light diffusing property and an opaque portion, which does not let light travel through. In a specific implementation, the portion of the lamp shell's exterior surface that includes light diffusing property ranges from 10 percent to 100 percent. The remaining portion of the lamp shell's exterior surface is opaque.

In another implementation, the lamp shell's exterior surface includes a portion with light diffusing property, a transparent portion, and an opaque portion.

In an implementation, the nail lamp housing includes a first layer with light diffusing properties that is coupled to a second layer of material, which blocks out light. In a specific implementation, the light blocking material can block out specific wavelengths of light, such as UV light. Some of the interior light sources can emit UV light. Though the interior light sources are directed into the cavity (or interior space), some light rays may reflect off the inner walls of the cavity and be emitted through the shell of the nail lamp. To prevent the UV light from emitting through the shell, a layer of UV light blocking material can be added to the housing. Examples of materials that block out UV light are polycarbonate, acrylic, acrylic glass, and the like.

In an implementation, the exterior light sources are positioned in regions of rather than the entire device. For example, the exterior lights can be positioned along an outer perimeter of the device. When the light is transmitted through and scattered by the translucent outer cover, the regions closest to the light sources will glow brighter than the regions farther away from the light sources (e.g., a top region of the outer cover).

Typically, the LEDs for the exterior lighting are not the same wavelength as the interior lighting. In an implementation, the exterior lights are non-UV lights. In an implementation, these lights can produce visible colored light, all the same color, such as in blue. Other colors can include pink, orange, yellow, red, green, or purple or others. In other implementations, there can be different colors of exterior light (such as blue and yellow, or red and green). In other implementations, the lights are LEDs such as RGB LEDs that can produce changing colors of light during curing.

Figure 45:
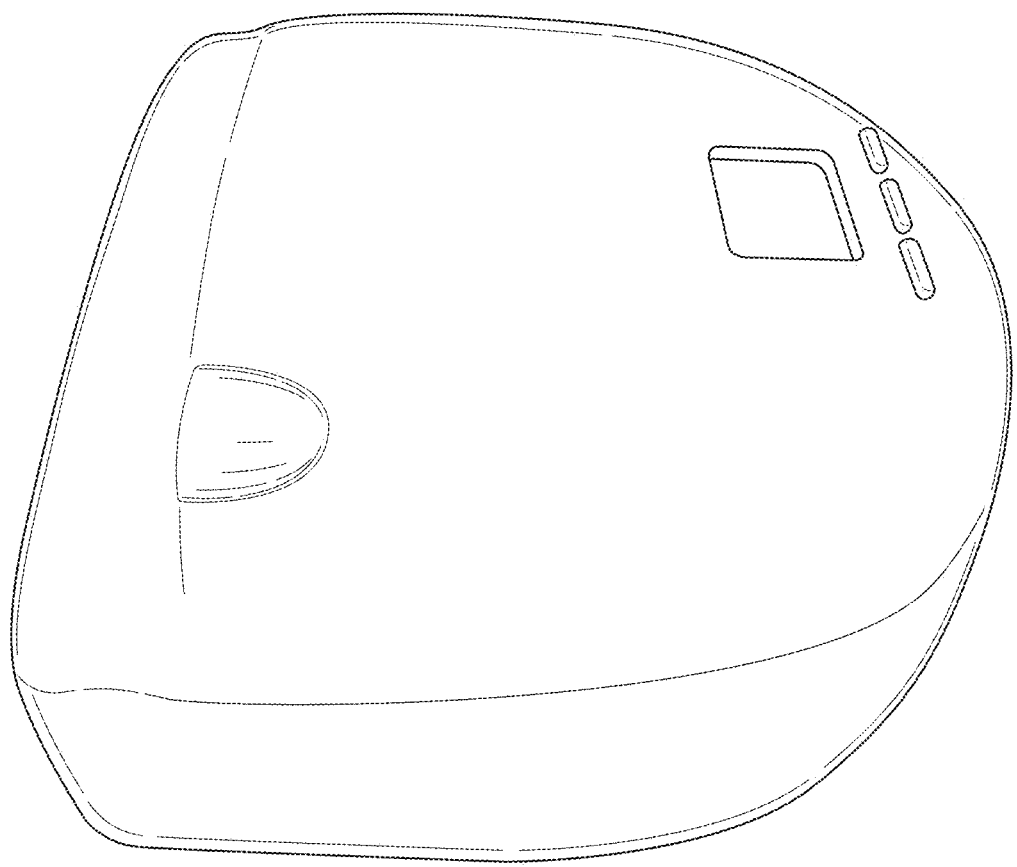
FIG. 45 shows a perspective view of an exterior of a nail lamp.

FIG. 45 shows a perspective view of an exterior of a nail lamp. The display shows 44 seconds has elapsed or is remaining of the selected 60 seconds. Once the time expires, the UV lights, along with the lights of the housing, will turn off.

Figure 46:
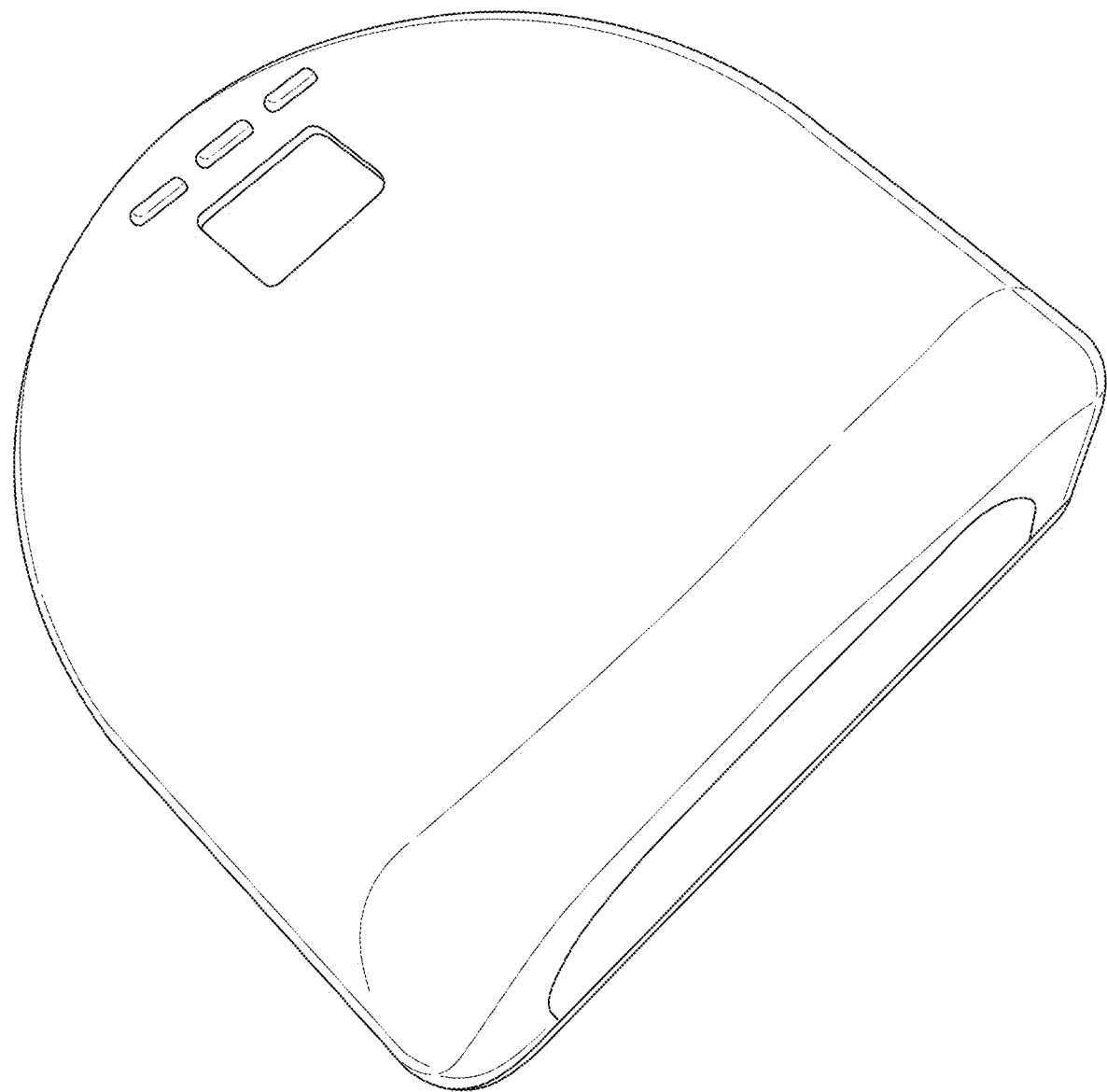
FIG. 46 shows a perspective view of an exterior of a nail lamp.

FIG. 46 shows a top perspective view of an exterior of a nail lamp that is turned on (i.e., curing mode). A timer displays 20 seconds (or 2 seconds) has elapsed or is remaining of the selected 60 seconds. UV lights on an inside of the housing are turned on, and glow from an opening of the housing of the lamp.

A specific process flow for operating a UV nail lamp is presented in table C below. It should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application.

TABLE C

| Step | Flow |
| --- | --- |
| 1 | Power on UV lamp. |
| 2 | Select curing mode. This can include a user selecting a curing time, or a level of curing, or other parameters from a preset options (e.g., menu or buttons). The user can also manually input a desired curing time or level of curing (e.g., buttons, dial, knob, or menu). In an implementation, the user presses one of a plurality of buttons to select a predetermined curing time (e.g., 15 seconds, 30, seconds, and 60 seconds). A display can display the selected curing time or setting. Lights between an inside of the housing and an outer cover of the housing will light up, causing the housing to light up or glow during curing. |
| 3 | A user inserts a hand (or foot) into the housing. The user's hand can rest on a finger plate. The finger plate can have finger indicator members that allow the user to feel where to rest the fingertips. |
| 4 | Timer starts when the user's hand is inside the housing. As the timer starts, UV light sources within the housing turn on to irradiate the user's nails. |
| 5 | Timer stops after the selected time expires. When the timer stops, the UV light sources turn off. Lights between the inside of the housing and the outer cover of the housing will turn off, causing the housing to dim. |
| 6 | User removes hand from the housing. |
| 7 | Power off UV lamp. |

Figure 47:
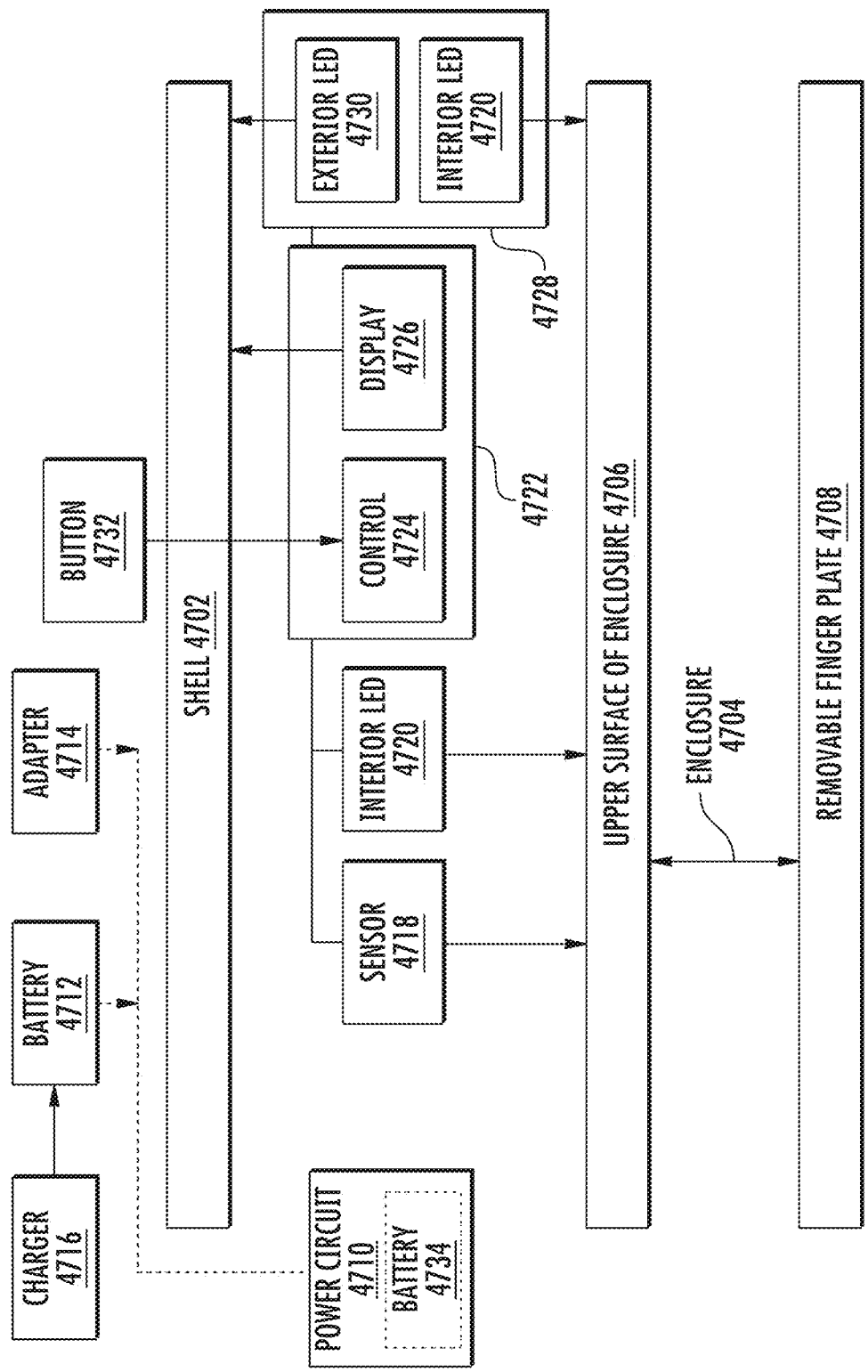
FIG. 47 shows a block diagram of a specific implementation a nail lamp that is adapted to be used with a power source that is external to the nail lamp.

FIG. 47 shows a block diagram of a specific implementation a nail lamp that is adapted to be used with a power source that is external to the nail lamp. The nail lamp includes a shell 4702 (also referred to as an exterior surface) and an enclosure 4704 (also referred to as a cavity or interior space), which is defined by an upper surface 4706 (also referred to as inner wall of a nail lamp's housing) of the enclosure. A user can place a hand inside the enclosure. A removable finger plate 4708 can optionally attach to the nail lamp and further define the enclosure.

A power circuit 4710, inside the lamp, is coupled to an external battery 4712 or an adapter 4714, both of which are outside of the nail lamp. The external battery can be connected to a charger 4716. The adapter can be connected to an external power supply (e.g., a wall outlet). The external battery or external power supply provides power to a power circuit. The power circuit provides power to sensors 4718, one or more interior LEDs 4720, a control circuit 4722 that includes a control unit 4724 and a timer display 4726, and one or more LED units 4728 that include exterior LEDs 4730 and interior LEDs 4720. The interior LED can also be referred to as an interior lighting source, discussed above, and used to cure the gel polish. The exterior LED can also be referred to as an exterior lighting source, discussed above, and produces light to indicate that the interior LED is activated. A button 4732, located outside of the shell, is connected to the control circuit. When pressed, the button activates the control circuit that controls the timer display and activates one or more SMD interior LEDs 4720 or LED units 4728. Heat sinks can be coupled to the interior LEDs within the shell. The heat sink can absorb heat given off by an activated LED so that a user's hand will not feel hot and uncomfortable inside the nail lamp.

The power circuit can optionally include an internal battery 4734. The internal battery can be charged by connecting to an external battery or an adapter that is connected to an external power source such as a wall outlet. After the internal battery has been charged by the external battery or external power supply, the nail lamp can operate without being connected to an external battery or adapter. The power circuit can also include a switch between the internal battery and external power connections (e.g., such as connection to an external battery or wall outlet) to allow the nail lamp to switch between internal and external power sources.

Figure 48:
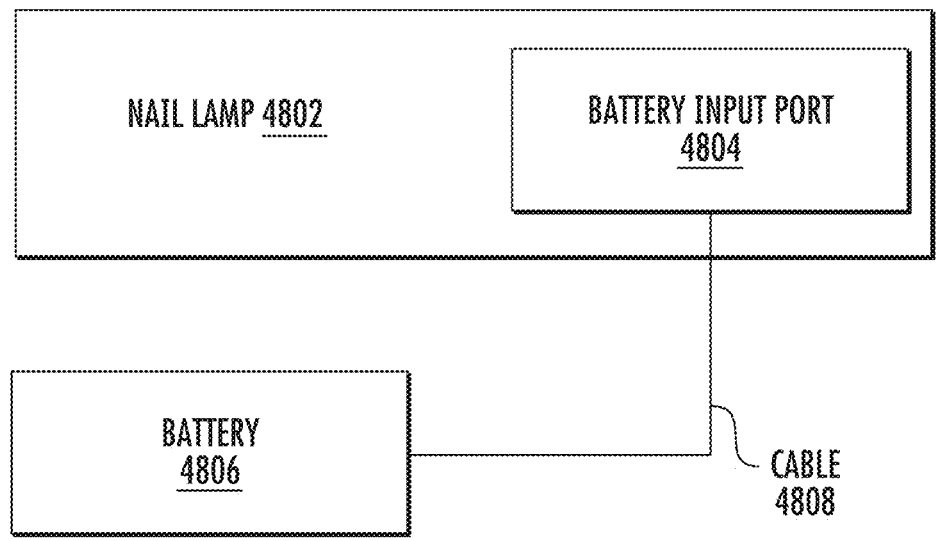
FIG. 48 shows an implementation of a nail lamp that includes a battery input port so that the nail lamp can be used with a rechargeable battery pack that is external to the housing of the nail lamp.
Figure 49:
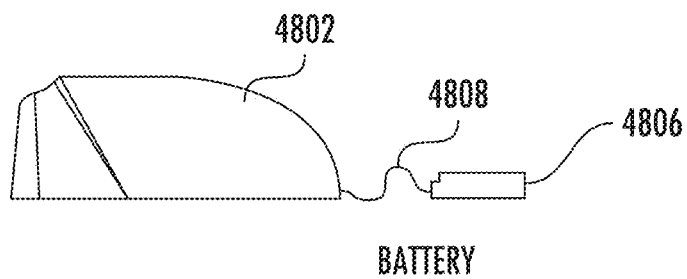
FIG. 49 shows a side view of the nail lamp of FIG. 48.

FIGS. 48-50 show an implementation of a nail lamp 4802 that includes a battery input port 4804 (also referred to as a power input) so that the nail lamp can be used with a rechargeable battery pack that is external to the housing of the nail lamp. The rechargeable external battery 4806 can provide power to the nail lamp. The external battery can be removably coupled to a cable 4808, which is removably coupled to the battery input port. FIG. 48 shows a block diagram of nail lamp 4802. FIG. 49 shows a side view of the nail lamp including the external battery attached to the nail lamp via the cable. FIG. 50A shows a first short side of the external battery. FIG. 50B shows a second short side of the external battery. FIG. 50C shows a first long side of the external battery. FIG. 50D shows a top face of the external battery. The external battery supplies power to the nail lamp. With an external battery coupled to the nail lamp and providing power, the nail lamp does not have to be coupled to a wall outlet or laptop for power supply, the nail lamp can be moved around a room to any location.

To charge the external battery, the external battery can be connected to an adapter, which can be connected to a wall outlet. The external battery can also be charged by being connected to a charging dock. After the external battery is charged, it can be disconnected from the adapter or dock and coupled to the nail lamp.

FIG. 51 shows a block diagram of a charging dock 5102 and an external battery 5104. The charging dock includes a battery dock 5106 for the external battery, and optionally a latch 5108 to prevent the battery from falling out of position in the battery dock. Once the external battery is inserted into the battery dock, the charging dock starts charging it. The charging dock stops charging the external battery after the battery is removed. The charging dock can be connected to a power supply via a cable 5110 that can be connected to an adapter 5112, which can be connected to the power supply (e.g., a wall outlet).

Figure 52:
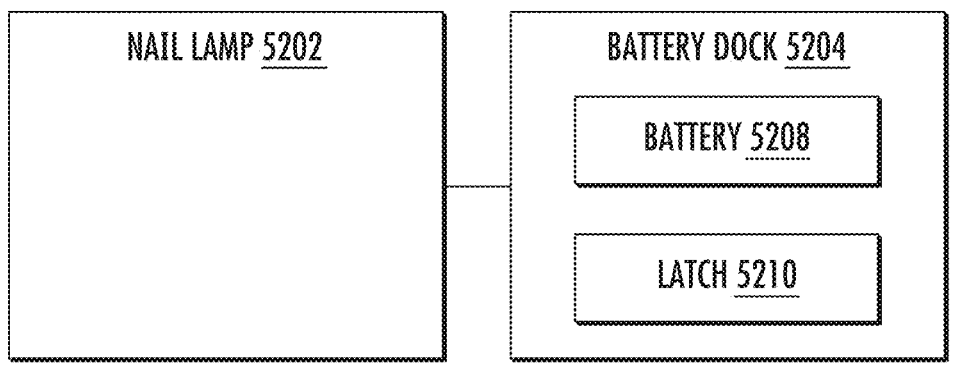
FIG. 52 show an implementation of a nail lamp including a battery dock attachment that can be removably coupled to an exterior of the nail lamp
Figure 53:
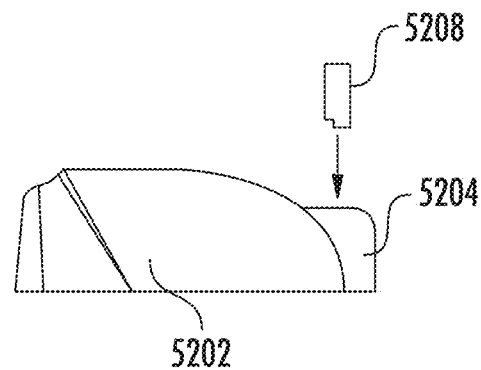
FIG. 53 shows a side view of the nail lamp and the battery dock attachment attached to the nail lamp.
Figure 54:
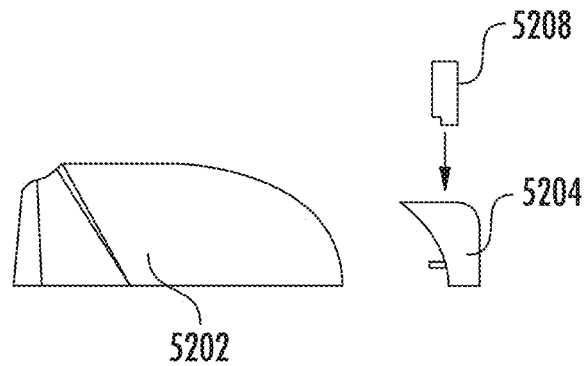
FIG. 54 shows a side view of a nail lamp with a battery dock attachment detached from the nail lamp.

FIGS. 52-54 show an implementation of a nail lamp 5202 including a battery dock attachment 5204 that can be removably coupled to an exterior of the nail lamp. FIG. 52 shows a block diagram of the nail lamp and the battery dock attachment. FIG. 53 shows a side view of the nail lamp and the battery dock attachment attached to the nail lamp. FIG. 54 shows a side view of the nail lamp with the battery dock attachment detached from the nail lamp. The battery dock includes a slot for a battery 5208 and a latch 5210 to hold the battery firmly to the battery dock. The latch can be, for example, a spring loaded release latch. The battery can be inserted into the slot. The battery dock attachment provides for easy removal of the battery when the battery needs to be recharged.

Figure 55:
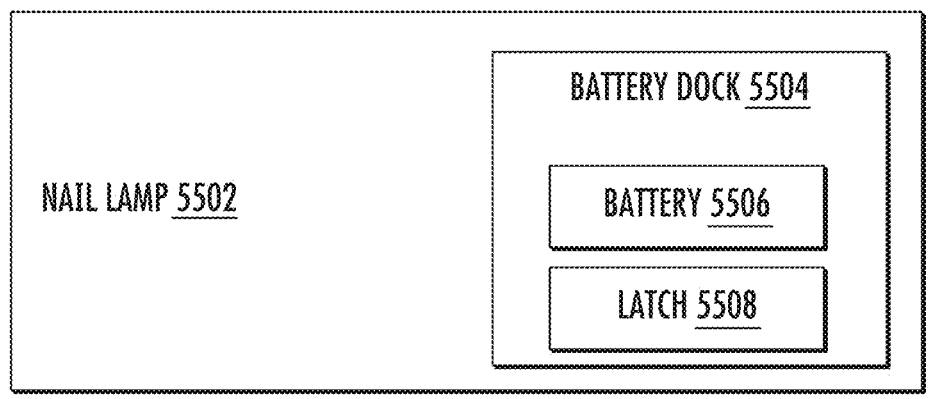
FIG. 55 shows a block diagram of an implementation of a nail lamp that includes an internal battery dock where a rechargeable battery pack can integrate with the housing of the nail lamp.
Figure 56:
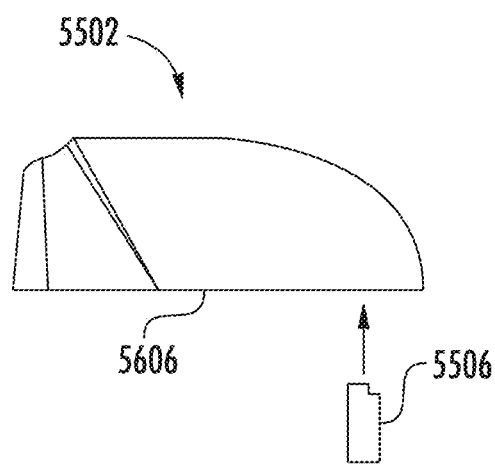
FIG. 56 shows a specific implementation of a nail lamp in which the internal battery dock is located at a bottom of the nail lamp
Figure 57:
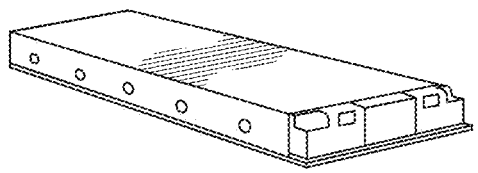
FIG. 57 shows a perspective view of the battery for the nail lamp shown in FIGS. 55 and 56.

FIGS. 55-57 show an implementation of a nail lamp 5502 that includes an internal battery dock 5504 where a rechargeable battery pack 5506 can integrate with the housing of the nail lamp. The internal battery dock is removably coupled to a battery 5506 to be removably coupled within the housing of the nail lamp. FIG. 55 shows a block diagram of the nail lamp including the internal battery dock. FIG. 56 shows a specific implementation of nail lamp 5502 in which the internal battery dock is located at a bottom 5606 of the nail lamp. The battery can be inserted into the bottom of the nail lamp. In other implementations, the battery dock can be located elsewhere, such as the top or side of the nail lamp, for easy access to the battery dock. The internal battery dock optionally includes a latch 5508 to hold the battery firmly to the battery dock. The latch can be, for example, a spring loaded release latch. The battery can be inserted into the slot. FIG. 57 shows a perspective view of the battery. The battery can include leads (e.g., copper strips) or pins that interface with the battery dock.

Figure 58:
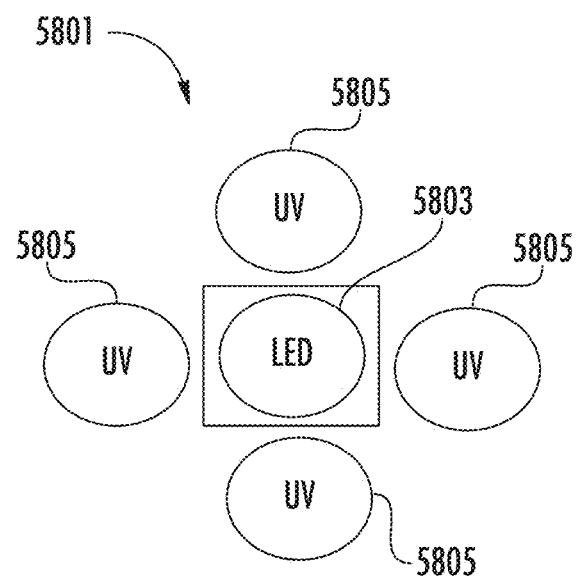
FIG. 58 shows a specific implementation of an interior lighting source unit.
Figure 59:
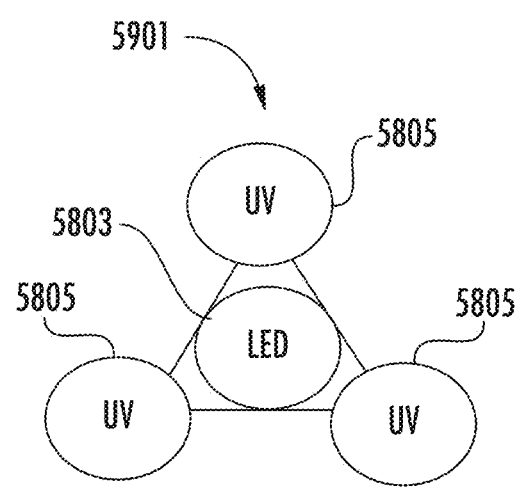
FIG. 59 shows another arrangement where three UV lighting sources surround one LED lighting source in a triangle shape.

FIG. 58 shows a specific implementation of an interior lighting source unit 5801. The interior lighting source unit includes at least one UV wavelength (which is approximately 100-400 nanometers) light source and at least one LED. The LED can produce light of a wavelength that is same or different from that produced by a UV wavelength light source. In a specific implementation (shown in FIG. 59), four UV light sources and one LED can be arranged such that the one LED lighting source 5803 is in the middle and the UV light sources 5805 surround the LED lighting source on four sides, like a rectangle, or square, or diamond shape. FIG. 59 shows another arrangement 5901 where three UV lighting sources surround one LED lighting source in a triangle shape. In a specific implementation, the LED produces light of 405 nanometers and can be 1-3 Watt LEDs. In another specific implementation, the UV lighting source produces light of 365 nanometers.

Figure 60:
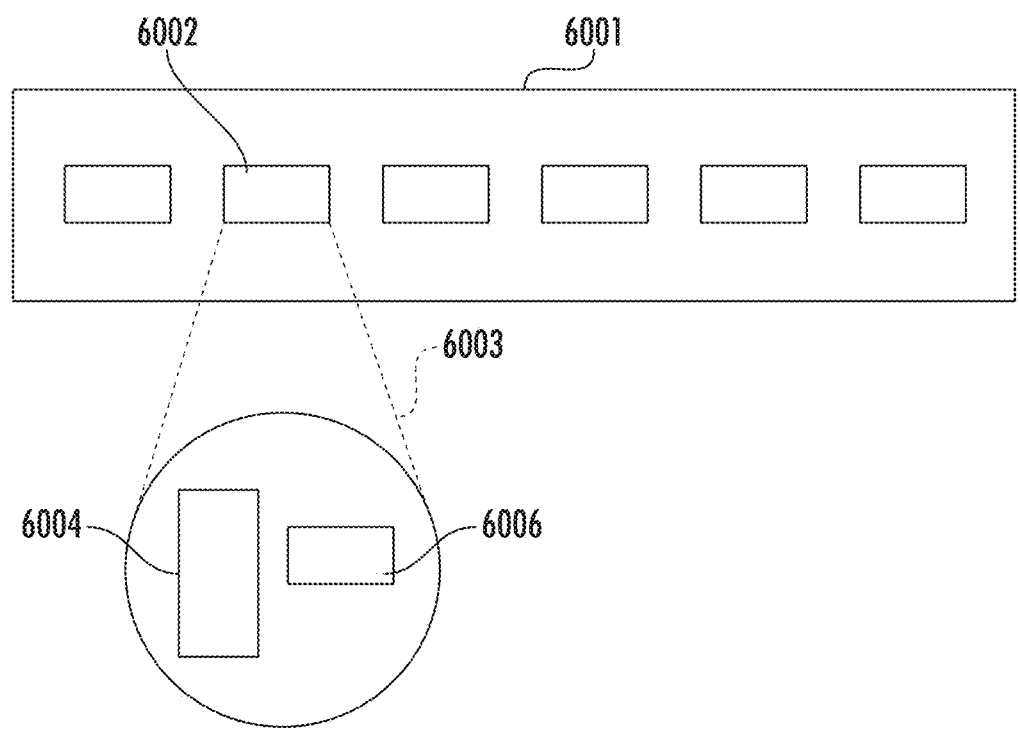
FIG. 60 shows a strip of interior lighting source units and a magnification of one of the interior lighting source unit.
Figure 61:
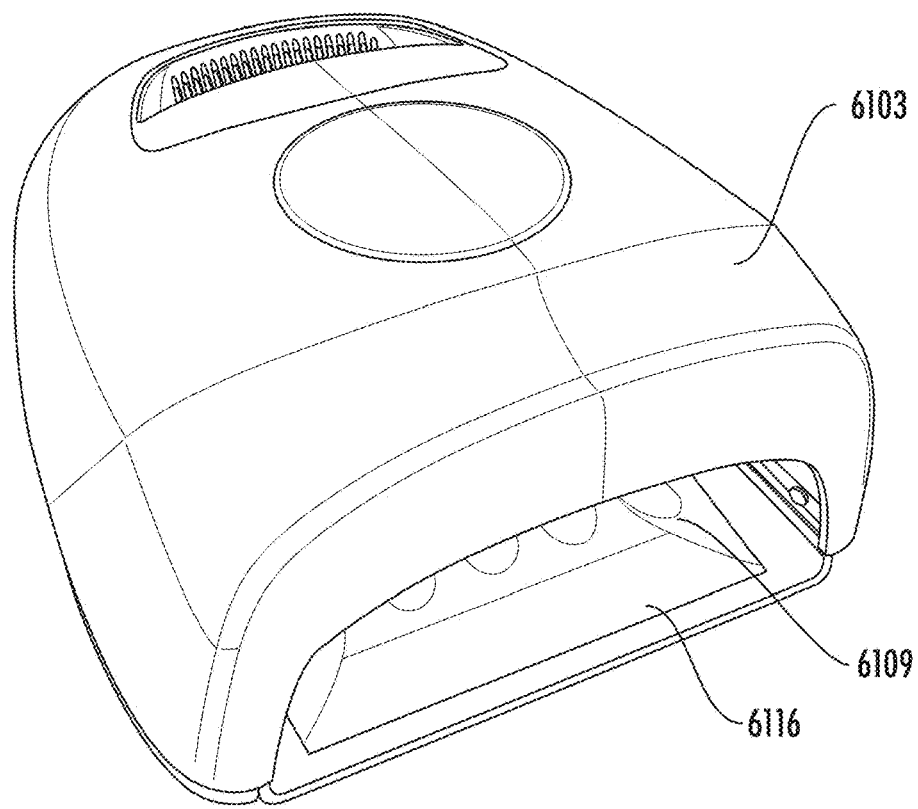
FIGS. 61-70 show various views of a nail lamp having a rechargeable battery pack and exterior lighting.
Figure 62:
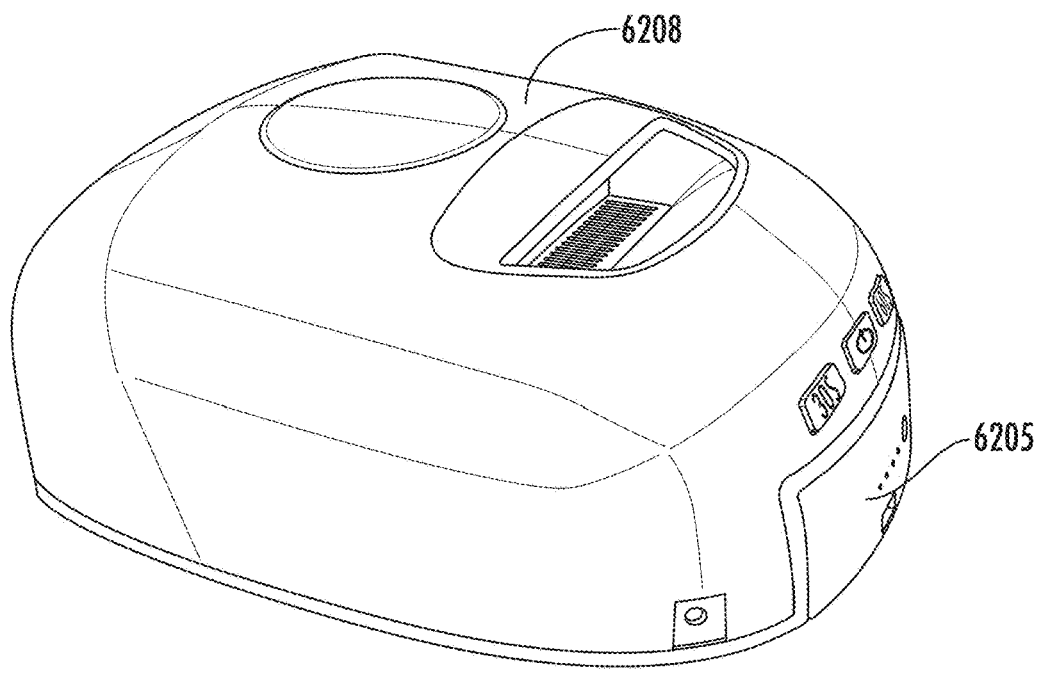

FIG. 60 shows a strip 6001 of interior lighting source units 6002 and a magnification (indicated by broken line 6003) of one of the interior lighting source unit. An LED 6004 is adjacent to another LED 6006. The LEDs produce light of different wavelengths from each other. In a specific implementation, LED 6004 produces light of 405 nanometers, which can be used to cure LED gel. And LED 6006 produces light of 365 nanometers, which can be used to cure UV curable gel or extension gel. This arrangement of UV and LED light sources allow for universal usage of the nail lamp because the nail lamp can be used to cure both LED and UV-curable gel polish. In a further implementation, the nail lamp can be an inductive nail lamp, which the power required to generate light is transferred from outside the nail lamp to the gas inside via an electric or magnetic field. A benefit to an inductive nail lamp is extended lamp life.

FIGS. 61-70 show various views of a nail lamp having a rechargeable battery pack and exterior lighting via a translucent shell. FIGS. 71-76 show various view of the rechargeable battery pack of the nail lamp. FIGS. 77-80 show various views of another nail lamp implementation.

This application describes some examples of implementations with specific dimensions, measurements, and values. These are not intended to be exhaustive or to limit the invention to the precise form described. The dimensions or measurements are in millimeters (or inches). The values are approximate values. These values can vary due to, for example, measurement or manufacturing variations or tolerances or other factors. For example, depending on the tightness of the manufacturing tolerances, the values can vary plus or minus 5 percent, plus or minus 10 percent, plus or minus 15 percent, or plus or minus 20 percent.

Further, the measurements are for a specific implementation of the device, and other implementations can have different values, such as certain dimensions made larger for a larger-sized product, or smaller for a smaller-sized product. The apparatus may be made proportionally larger or smaller by adjusting relative measurements proportionally (e.g., maintaining the same or about the same ratio between different measurements). In various implementations, the values can be the same as the value given, about the same of the value given, at least or greater than the value given, or can be at most or less than the value given, or any combination of these.

Some techniques or flows are described. A flow may have additional steps (not necessarily described in this patent), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular application or based on the situation.

This nail lamp implementation can include one or more aspects or features previously described or any combination of aspects or features previously described. Further, the previously described nail lamp implementations can also include one or more aspects or features described below or any combination of the aspects or features described below.

Features of an implementation of the lamp include a USB charge port, ventilation cooling, easy carry handle, 3-way dimmer switch, double-injected illuminating lamp shell, removable hand plate or finger plate, power adapter port, 66 strategically positioned surface-mounted ultraviolet light emitting diodes.

FIGS. 61-64 shows views of a nail lamp 6103 having a rechargeable battery pack 6205 and exterior lighting via a translucent shell 6208. There is an opening to a treatment chamber 6109 with a fingerplate 6116. A user places fingers on the fingerplate in the treatment chamber. When the lamp is turned on, the fingers and nails, with gel polish, are exposed to the ultraviolet light which cures the gel. The exterior shell of the lamp is translucent and when the lamp is on, will glow.

Figure 65:
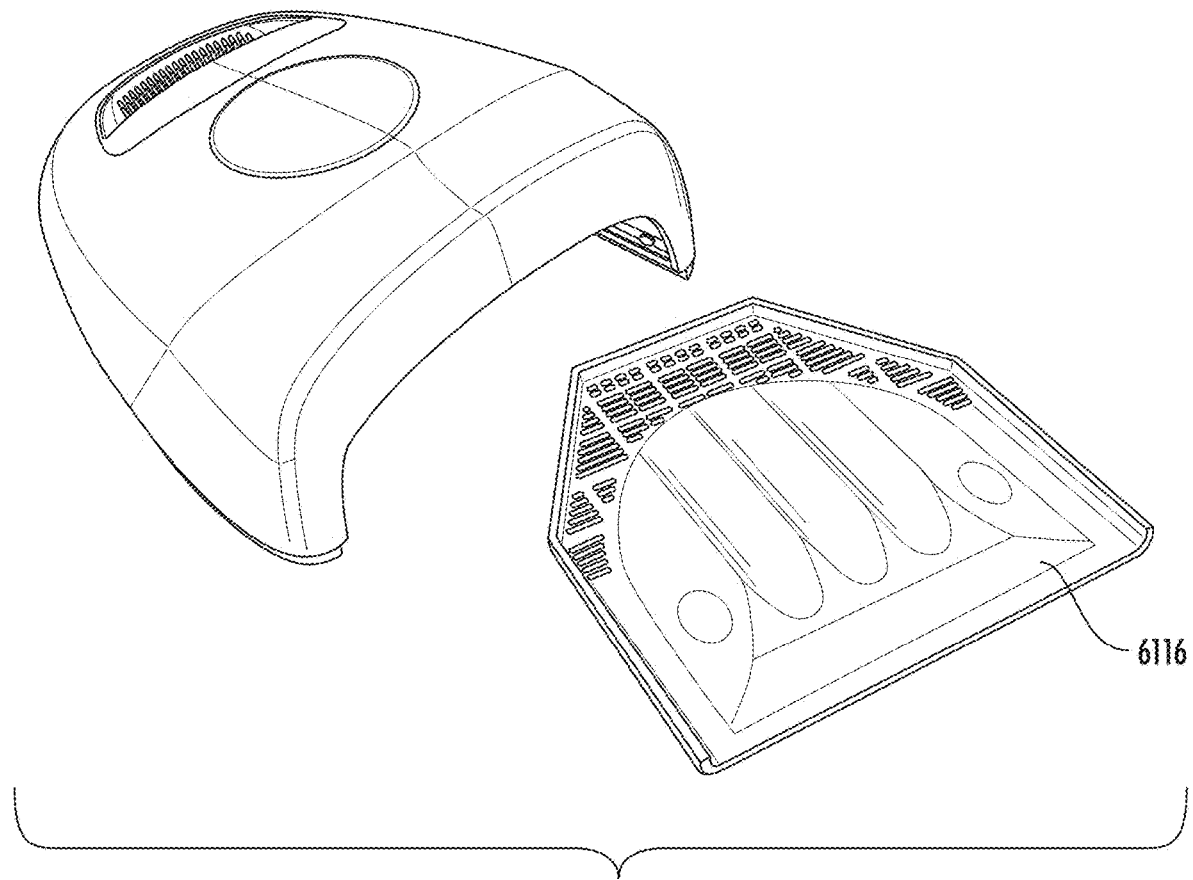
Figure 66:
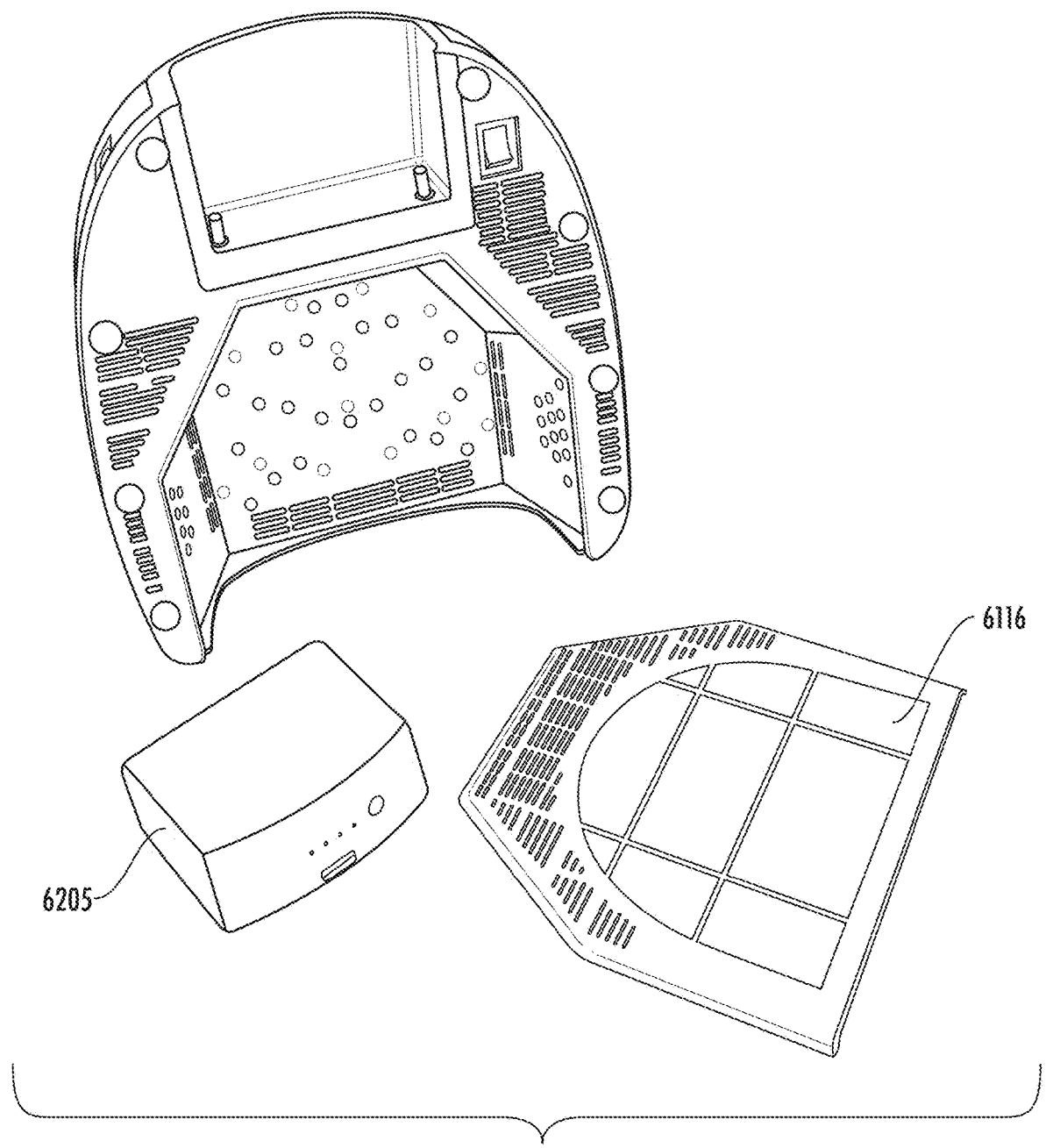

As shown in FIG. 65, the fingerplate is removable by sliding this plate out of the lamp. When removed, the lamp can be used to treat feet and toes or other parts of the body, things, or objects. The fingerplate can be re-inserted by sliding the fingerplate back into the lamp. FIG. 66 shows a bottom side of the fingerplate.

Figure 63:
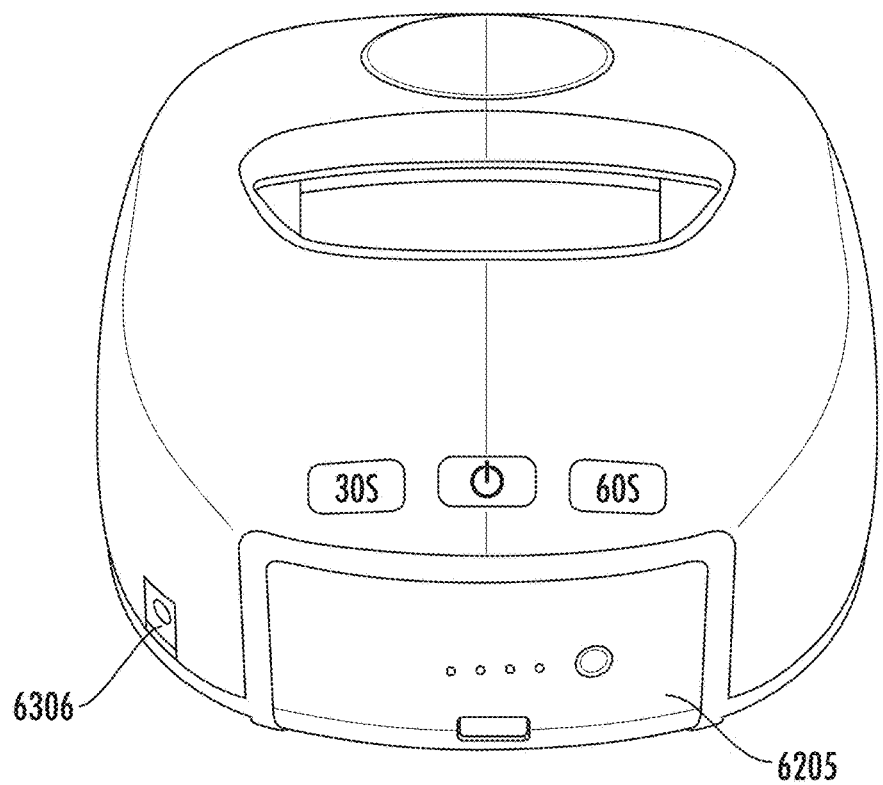
Figure 64:
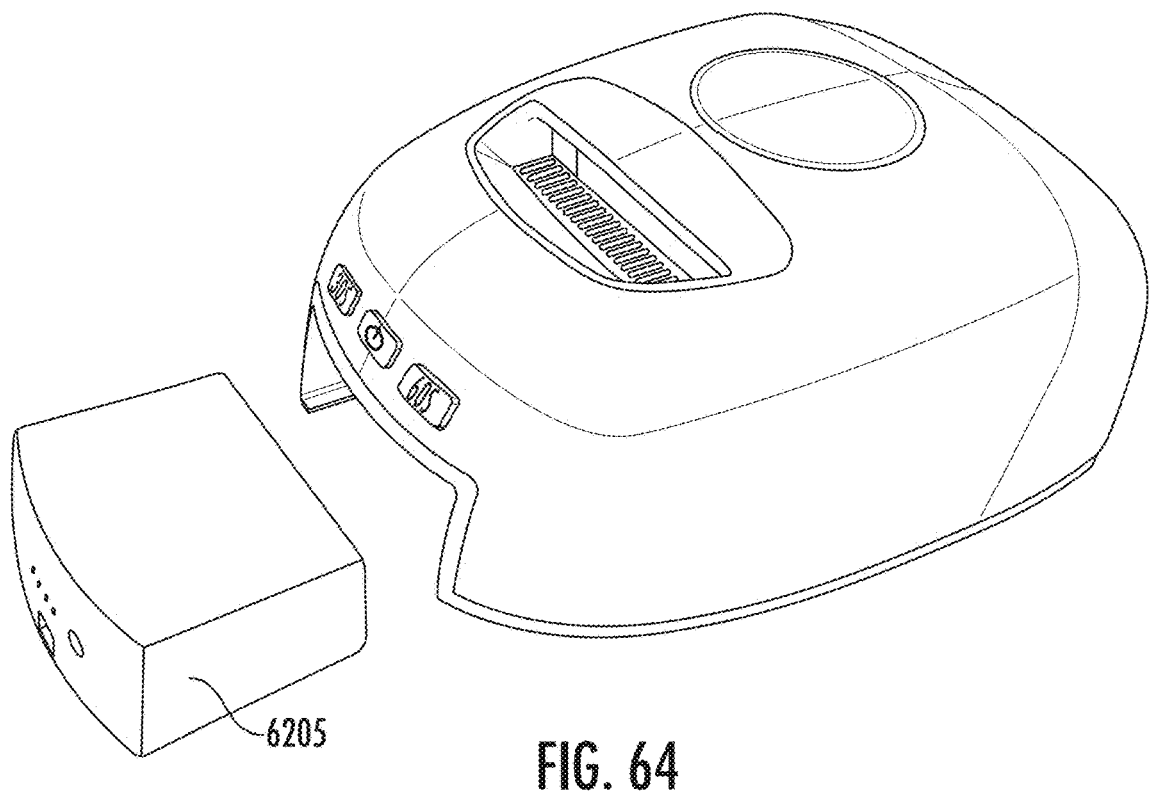
Figure 67:
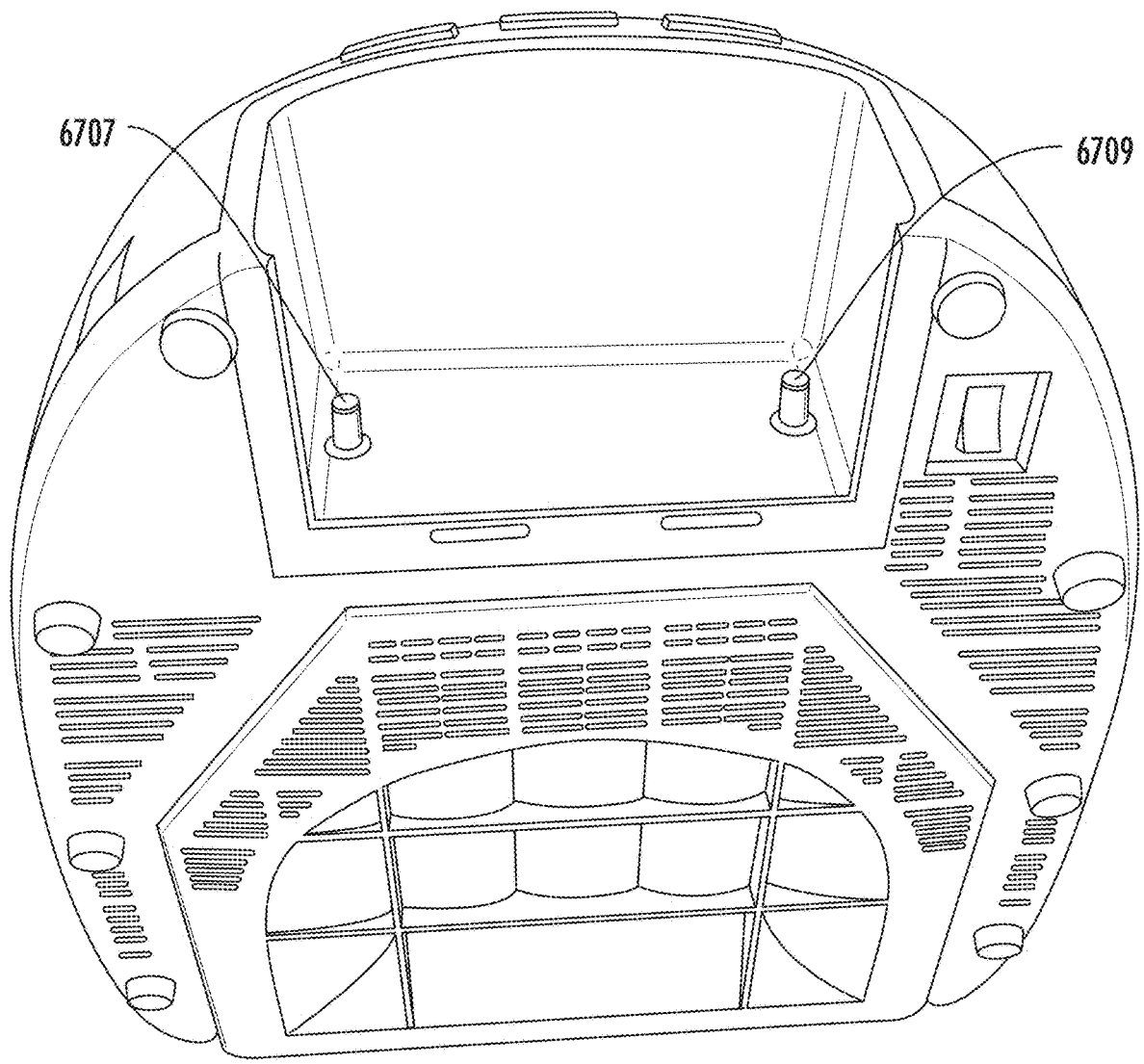

FIG. 66 shows battery pack 6205 completely removed from the lamp. The battery pack can be recharged while inserted in the lamp or removed from the lamp. FIG. 67 shows a compartment of the nail lamp for the battery pack. The battery slides into the compartment along rails and is held in place by tabs and friction. In the compartment, there are two electrical connectors 6707 and 6709. One connector is for supplying power to the pack, such as for recharging the pack. The other connector is for receiving power from the pack, such as for powering the lamp using the pack. The nail lamp also has a DC power input 6306 (as shown in FIG. 63) which can be from wall outlet and AC-to-DC adapter.

Figure 68:
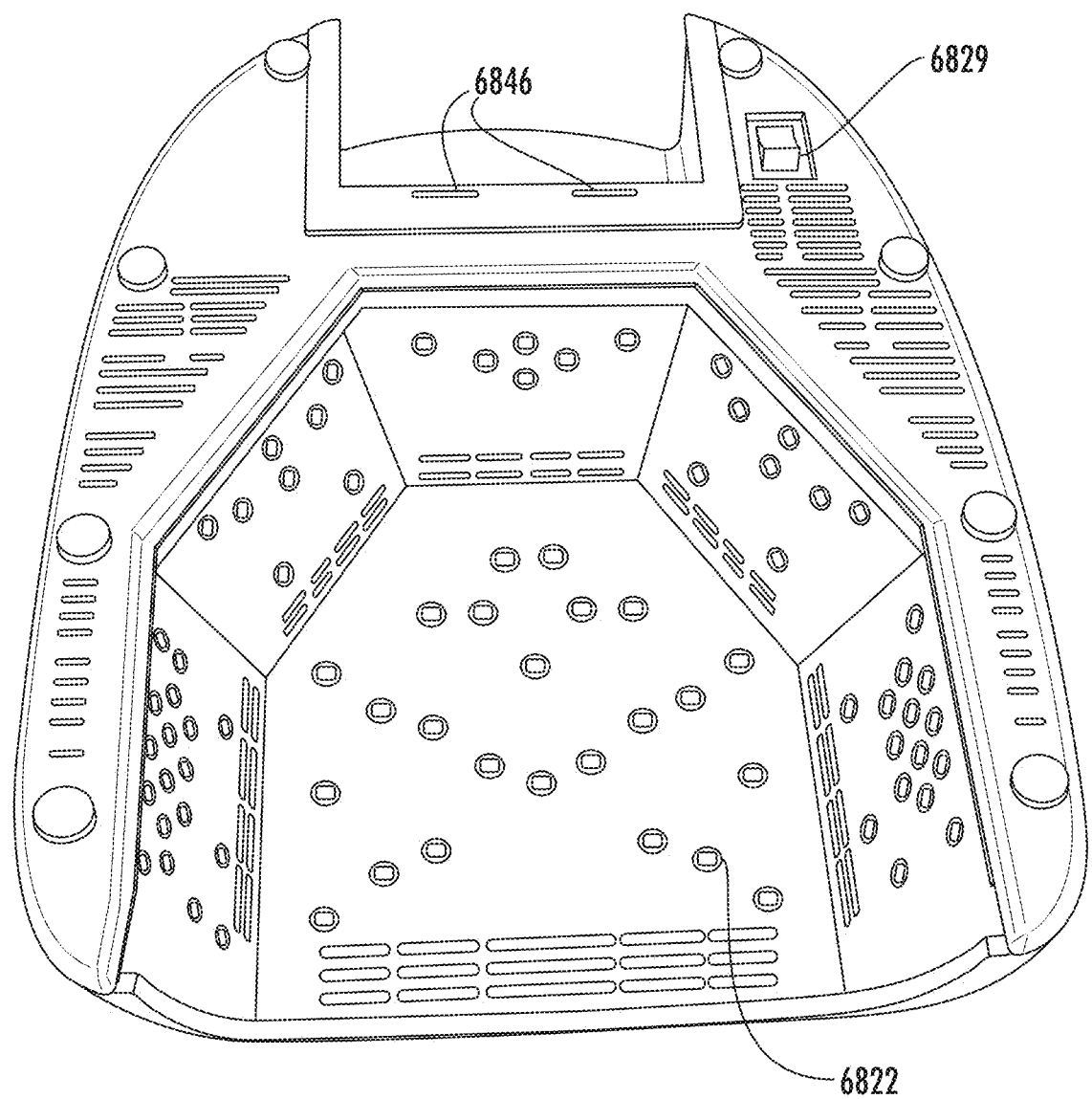
Figure 69:
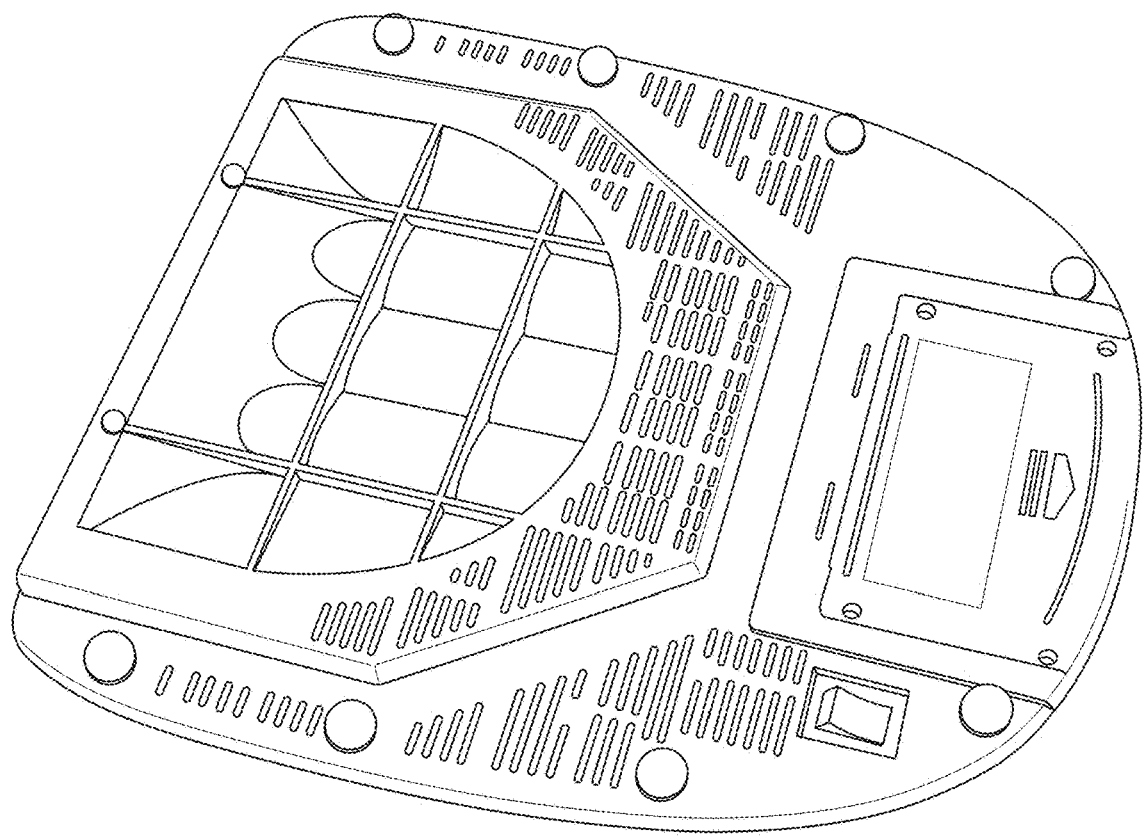

FIG. 68 shows view of the treatment chamber from a bottom of the lamp when the fingerplate is removed. The treatment chamber is lined with reflective metal, which directs ultraviolet light toward the surfaces (e.g., fingernails) being treated. There are openings in the reflective metal, and each opening 6822 has a surface-mounted light emitting diode, which emits the light for the chamber.

In an implementation, the fingerplate is made from a white plastic, which is a less reflective than the reflective metal used for the treatment chamber. By having a less reflective fingerplate, then the light from the LEDs will not be reflected back in a direction away from the surface of the nails being cured. This allows more of the emitted radiation reach the nails being cured, which will improve curing quality and reduce curing time.

The lamp as a three-position dimmer switch. There are three positions for this switch. In a first position, the exterior lighting of the lamp which caused the shell to glow is on at its highest intensity level. In a second position, the exterior lighting of the lamp is on at a first lower intensity level, relatively less than the highest level. In a third position, the exterior lighting of the lamp is on at a second lower intensity level, relatively less than the first lower level.

In another implementation, there is a fourth position where the exterior lighting of the lamp is off, and does not turn on, even when the light in the treatment chamber is on. This fourth position can be an additional position or a position than replaces one of the other three positions.

Figure 70:
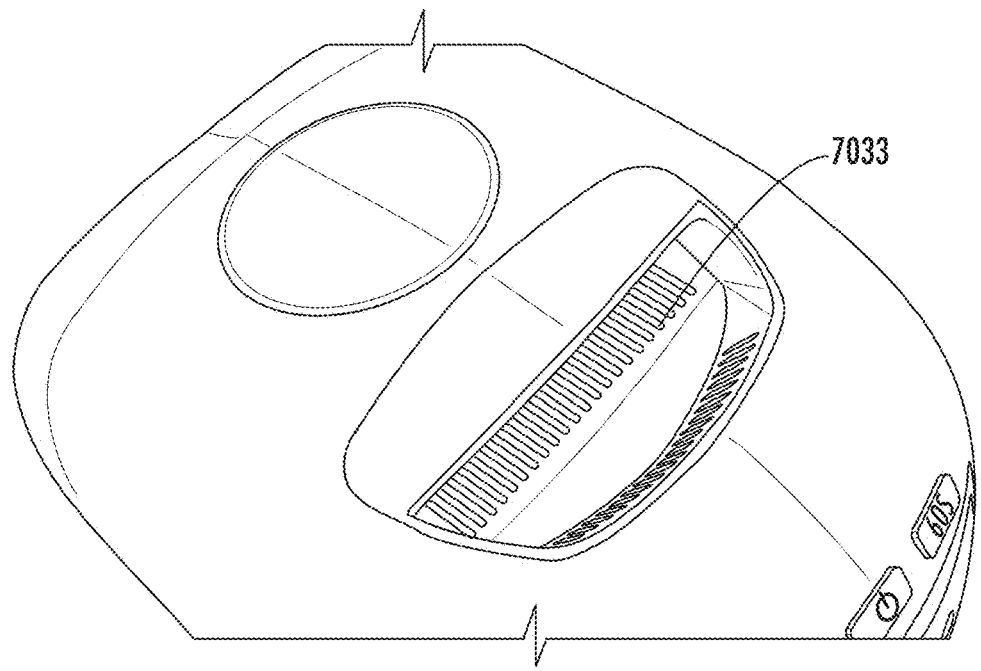
Figure 71:
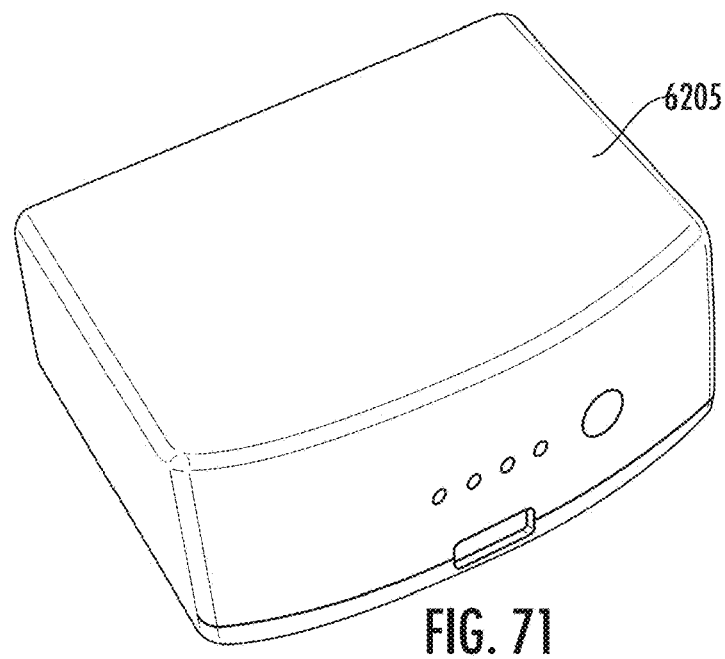
FIGS. 71-76 show various view of the rechargeable battery pack of the nail lamp.
Figure 72:
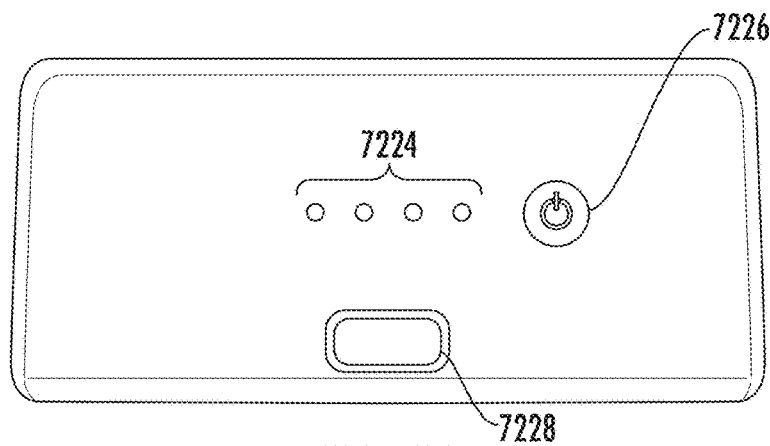
Figure 73:
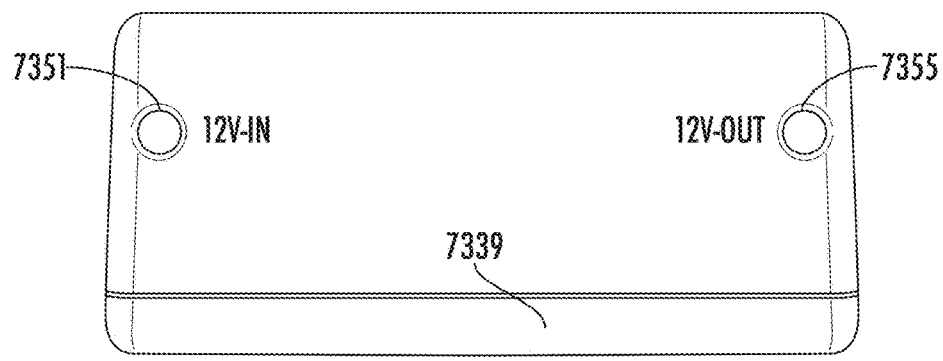

As shown in FIG. 70, there is a handle 7033 built into the unit which a user can use to carry the lamp. Within the handle, there are vent slots that allow air to flow out of the unit. In an implementation, convection air flow (e.g., no fan) is to exhaust the heat hot air. Cool air enters the interior of the lamp from vent openings on a bottom side (e.g., lower housing) of the lamp, and hot air exits via vent openings on upper side (e.g., upper housing) of the lamp. These upper vent openings are beneath the handle.

FIGS. 71-75 show views of a battery pack 6205 when it is removed from the nail lamp. A front side of the battery pack is opposite of the opening to the treatment chamber. On the front side, the battery pack has a battery gauge with four LEDs 7224. Each LED represents 25 percent of charge remaining when lit. For a full pack, all four LEDs are lit to indicate an about 75 to 100 percent charge level. When three LEDs are lit, the pack will have an about 50 to 75 percent charge level. When two LEDs are lit, the pack will have an about 25 to 50 percent charge level. When one LED is lit, the pack will have an about 0 to 25 percent charge. When no LEDs are lit, the pack will have a very low level of charge remaining and may be completely exhausted.

The front side also has an on-off button 7226 and a USB port 7228. The on-off turns on and off the battery pack. The USB port is a charger port and can be used to charge other devices such as a phone or table via a USB cable. For example, while a customer is having nails done, the customer can easily also be charging their smartphone.

A back side 7339 of the battery pack includes a power input port 7351 and a power output port 7355. In a specific implementation, the ports use a 12-volt voltage level. The power input and output ports are female ports that mate with corresponding male connectors 6707 and 6709. The power input port receives power from the lamp (e.g., via a power input of the lamp) and can recharge the rechargeable cells in the battery port. The power output port supplies power from the rechargeable cells to the nail lamp. The battery can be recharged at the same time it is supplying power to the nail lamp.

Figure 74:
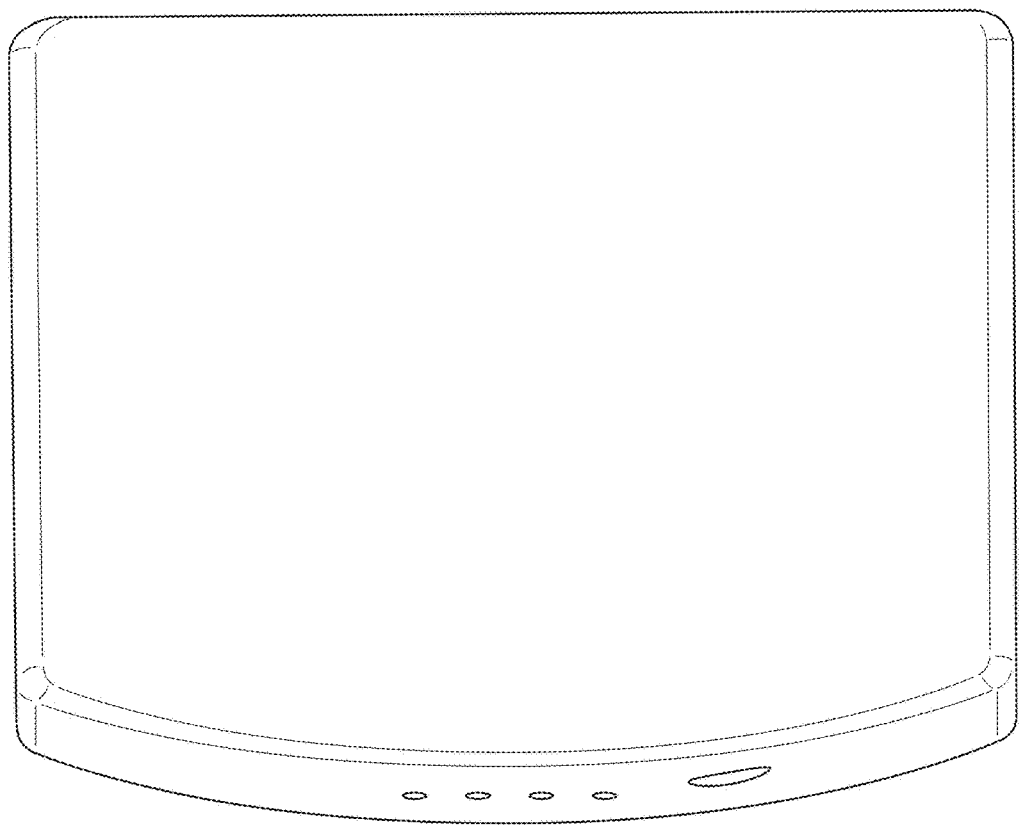
Figure 75:
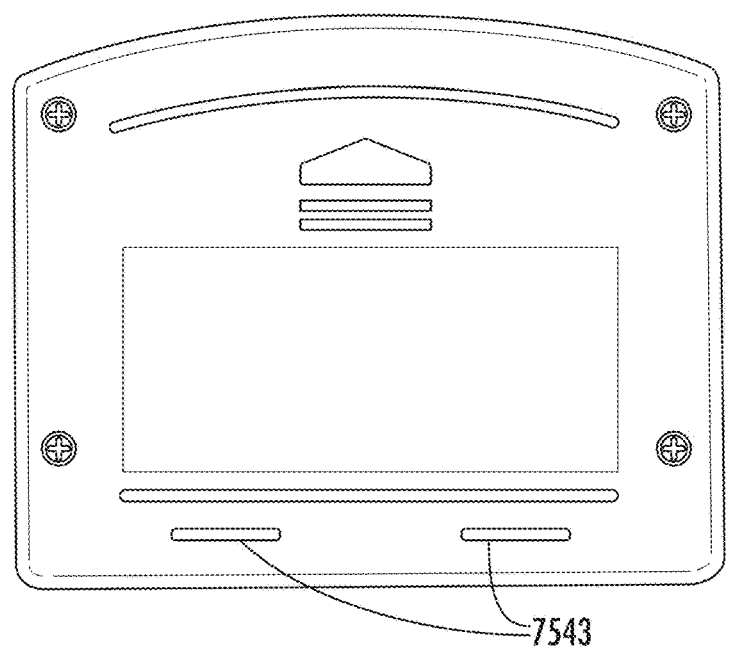
Figure 76:
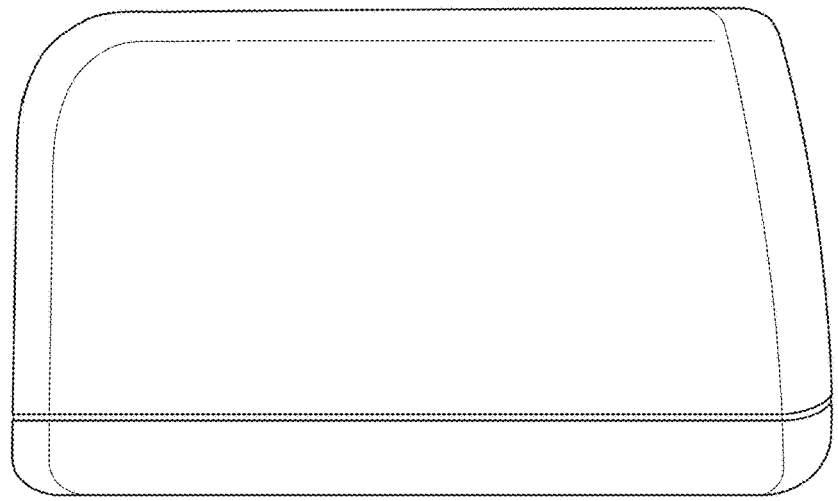
Figure 77:
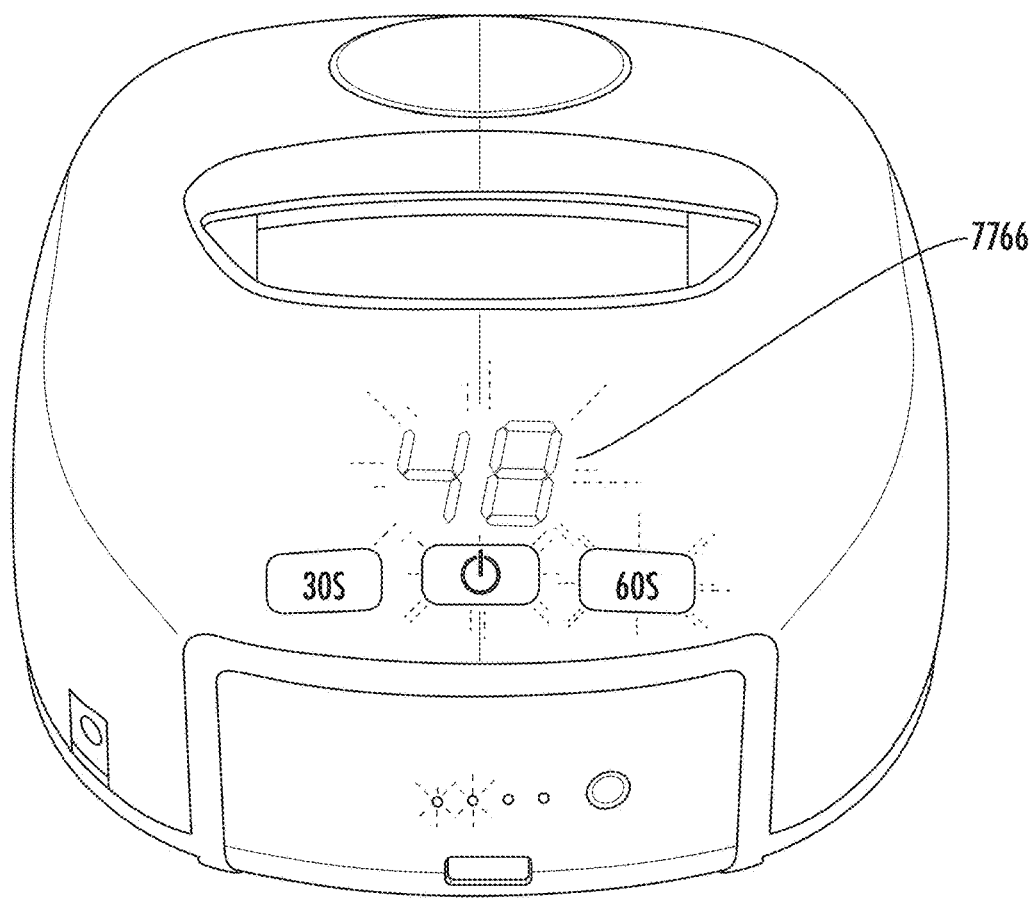
FIGS. 77-80 show various views of another nail lamp implementation.

FIG. 74 shows top view of the battery pack. FIG. 75 shows a bottom view of the battery pack. FIG. 76 shows a side view. The bottom of the battery pack has two tabs, protrusions, or rails 7543. These connect with or mate with slots 6846 (or grooves), as shown in FIG. 68, in the nail lamp to help the battery pack stay in the battery compartment. These tabs of the battery and slots of the nail lamp hold together via a friction fit.

FIG. 77-80 show a nail lamp with translucent shell. The lamp has a display 7766, which display a countdown time. Below the display, the nail lamp has three buttons, a 30-second timer button, a 60-second timer button, and an on-off button. For portable, battery-power operation, the battery pack is turned on using the on-off button of the battery pack. As long as the battery pack is on, the battery gauge indicates a battery charge level of the pack.

While the battery pack is on, the user can turn the lamp on using the on-off button of the lamp. When first turned on, the mode we default to a 30-second countdown. The user may select the 60-second countdown mode instead by pressing the 60-second button. The selected time is shown in the display, such as 30 second or 60 seconds. When a user places his fingers into the treatment chamber, the interior lights of the chamber will automatically turn on, and also the exterior lights will cause the shell to glow. The fingers are detected by a detection sensor in the treatment chamber. Once triggered on the treatment chamber is on, if the fingers are removed, the treatment chamber will remain on the remainder of the selected time. The treatment chamber lighting can be turned off by manually hitting selected curing time button again or the on-off button of the lamp (which turns of the lamp).

Figure 78:
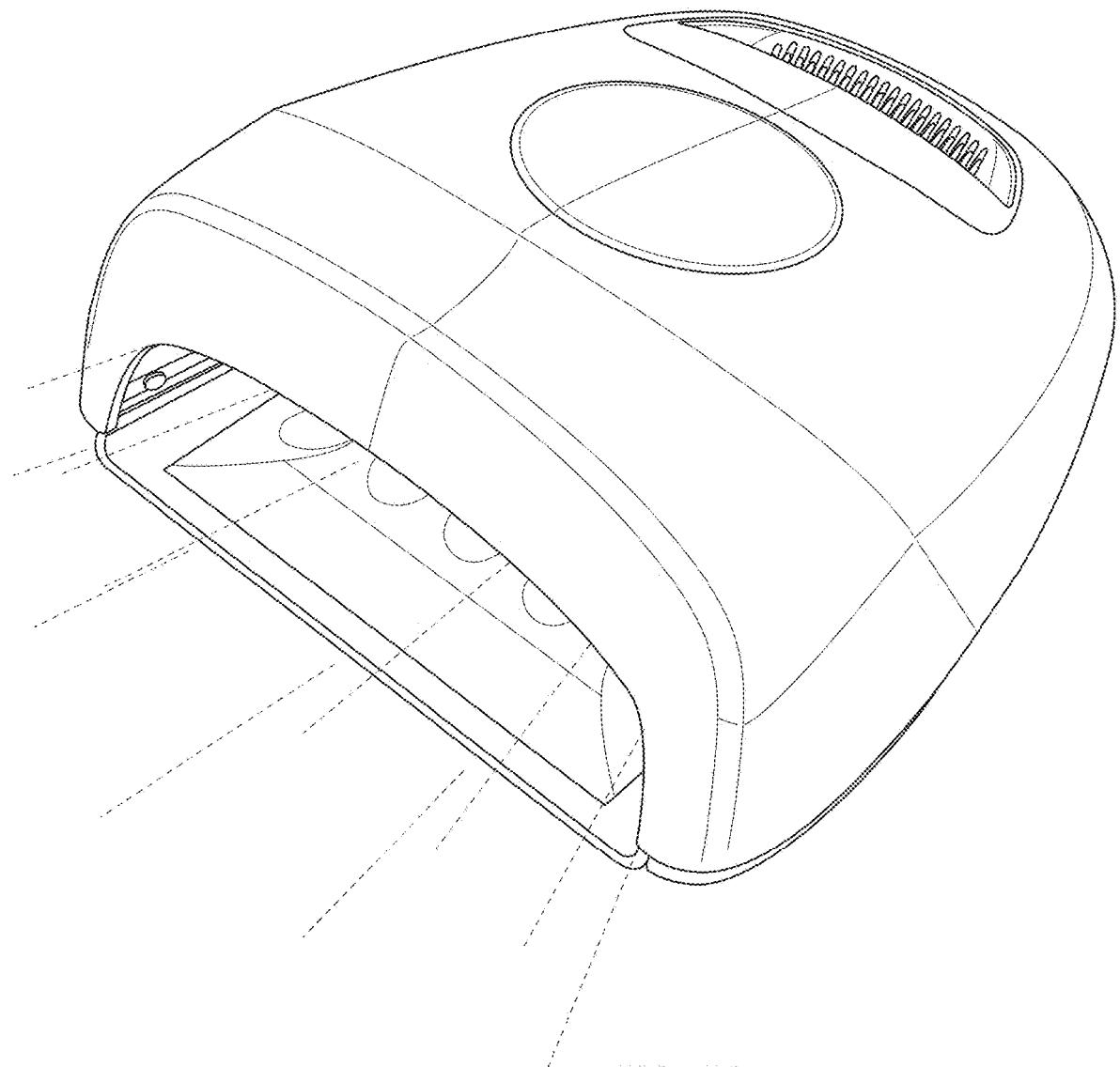
Figure 79:
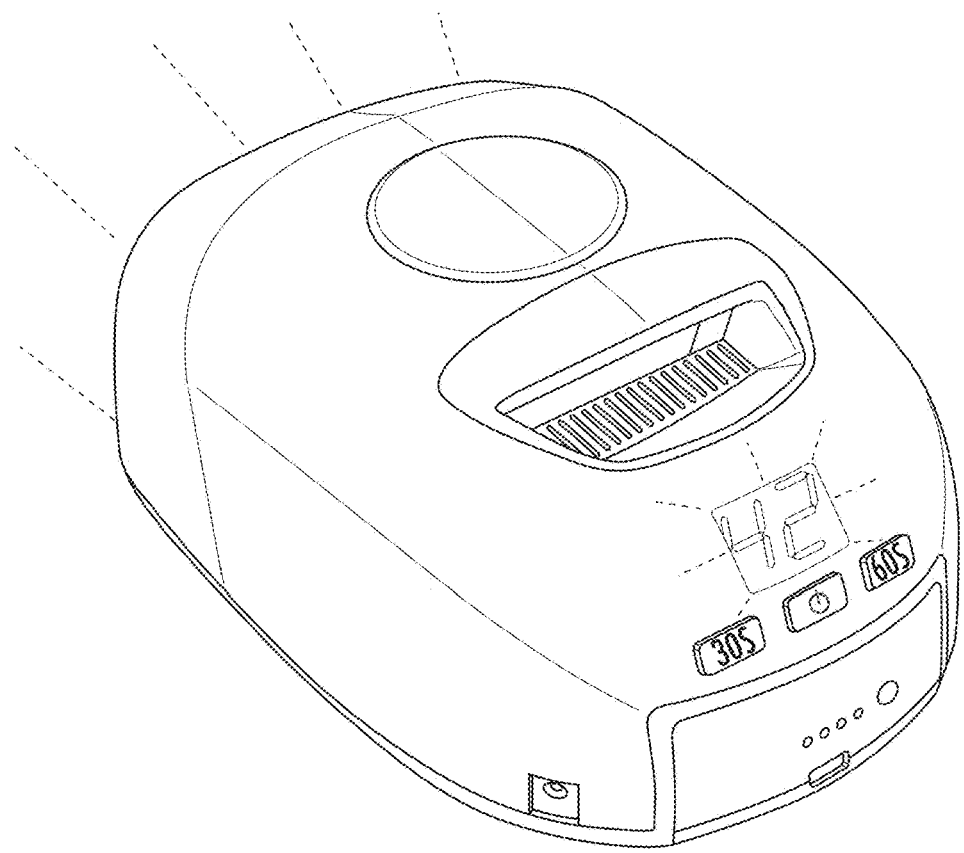
Figure 80:
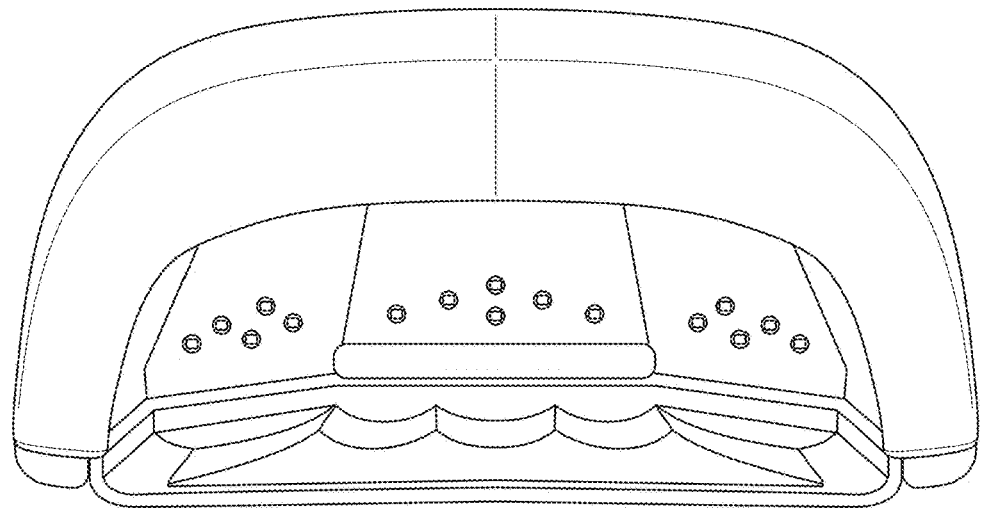

FIGS. 78-79 shows various views of a lamp in operation. FIG. 80 shows a treatment chamber where the chamber is not on. During operation, the treatment chamber is lit, exterior shell is lit, and the display shows the remaining time in seconds for the treatment chamber to remain on. When the countdown reaches 0, then the treatment chamber lighting turns off and the exterior shell lighting turns off.

Also the buttons illuminate to indicate the selected mode. When turned on, the on-off button of the lamp is illuminated. When off, the on-off button of the lamp is not illuminated. When the 30-second mode is selected, the 30-second button is illuminated. When the 30-second mode is not selected, the 30-second button is not illuminated. When the 60-second mode is selected, the 60-second button is illuminated. When the 60-second mode is not selected, the 60-second button is not illuminated. The buttons stay illuminated regardless of the lighting state of the treatment chamber and exterior shell.

The 30-second and 60-second buttons can be used to manually turn on the treatment chamber lighting. A first press of a button selects a curing time designated by the button. A second on the same button turns on the lamp for that selected time. The user does not need trigger the detection sensor and circuit to turn on the lamp.

Figure 81:
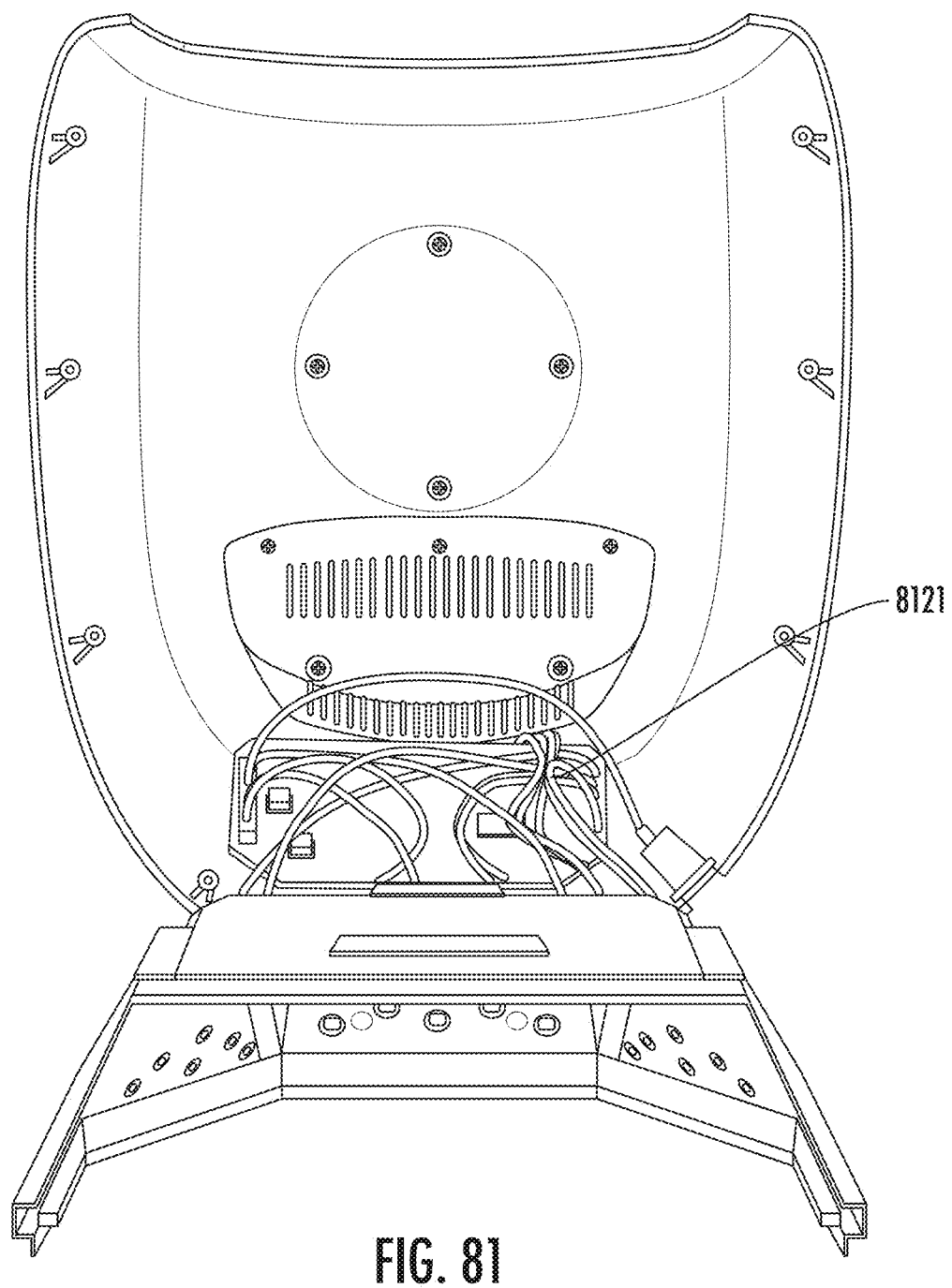
FIGS. 81-82 show opened-up view of internal components of a nail lamp.
Figure 82:
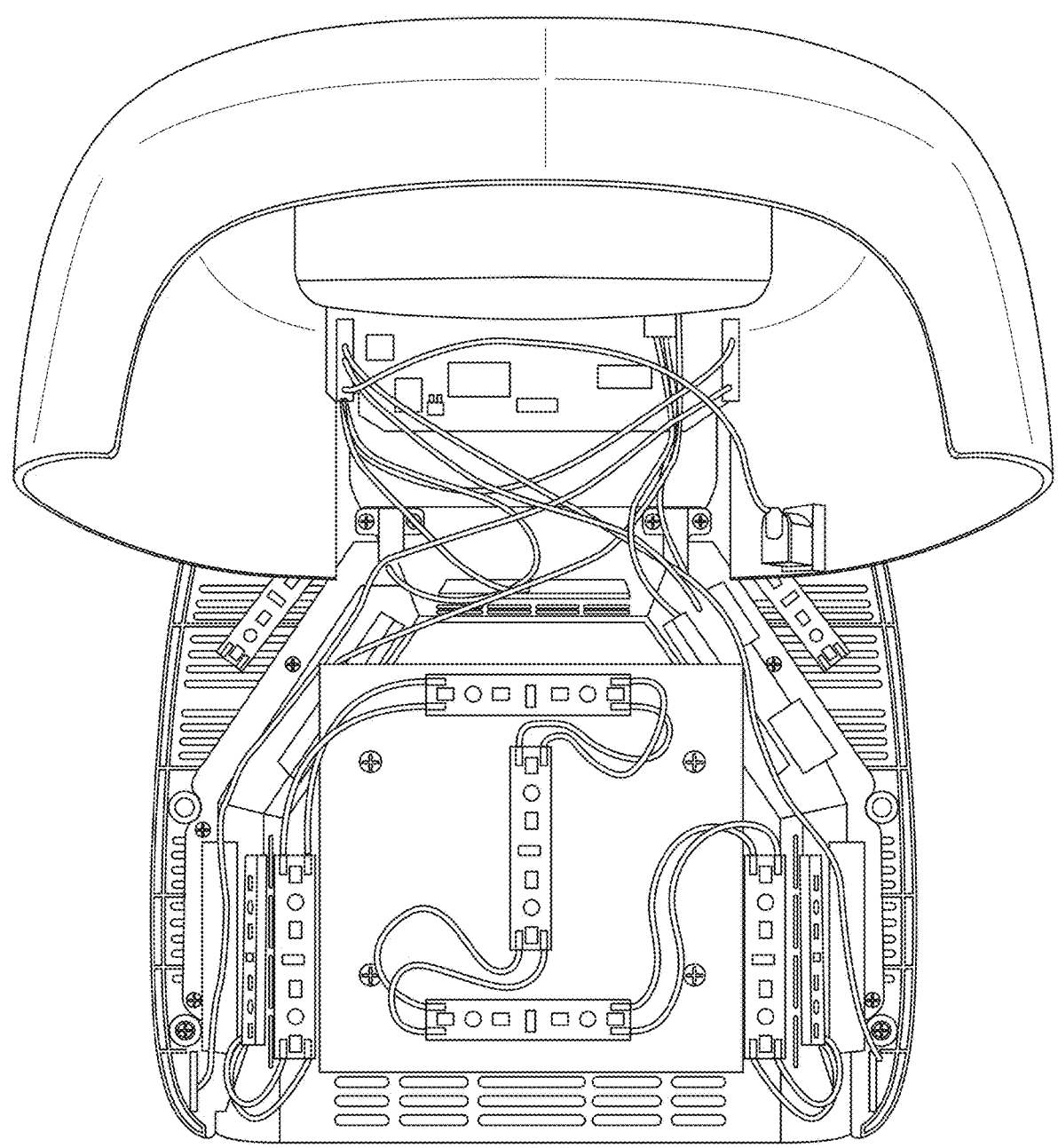

FIGS. 81-82 shows an opened-up nail lamp and its internal components. The components include a printed circuit board 8121 that controls operation of the nail lamp and multiple printed circuit boards with interior-facing light emitting diodes that direct light into the treatment chamber. There are also exterior-facing light emitting diodes that direct light away from the treatment chamber and toward the shell.

Figure 83:
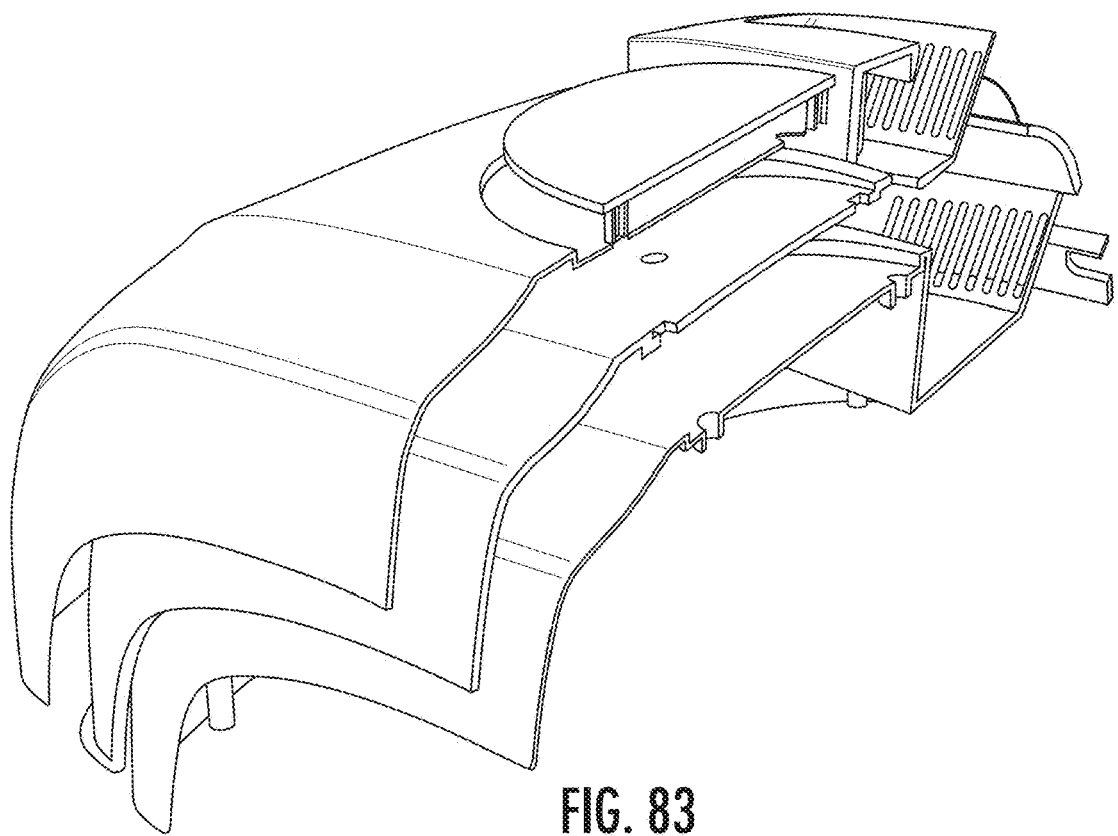
FIGS. 83-84 show an exploded cross-sectional view of a translucent shell of a nail lamp.
Figure 84:
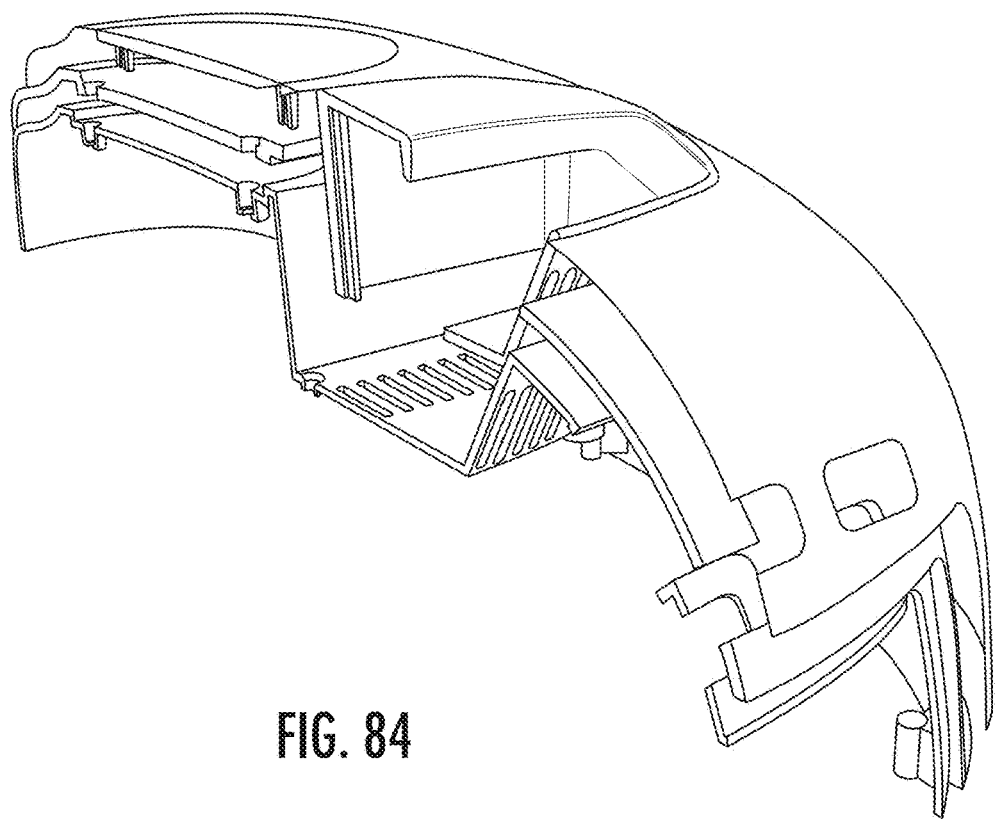

FIGS. 83-84 show a cross-section exploded view of a construction of the exterior shell. There are three layers. An inner most layer is a translucent material (e.g., acrylonitrile butadiene styrene or ABS plastic) that is white. A middle layer is a clear, colorless, transparent material (e.g., polycarbonate or PC). An outer layer is a translucent paint, which can be of many different colors including rose gold, green, purple, red, and many others. The paint can have a metallic finish. The ABS plastic layer and polycarbonate layer are formed or fused together, using a comolding, overmolding, injection molding, or double injection molding process, or a combination.

In an implementation, the entire exterior shell or large portion of the exterior shell is translucent. In other implementations, any portion of the exterior shell is translucent. For example, some smaller portion is translucent while the remaining portions of the shell are opaque. The translucent portions of the exterior shell do not include the buttons, which are separately illuminated to indicate a selected mode of operation. Further, the buttons are not necessarily visible to the user with hand in chamber because they are positioned on the unit away from the treatment chamber.

In another implementation, the construction of the exterior translucent shell includes only two layers instead of three. The translucent paint layer is omitted. The exterior shell will include a translucent material (e.g., white ABS plastic) and clear polycarbonate layers. The clear polycarbonate covers the ABS translucent material. The translucent material can be white, blue, green, red, pink, purple, indigo, violet, yellow, orange, brown, black, and other translucent colors. The clear polycarbonate is transparent. In other implementations, the polycarbonate layer can be colored and translucent.

In a specific implementation, the two layers of the different types of plastic, such as ABS plastic and polycarbonate, can be formed using a double injection molding process.

1. In a double injection molding process, both layers of the mold or case can be colored. The polycarbonate material can be colored or clear or transparent.

2. First, the first material, polycarbonate material, is injected into a mold at a higher melting temperature (e.g., from about 220 degrees Celsius to about 230 degree Celsius). Then, the second layer of material, ABS material, will be injected in the mold at a lower melting temperature (e.g., from about 220 degrees Celsius to about 170 degrees Celsius). The ABS material will be attached to the polycarbonate material by this double injection molding process.

Figure 85:
FIGS. 85-87 show packaging for a nail lamp.
Figure 86:
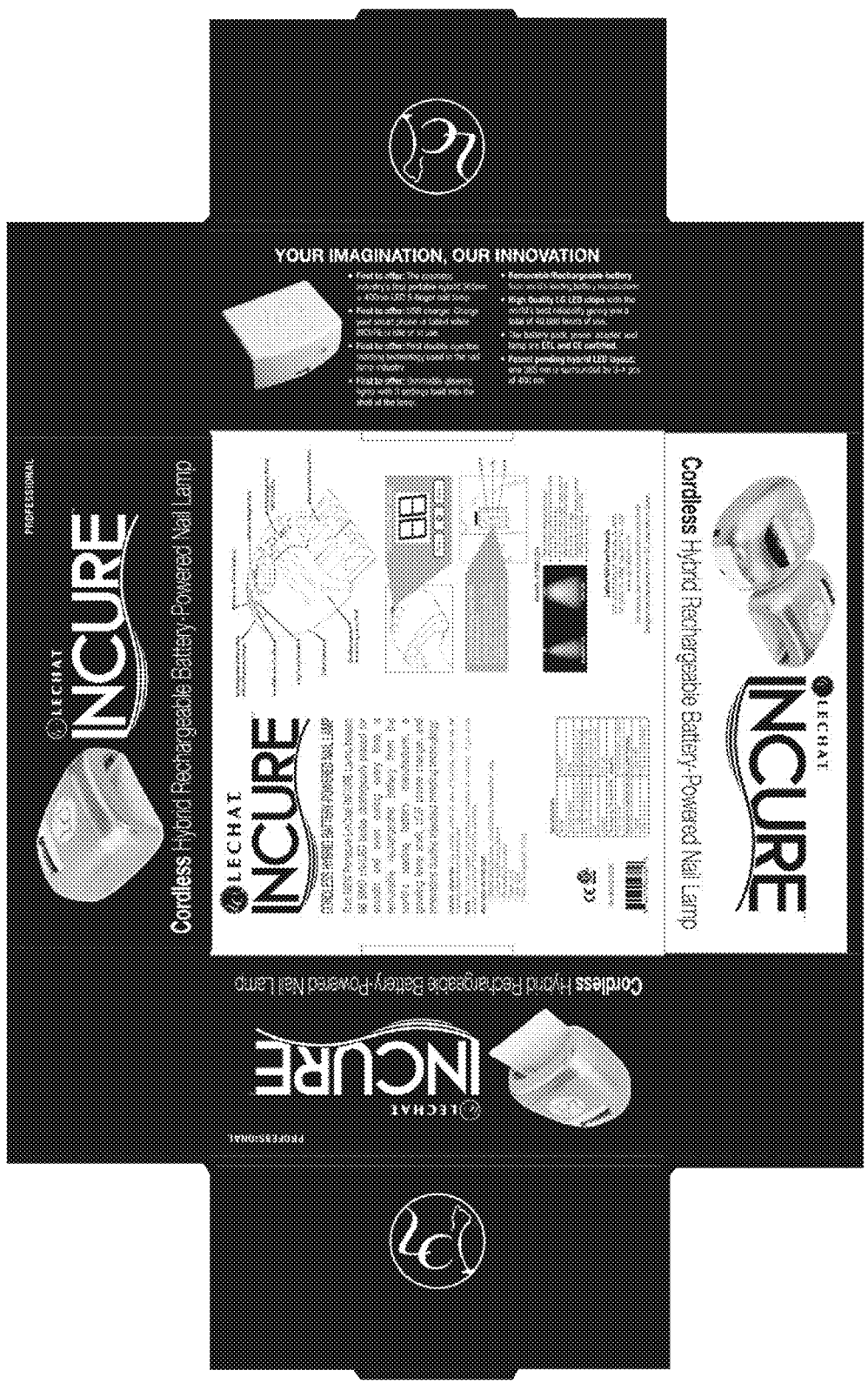
Figure 87:
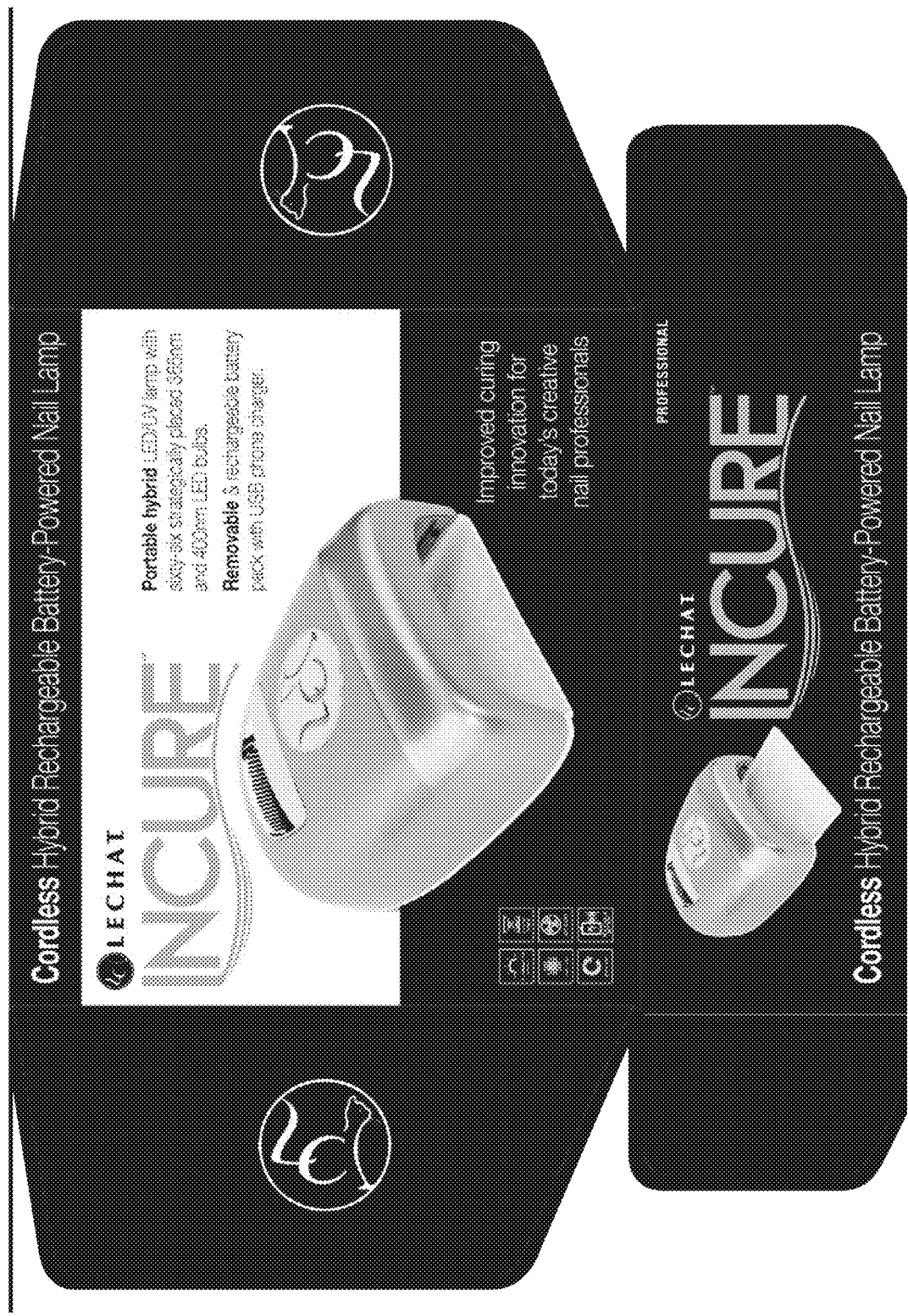

FIGS. 85-87 show a packaging for a nail lamp. In a kit for a nail lamp, the kit will include the nail lamp, rechargeable battery pack, and user instructions, and these will be contained within the packaging.

There is information, text and images, on the packaging or box. On a top panel of the box, the information can include "Cordless Hybrid Rechargeable Battery-Powered Nail Lamp," a trademark or logo, or both, of the company (e.g., LeChat), a name of the product (e.g., INCURE), and photograph, rendering, or other image of the product. Further information can include "portable hybrid LED/UV lamp with sixty-six (66) strategically placed 365-nanometer and 400-nanometer LED bulbs," and "removable long-lasting battery pack with USB phone charger" or "removable and rechargeable with USB phone charger." Further information can include "improved nail curing innovation for today's creative nail professionals" or "improved curing innovation for today's creative nail professionals." There can include other information (e.g., bullet points with symbols) regarding "illumination effect," "digital time," "SMD LEDS," "efficient," and "removable battery."

On a front panel, the information can include "Cordless Hybrid Rechargeable Battery-Powered Nail Lamp," "Professional," a trademark or logo, or both, of the company (e.g., LeChat), a name of the product (e.g., INCURE), and photograph or rendering of the product. On top side flaps (e.g., left and right), there can be a trademark or logo, or both, of the company (e.g., LeChat).

On a bottom side panel (e.g., right), the information can include "Your Imagination, Our Innovation," an image of a battery pack, and the following bullet points:

1. First to offer: The cosmetic industry's first portable hybrid 365-nanometer and 400-nanometer LED 5-finger nail lamp.
2. First to offer: USB charger. Charge your smart phone or tablet while INCURE is idle or in use.
3. First to offer: First double injection molding technology used in the nail lamp industry.
4. First to offer: Dimmable glowing lights with 3 settings built into the shell of the lamp.
5. Removable/Rechargeable battery from world's leading battery manufacturer.
6. High Quality LG LED chips with the world's best reliability giving you a total of 40,000 hours of use.
7. The battery pack, power adapter, and lamp are ETL and CE certified.
8. Patent pending hybrid LED layout; one 365 nanometer is surrounded by 3-4 pieces of 400 nanometer.

On bottom side flaps (e.g., left and right), there can be a trademark or logo, or both, of the company (e.g., LeChat). On bottom front and back panels, the information can include "Cordless Hybrid Rechargeable Battery-Powered Nail Lamp," "Professional," a trademark or logo, or both, of the company (e.g., LeChat), a name of the product (e.g., INCURE), and photograph or rendering of the product.

On a bottom panel, the information can include "Cordless Hybrid Rechargeable Battery-Powered Nail Lamp," a trademark or logo, or both, of the company (e.g., LeChat), a name of the product (e.g., INCURE), and photograph, rendering, or other image of the product. Further information can include "This new portable LeChat Incure lamp boasts 66 SMD UV/LED bulbs strategically placed for smooth and even curing every time, a removable rechargeable battery from the world's leading battery manufacturer, a glowing lamp shell, USB phone charge, and innovative double injected molding technology." Further information can include "Please register your product within 30 days of purchase. Please see the Warranty Registration Card included." Further information can include "Note: You must register your product to maintain the warranty. If you do not register your product it will void all warranties."

On the bottom panel, further information can include "Included in this Box:
1 Incure 36 W Cordless Hybrid Batter-Powered Nail Lamp
1 LeChat Incure Lamp Battery
1 Removable hand plate
1 Power cord
1 User guide
1 Warranty Registration Card."
Further information can include "CE" and associated symbol, "Item #HLCLED36," and a barcode. There can be a table with specifications: Model: Incure, Output power: 36 watts, Number of UV (365 nanometers): SMD LED X 22, Number of LED (400 nanometers): SMD LED bulb X 44, Size: 230×110×215 millimeters, Weight: 45 pounds, Accessory: Universal AC adapter: 100 volts to 240 volts AC, 1.5 amps, Accessory: LeChat Incure Lamp Battery: Charge 13200 milliamp-hours, 12 volts DC 3.3 amps (maximum).

Some features of the lamp include:
1. Double injected illuminating lamp shell
2. 3-Way Dimmer
3. Easy Carry Handle
4. Ventilation for cooling
5. Rechargeable battery pack with USB phone charge
6. Power and Timer Buttons
7. Power adapter port
8. 66 Strategically placed SMD UV/LEDs
9. Removable Hand Plate.

The dimmer switch for the exterior lighting can have various brightness levels (e.g., 100 percent, 75 percent, and 50 percent. There is a 3-position glowing lamp shell switch. Some instructions include: The lamp shell glows when in use. The dimmer switch located at the bottom of the lamp puts brightness in the user's control. The dimmer selection can be (−) 100 percent, (o) 75 percent, and (=) 50 percent.

Some benefits of SMD LEDs include: there can be an image of a standard LED as compared to an SMD LED light coverage and brightness. Patent pending design and technology. SMD LED lights configured for the most evenly distributed and efficient curing. SMD LED is built with larger contact point for better power currents with less heat output. Emits a wider beam angle. Designed with more heat vent ports or openings (on top and bottom of lamp) to prevent overheating for longevity of the lamp. The cooling for the lamp can passive, where convection air flow passes or flows over heat sinks that are in contact with the LEDs. In other implementations, the cooling can be active, such as by using a fan or other electrically powered cooling unit. Elegant and clean design.

Some advantages of passive cooling over active cooling can include: (1) less noise due to not having a fan, (2) improved reliability and longevity because electric fans can fail or stop spinning, (3) reduced transmission of dust or other particles, (4) reduced transmission of bacteria or viruses (e.g., help prevent spread or transmission of viruses, especially during flu pandemics, such as H1N1 or the coronavirus or COVID-19 infectious disease during the 2019-2020 time period), and other advantages. Some disadvantages of passive cooling can include: (1) additional cost due to metal heat sinks instead of fans, (2) additional weight due to metal for heat sinks, (3) additional size increases to accommodate metal for heat sinks and ventilations openings in case, and others.

In an implementation, the upper housing has upper ventilation openings. The lower housing has lower ventilation openings. A convection air flows in through the lower ventilation openings, over metal heatsinks attached to the interior-illuminating light emitting diodes, and out through the lower ventilation openings. The cool air flow in the lower ventilation openings, is heated or warmed with passing over the metal heatsinks, and this heated air is exhausted out the upper ventilation openings. This convection air flow cycle continues while the nail lamp is operating, and cools the LEDs so that they do not overheat. The use of passive heating can help prevent the spread or transmission of viruses, such as the coronavirus or COVID-19, when compared to a fan or active cooling, which can exhaust or blow at a person's face at a relatively higher cubic feet per minute (CFM) than passive cooling.

Figure 88:
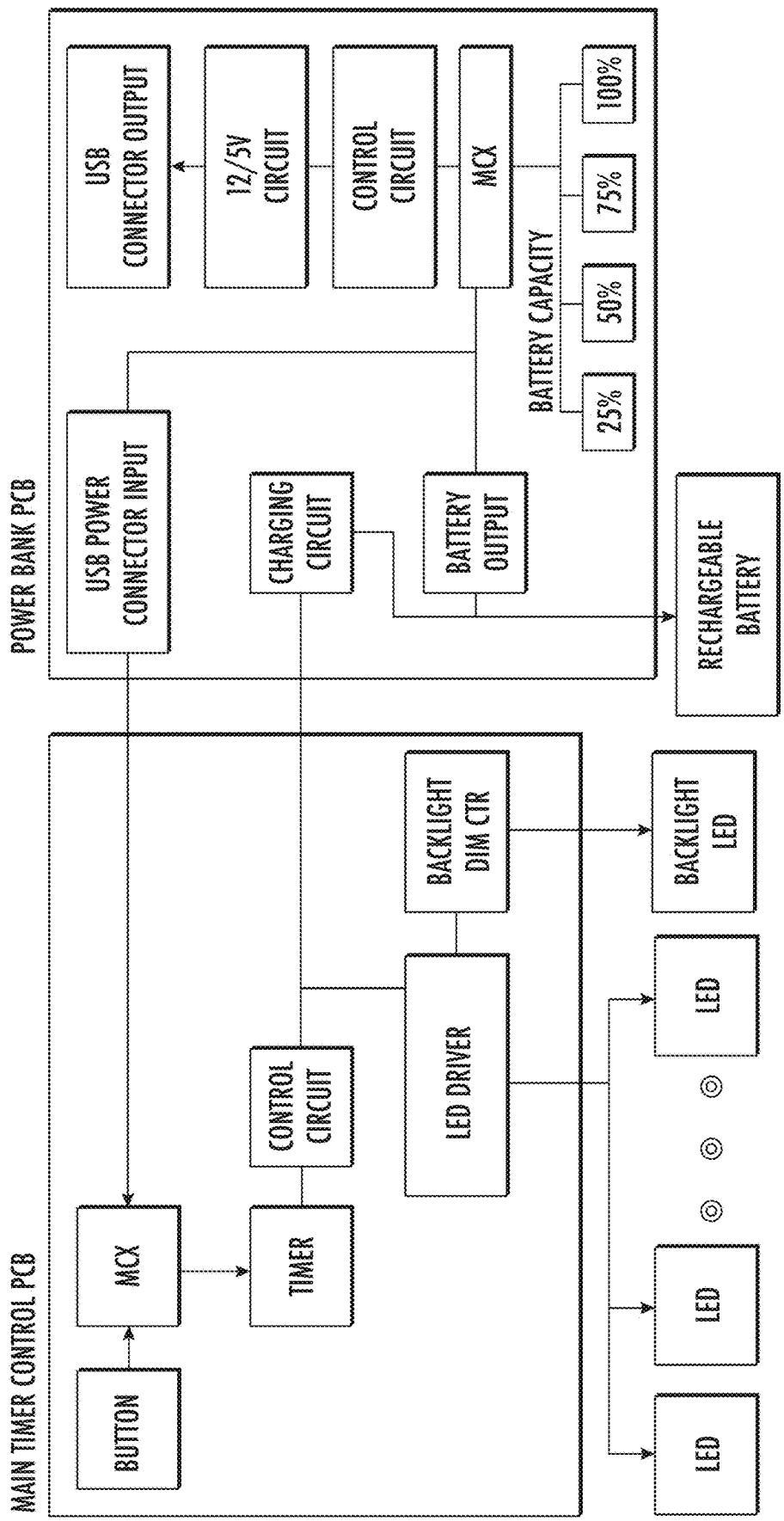
FIG. 88 shows a block diagram of electronics of a nail lamp.

FIG. 88 shows a block diagram of electronics of a nail lamp. A first circuitry block resides in the nail lamp. A second circuitry block resides in the battery pack or power bank. The first circuitry can be contained on a main timer control printed circuit board. The second circuitry can be contained on a power bank printed circuit board.

The first circuitry can include a first microcontroller (MCX) that is connected to a button and timer. The timer is connected to a first control circuit, which is connected to an LED driver. The LED driver is connected to the interior-facing LEDs which are directed at the treatment chamber. The LED driver is also connected to a backlight dimmer controller, which is connected to backlight LEDs or exterior-facing LEDs which are directed away from the treatment chamber and toward the exterior shell.

The second circuitry of the battery pack connects to the first circuitry at two connection points: (i) a charging circuit of the second circuitry is connected to the control circuitry of the nail lamp, and (ii) a USB power connect input is connected to the first microcontroller of the nail lamp. Power is delivered from the control circuit of the nail lamp to the charging circuit. Power is delivered from the battery pack from the connector input to the first microcontroller.

The charging circuit of the second circuitry is connected to a battery output and rechargeable battery or cell of the battery pack. The USB power connect input is connected to the battery output and a second microcontroller (MCX) of the battery pack. The second microcontroller is connected to a battery capacity gauge and a second control circuit of the battery pack. The second control circuit is connected to a DC-to-DC converter circuit (e.g., 12 volt to 5 volt conversion), which is connected to a USB connector output, which can be connected to other devices for charging them.

In operation, power can be supplied solely from an external power source, such from AC wall outlet through an AC-to-DC wall converter to the lamp. The external power can be used to recharge the battery pack while it is in the battery compartment of the lamp. Or, the external power source can be used to charge the battery pack directly, without being in the battery compartment of the lamp. For example, an AC-to-DC wall converter can be connected directly to the power input port of the battery pack.

Since battery packs chargeable separately from the nail lamp, multiple battery packs can be kept charged by a separate charging station or stand. When a battery pack in a lamp becomes low, that battery pack can be replaced with another charged pack from the charging station or stand. This allows users of the lamp to continually use the lamp without needing downtime to set the lamp aside and connect it to external power to charge the rechargeable battery.

When the battery pack is inserted in the battery compartment, power can be delivered from the battery pack to the power the nail lamp, even when the lamp is not connected to external power. If the battery pack is removed, the lamp can be powered by the external source only. When the battery pack is inserted in the battery compartment and the lamp is connected to an external power source, the power to the lamp can be supplied by the battery pack or external source, or both. And external power source can also be used to charge the battery pack while it is in the lamp.

In a specific implementation, an output power of the lamp is about 36 watts. A number of 365-nanometer surface-mounted LEDs is 22. A number of 400-nanometer surface-mounted LEDs is 44. A size of the nail lamp unit is about 255 by 110 by 215 millimeters. A weight of a unit is about 4.5 pounds. An included accessory is an AC adapter which takes as input power of 100 to 240 volts AC at 1.5 amps. An included accessory is an advanced mobile power pack or battery pack having a charge storage of about 13200 milli-amp-hours and output power of about 12 volts at about 3 amps.

Operating instructions for a cordless 35-watt hybrid lamp include:

1. Slide battery pack into allotted space at back of lamp. Activate battery by pushing on-off or power button on power pack.

2. To turn "on" lamp by pushing on-off or power button at back of lamp. Timer display, time button, and power button will illuminate with on.

3. Select 30 or 60 seconds by pressing corresponding button and then place hand into lamp. Sensor automatically starts timer and lights. Lights automatically turn off after selected time.

4. For toe nails, remove hand plate or fingerplace and place lamp over toes, and repeat steps 1-3.

Operating instructions for a cordless 35-watt hybrid lamp include:

1. Install a battery pack into back of lamp by sliding into space allotted until the pack firmly snaps in place.

2. Remove a battery pack by holding lamp and pushing down and outward with thumbs until battery pack dislodges from locking pins (e.g., tabs) and slides out of lamp.

3. Charge the battery pack either by plugging the power adapter into the IN or input port at the back of the battery pack, or into the back of the lamp, then plugging the plug adapter into a wall outlet.

The shell dimmer switch can be used change a backlight illumination level. There are three settings, I, O, II. Setting I is a 100 percent level setting or full brightness. Setting O is a 75 percent level setting, which is a 75 percent brightness setting. Setting II is a 50 percent level setting, which is a 50 percent setting. At reduced brightness, less power is consumed, so the battery pack can last longer.

The battery pack can be used to charge other mobile devices:

1. Connect a USB cable to the 5-volt DC USB port, and the other end of the cable to the electronic product. Press the on-off or power button of the battery pack to start charging the electronic device (e.g., smartphone or tablet computer).

2. Plug a DC cable into the 12-volt DC output port of the battery pack to charge 12-volt DC devices.

When the power level is lower than 25 percent, the power indicator LED will flash to remind the user to charge the battery pack soon. The battery pack will shut off automatically when the battery is completely discharged. Also, the battery pack will shut off automatically after 30 minutes of activity. To manually shut off the battery pack, hold the power button until all lights turn off. In a specific implementation, a size of the battery pack is about 95 by 76 by 44 millimeters. A weight of the battery pack is about 4.5 pounds.

FIGS. 89-93 show various exploded views of a nail lamp and battery pack. Tables D and E describe features referenced in the exploded views.

Figure 89:
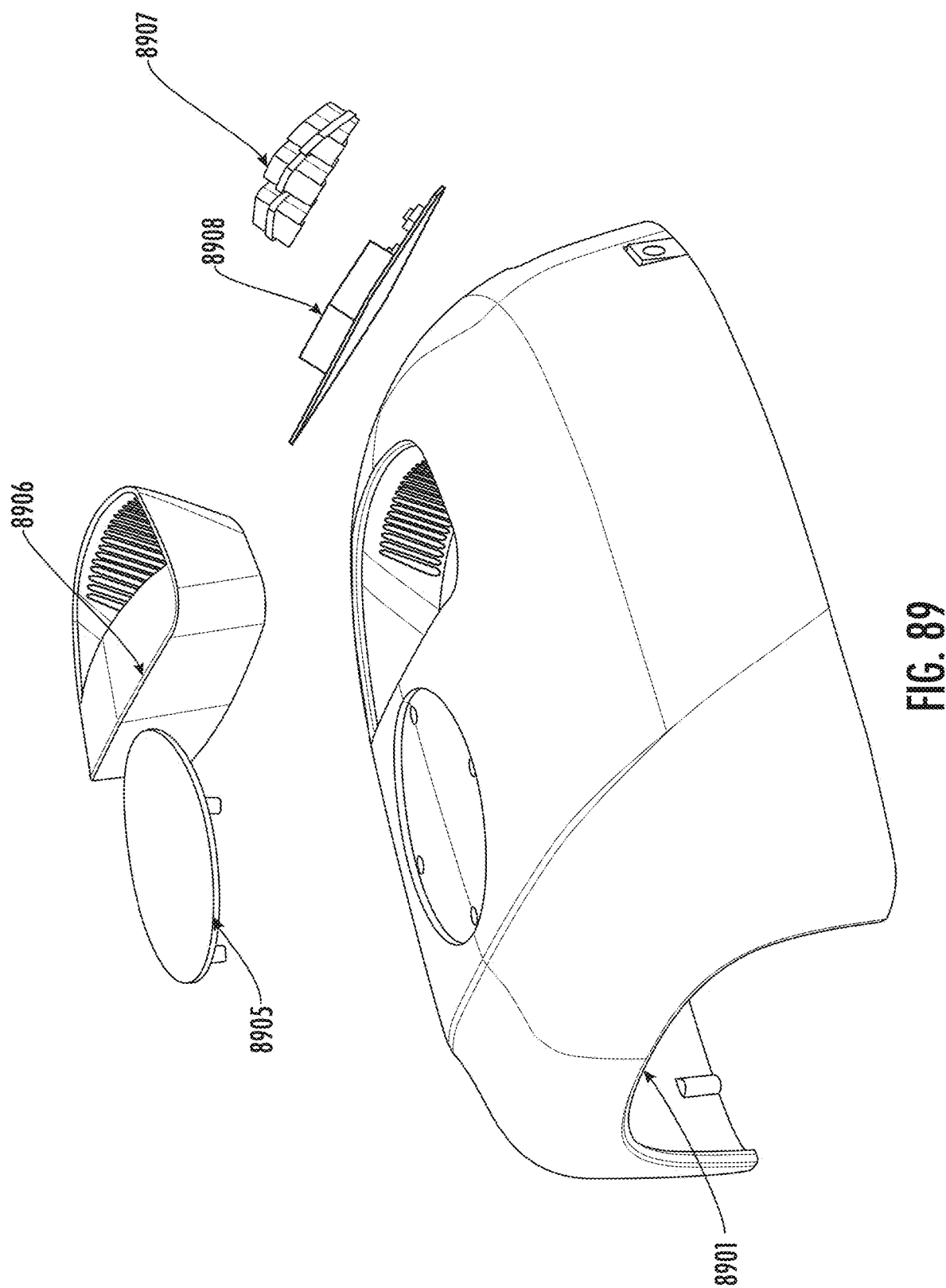
FIG. 89 shows an exploded view of an upper housing of the nail lamp.
Figure 90:
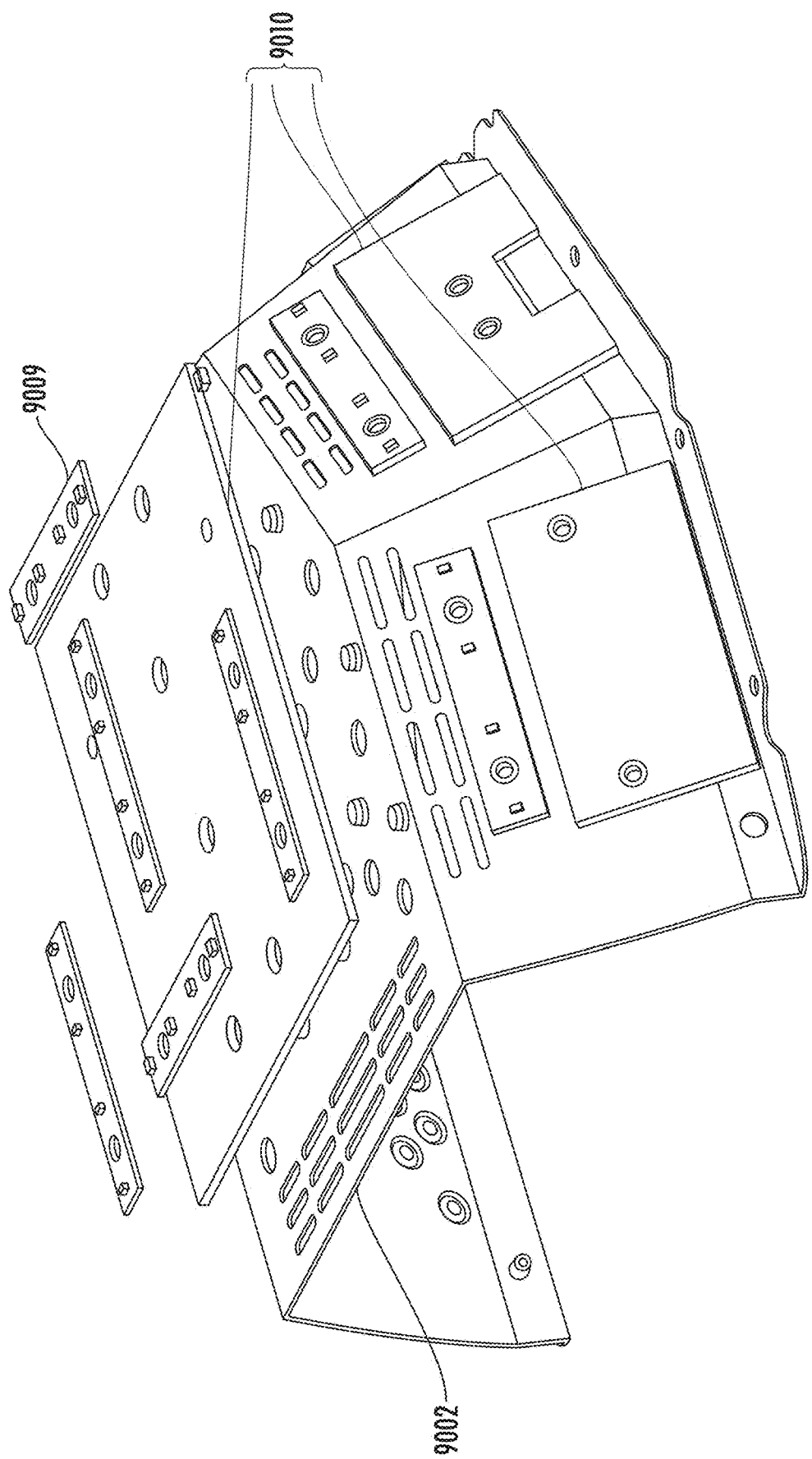
FIG. 90 shows an exploded view of an interior of the nail lamp, between the upper housing a lower housing.
Figure 91:
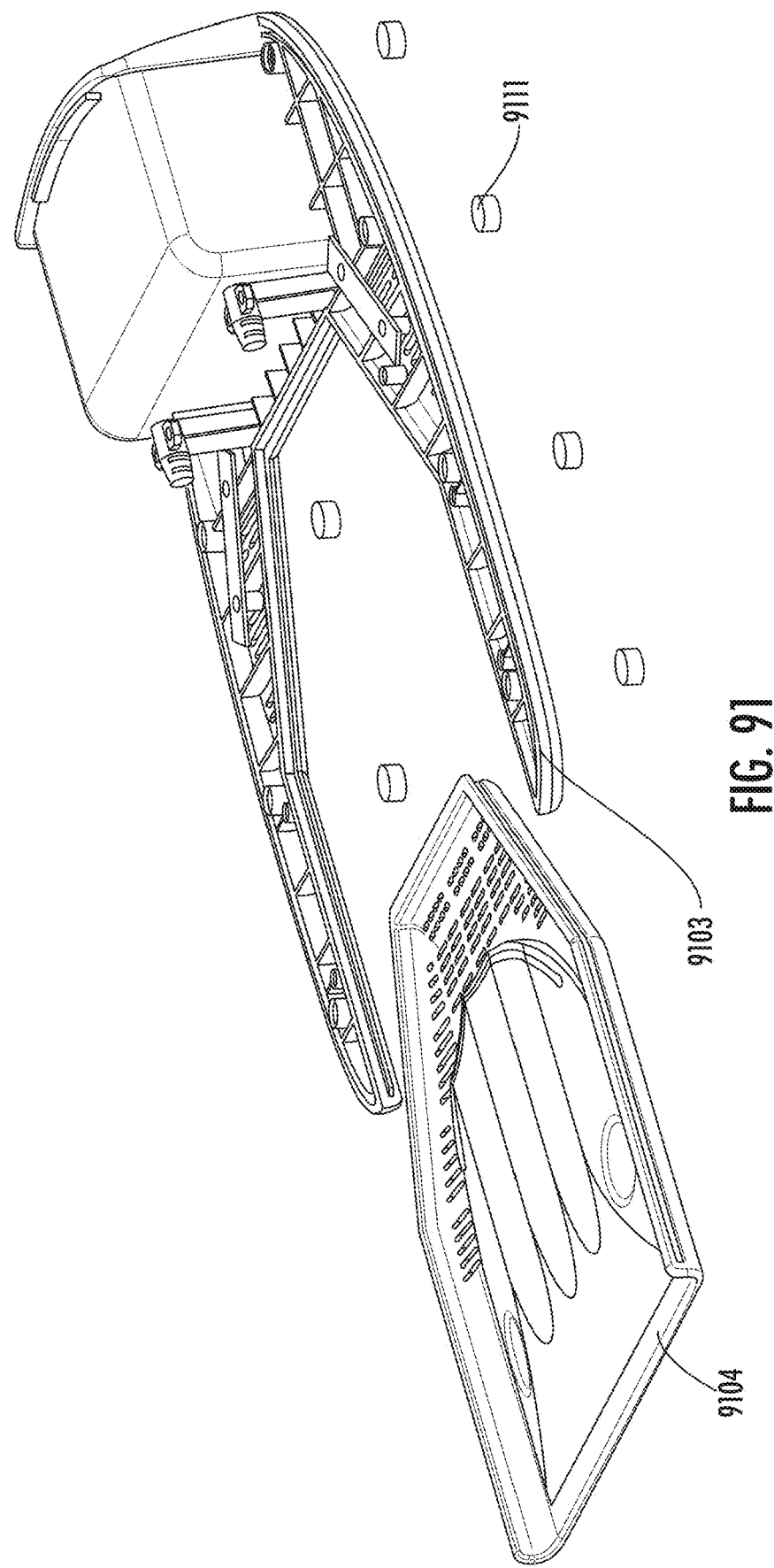
FIG. 91 shows an exploded view of a lower housing of the nail lamp.
Figure 92:
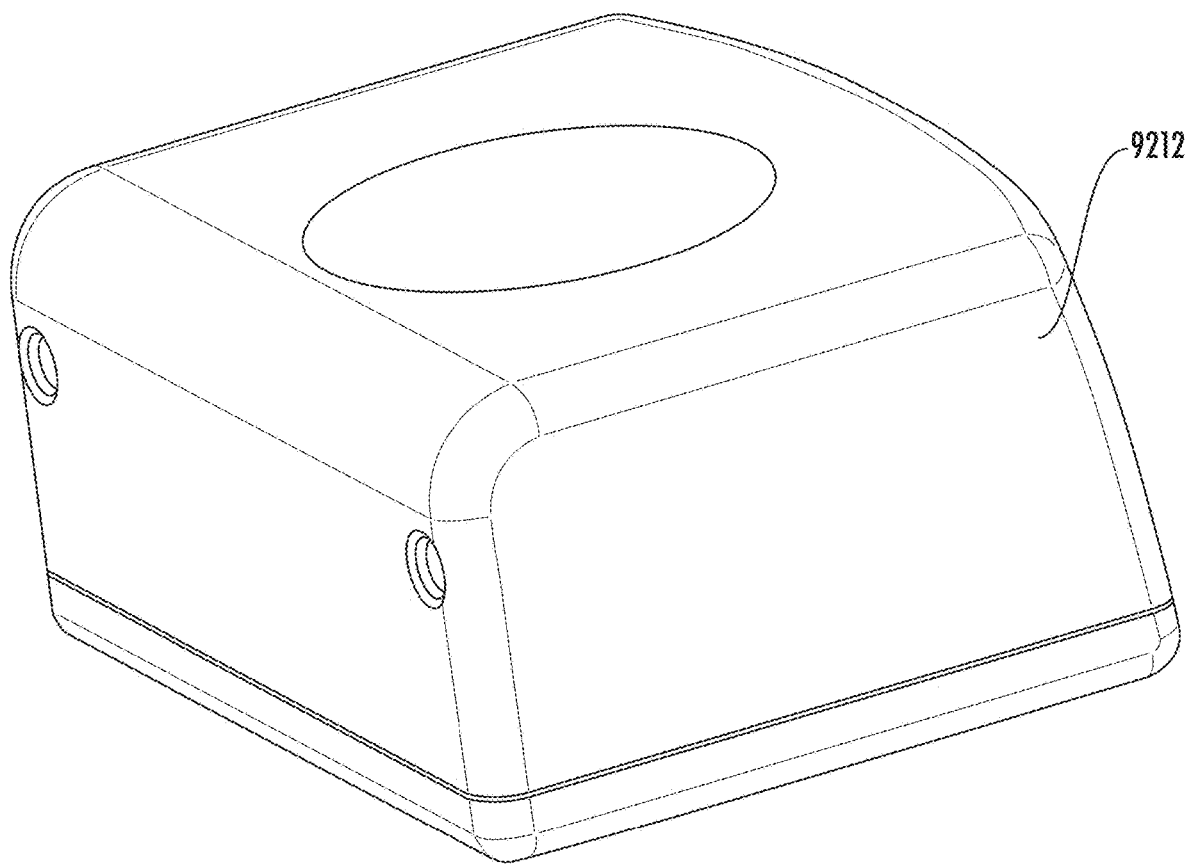
FIG. 92 shows an exterior of a battery pack.
Figure 93:
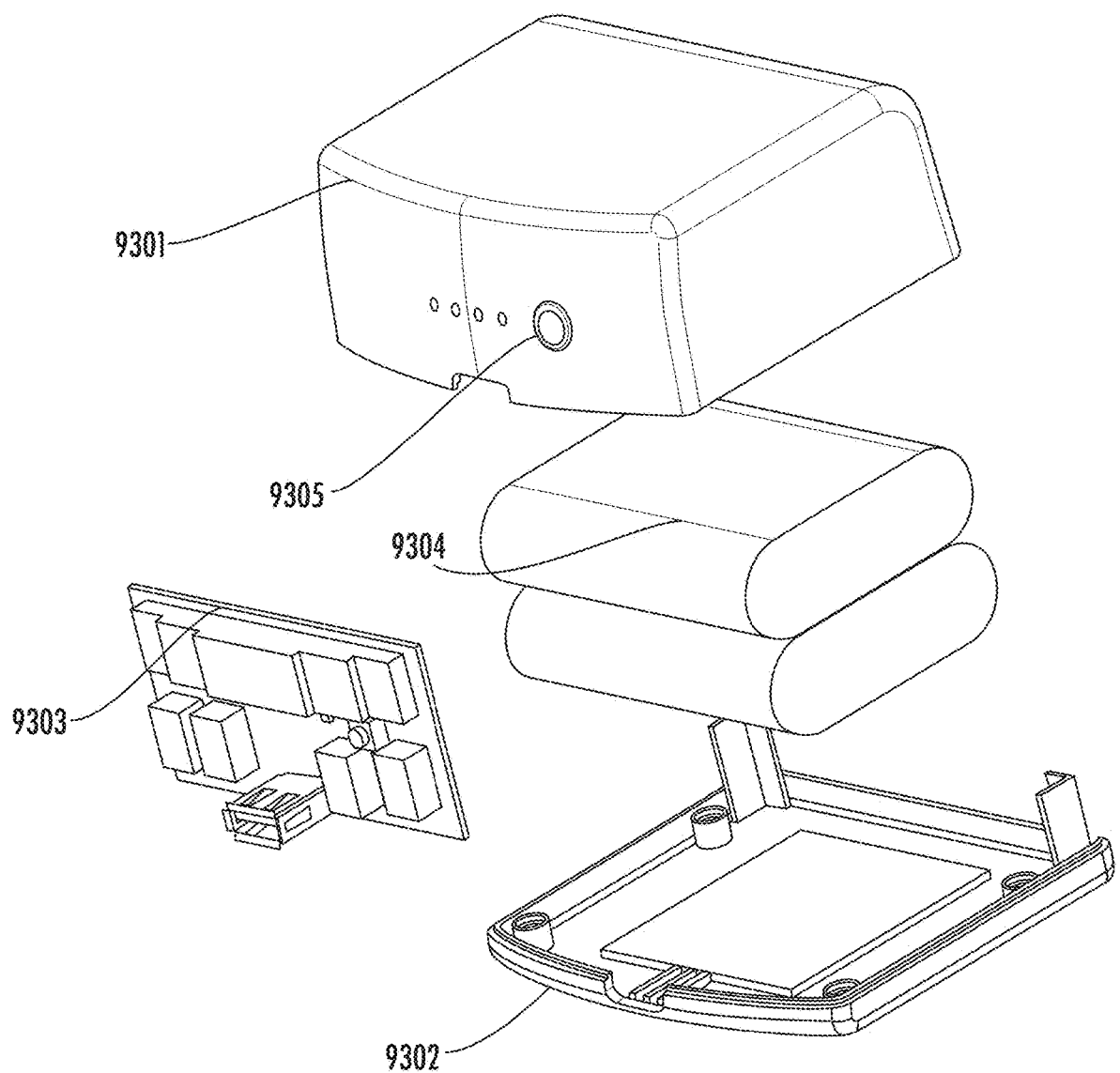
FIG. 93 shows an exploded view of a battery pack.

FIG. 89 shows an exploded view of an upper housing of the nail lamp. FIG. 90 shows an exploded view of an interior of the nail lamp, between the upper housing a lower housing. FIG. 91 shows an exploded view of a lower housing of the nail lamp. This figure also shows a removable fingerplate which removable attaches to the lower housing and a battery compartment for a battery pack. FIG. 92 shows an exterior of a battery pack. FIG. 93 shows an exploded view of a battery pack.

TABLE D

| Reference Number | Item |
| --- | --- |
| 8901 | Outer Case |
| 8905 | Logo |
| 8906 | Handle |
| 8907 | Button |
| 8908 | Control Board |
| 9002 | Inner Case |
| 9009 | Illumination Board |
| 9010 | LED Board |
| 9103 | Bottom Case |
| 9104 | Tray |
| 9111 | Feet Pad |

In an implementation, the circuit boards containing the light emitting diodes can be dual-side printed circuit boards, with light emitting diodes. The interior-illuminating light emitting diodes and exterior-illuminating light emitting diodes are formed on opposite sides of the same circuit board.

In another implementation, the circuit boards containing the light emitting diodes can be formed on single-sided printed circuit boards. The light emitting diodes are formed only on a single side of the circuit board.

The interior-illuminating light emitting diodes are formed on one or more circuit boards. The exterior-illuminating light emitting diodes are formed on one or more circuit boards, not the same boards as the interior-illuminating light emitting diodes. One or more boards with the exterior-illuminating light emitting diodes are attached or assembled together, such as by screws, to an opposite side of a circuit board with the interior-illuminating light emitting diodes.

In the lamp, the assembly of the two single-sided printed circuit boards with interior-illuminating light emitting diodes and exterior-illuminating light emitting diodes are attached to the lamp. The interior-illuminating light emitting diodes will face toward the treatment chamber. The exterior-illuminating light emitting diodes will face away from the treatment chamber and toward the shell.

Figure 94:
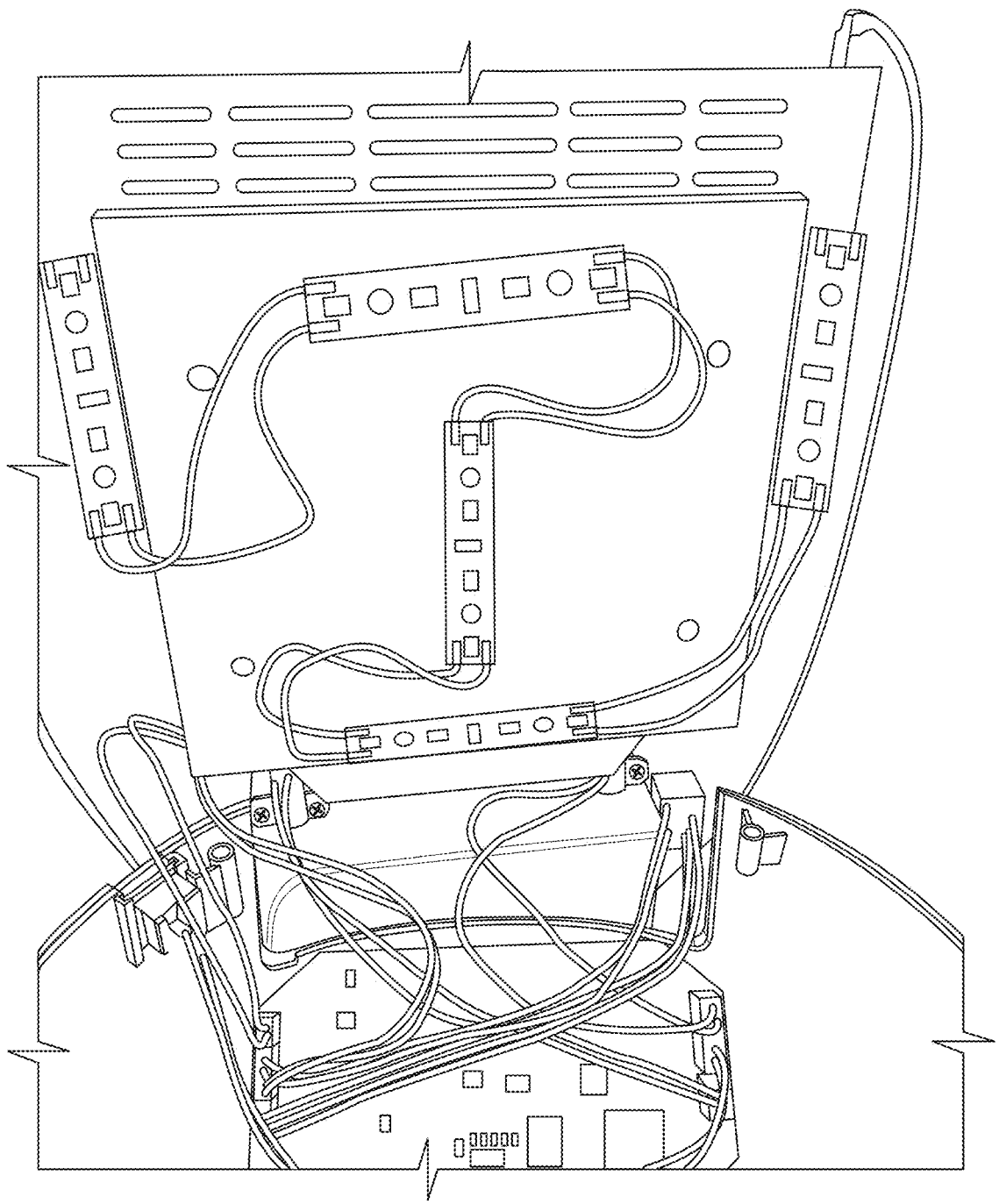
FIG. 94 shows a back side of a circuit board to which is attached a number of circuit boards with exterior-illuminating light emitting diodes.
Figure 95:
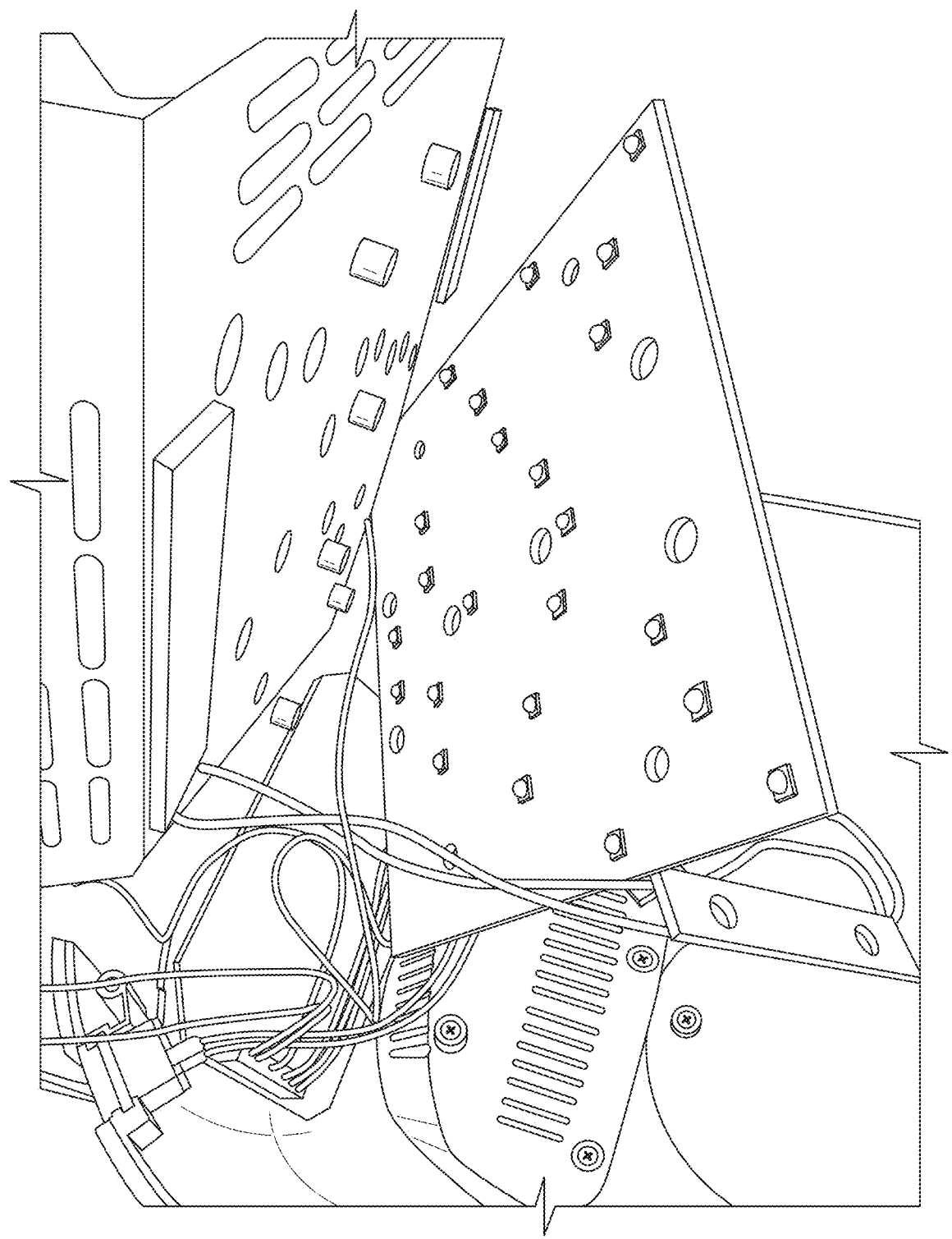
FIG. 95 shows a front side of the circuit board with interior-illuminating light emitting diodes.

FIG. 94 shows a back side of a circuit board to which is attached a number of circuit boards with exterior-illuminating light emitting diodes. FIG. 95 shows a front side of the circuit board of FIG. 94, with interior-illuminating light emitting diodes.

TABLE E

| Reference Number | Item |
| --- | --- |
| 9212 | Power Bank Pack |
| 9301 | Top Case |
| 9302 | Bottom Case |
| 9303 | Control Board |
| 9304 | Battery |
| 9305 | Button |

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method of forming a nail lamp comprising:

forming an upper housing, wherein the upper housing comprises at least a portion having a translucent material, at least a first plastic in a first layer and a second plastic in a second layer, above the first layer, wherein the first plastic is different from the second plastic;

forming a lower housing and coupling the lower housing to the upper housing, wherein an enclosed space is between the upper and lower housings;

providing a display panel, wherein the display is capable of displaying at least two digits;

providing a first printed circuit board, wherein the first printed circuit board comprises electronic circuitry comprising a control circuit that is coupled to one or more buttons, accessible from an exterior of the nail lamp, and the display;

positioning the first printed circuit board in the enclosed space between the upper and lower housings;

providing a second printed circuit board, wherein the second printed circuit board comprises a plurality of interior-illuminating light emitting diodes that are coupled to the control circuit of the first printed circuit board;

forming a treatment chamber of the nail lamp, wherein the interior-illuminating light emitting diodes are positioned above the treatment chamber;

coupling the second printed circuit board to the first printed circuit board;

positioning the second printed circuit board in the enclosed space between the upper and lower housings;

providing one or more exterior-illuminating light emitting diodes, coupled to the control circuit of the first printed circuit board;

providing a rechargeable battery pack comprising a battery gauge and a first power port, wherein the rechargeable battery pack is insertably coupled to the nail lamp;

forming the first power port of a first side surface of the rechargeable battery pack that is different from a second side surface of the rechargeable battery pack where the battery gauge is formed; and forming a second power port on a housing of the nail lamp, wherein when the rechargeable battery pack is inserted into the nail lamp, the first power port mates with the second power port, and the rechargeable battery pack is electrically coupled to the first printed circuit board, and when the rechargeable battery pack is removed from the nail lamp, the first power port is decoupled from the second power port, and the rechargeable battery pack is electrically decoupled from the first printed circuit board.

2. The method of claim 1 comprising forming a USB port on the second side surface of the rechargeable battery pack.

3. The method of claim 2 comprising allowing use of the USB port supplies to power to an external device separate from the nail lamp.

4. The method of claim 1 wherein by way of the one or more buttons, a user can select a curing time, which will be displayed on the display panel.

5. The method of claim 1 comprising:
forming apertures below the interior-illuminating light emitting diodes and above a treatment chamber, wherein the interior-illuminating light emitting diodes emit ultraviolet light.

6. The method of claim 1 comprising:
positioning the exterior-illuminating light emitting diodes below the portion of the upper housing having the translucent material, wherein the exterior-illuminating light emitting diodes emit non-ultraviolet light.

7. The method of claim 6 wherein the exterior-illuminating light emitting diodes emit light in a direction away from the treatment chamber.

8. The method of claim 1 comprising:
providing an exterior power port and coupling the exterior power port to the first printed circuit board, wherein power input via the exterior power port is used to power the electronic circuitry of the first printed circuit board, interior-illuminating light emitting diodes, and exterior-illuminating light emitting diodes, and to recharge the rechargeable battery pack.

9. The method of claim 8 wherein when power is not connected to the exterior power port, the electronic circuitry of the first printed circuit board, interior-illuminating light emitting diodes, and exterior-illuminating light emitting diodes are powered by the rechargeable battery pack.

10. The method of claim 1 comprising forming the first plastic from an acrylonitrile butadiene styrene.

11. The method of claim 1 comprising forming the second plastic from a polycarbonate.

12. The method of claim 1 comprising using double injection molding to form the first and second layers of plastic.

13. The method of claim 1 wherein the first plastic is colored.

14. The method of claim 1 wherein the second plastic is clear.

15. The method of claim 1 wherein the battery gauge indicates a level of charge of the rechargeable battery pack.

16. The method of claim 1 comprising:
forming a handle in the upper housing; and
forming vent openings beneath the handle.

17. The method of claim 1 comprising removably coupling a fingerplate to the lower housing, wherein the fingerplate forms a lower surface of the treatment chamber.

18. The method of claim 1 comprising:
providing a detection sensor and coupling the detection sensor to the control circuit, wherein after the user has selected a curing time, the selected curing time is displayed on the display panel, the detection sensors detect the presence of a hand in the treatment chamber, and when a hand is placed in the treatment chamber, the control circuit turns on the interior-illuminating light emitting diodes and the exterior-illuminating light emitting diodes.

19. The method of claim 1 comprising:
providing a brightness switch and coupling the brightness switch to the control circuit, wherein for the brightness switch in a first position, when the exterior-illuminating light emitting diodes are on, the exterior-illuminating light emitting diodes illuminate at a first brightness level, and
for the brightness switch in a second position, when the exterior-illuminating light emitting diodes are on, the exterior-illuminating light emitting diodes illuminate at a second brightness level, the first brightness level is greater than the second brightness level.

20. The method of claim 1 comprising:
providing a brightness switch and coupling the brightness switch to the control circuit, wherein for the brightness switch in a first position, when the exterior-illuminating light emitting diodes are on, the exterior-illuminating light emitting diodes illuminate at a first brightness level,
for the brightness switch in a second position, when the exterior-illuminating light emitting diodes are on, the exterior-illuminating light emitting diodes illuminate at a second brightness level, and the first brightness level is greater than the second brightness level, and
for the brightness switch in a third position, when the exterior-illuminating light emitting diodes are on, the exterior-illuminating light emitting diodes illuminate at a third brightness level, and the second brightness level is greater than the third brightness level.

\* \* \* \* \*